(12) United States Patent
O'Rourke et al.

(10) Patent No.: US 11,427,277 B2
(45) Date of Patent: Aug. 30, 2022

(54) TWO-WHEELED VEHICLE

(71) Applicant: Indian Motorcycle International, LLC, Medina, MN (US)

(72) Inventors: Bryan D. O'Rourke, Wyoming, MN (US); Cal W. Johnson, Gem Lake, MN (US); Chad M. Cunningham, Hugo, MN (US); Neil P. Quade, Buffalo, MN (US); Steven M. Hamlin, North Branch, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 211 days.

(21) Appl. No.: 16/940,729

(22) Filed: Jul. 28, 2020

(65) Prior Publication Data

US 2020/0355318 A1  Nov. 12, 2020

Related U.S. Application Data

(60) Continuation of application No. 15/937,190, filed on Mar. 27, 2018, now Pat. No. 10,760,730, which is a
(Continued)

(51) Int. Cl.
  *B62J 17/04* (2006.01)
  *B62J 17/10* (2020.01)
  (Continued)

(52) U.S. Cl.
  CPC .............. *B62J 17/04* (2013.01); *B60K 13/02* (2013.01); *B60K 28/02* (2013.01); *B60K 28/04* (2013.01);
  (Continued)

(58) Field of Classification Search
  CPC ........ B60K 13/02; B60K 11/06; B60K 11/08; F02M 35/116; F02M 35/162;
  (Continued)

(56) References Cited

U.S. PATENT DOCUMENTS 1,239,916 A  9/1917 Jose
3,733,463 A  5/1973 Low et al.
(Continued)

FOREIGN PATENT DOCUMENTS

CA  2929306 A1  5/2015
DE  3420352 A1  12/1985
(Continued)

OTHER PUBLICATIONS

Chinese Office Action issued by the China National Intellectual Property Administration (CNIPA), dated Aug. 29, 2018, for Chinese Patent Application No. 201480061347.5; 9 pages.
(Continued)

*Primary Examiner* — Gregory A Blankenship
(74) *Attorney, Agent, or Firm* — Faegre Drinker Biddle & Reath LLP

(57) ABSTRACT

A two-wheeled vehicle includes a frame having a front frame portion, a mid-frame portion, and a rear frame portion. The mid-frame portion is coupled to the rear frame portion and the front frame portion. The vehicle further includes a plurality of ground-engaging members for supporting the frame. The engine includes an air deflector to assist in cooling a rear cylinder of a V-twin engine. An accessory windshield is also shown which may be coupled to the handlebars and front forks of the vehicle. Also, a rear accessory attachment is shown mountable to the rear fender.

15 Claims, 74 Drawing Sheets

Related U.S. Application Data continuation of application No. 15/183,638, filed on Jun. 15, 2016, now Pat. No. 9,958,111, which is a division of application No. 14/341,356, filed on Jul. 25, 2014, now Pat. No. 9,394,859, which is a continuation-in-part of application No. 14/077,037, filed on Nov. 11, 2013, now Pat. No. 9,216,789.

(51) Int. Cl.

| | | |
|---|---|---|
| *B60K 13/02* | (2006.01) | |
| *B62D 35/00* | (2006.01) | |
| *F02M 35/116* | (2006.01) | |
| *F02M 35/02* | (2006.01) | |
| *B62J 7/04* | (2006.01) | |
| *B62J 33/00* | (2006.01) | |
| *B62K 11/04* | (2006.01) | |
| *F02M 35/16* | (2006.01) | |
| *F02B 61/02* | (2006.01) | |
| *B60K 28/02* | (2006.01) | |
| *B60K 28/04* | (2006.01) | |
| *B60R 25/06* | (2006.01) | |
| *B62J 17/06* | (2006.01) | |
| *F16M 13/02* | (2006.01) | |
| *F01P 1/02* | (2006.01) | |
| *B62J 9/23* | (2020.01) | |

(52) U.S. Cl.
CPC .............. *B60R 25/06* (2013.01); *B62J 7/04* (2013.01); *B62J 17/06* (2013.01); *B62J 33/00* (2013.01); *B62K 11/04* (2013.01); *F02B 61/02* (2013.01); *F02M 35/0201* (2013.01); *F02M 35/0215* (2013.01); *F02M 35/116* (2013.01); *F02M 35/162* (2013.01); *F16M 13/02* (2013.01); *B62D 35/008* (2013.01); *B62J 9/23* (2020.02); *F01P 2001/026* (2013.01); *F16B 2200/10* (2018.08)

(58) Field of Classification Search
CPC ........... F02M 35/0201; F02M 35/0205; F02M 35/10262; B62J 40/00; B62J 40/10; B62J 17/04; B62J 17/10; B62J 99/00; B62D 35/008

See application file for complete search history.

(56) References Cited

U.S. PATENT DOCUMENTS

| | | | |
|---|---|---|---|
| 4,066,290 A | | 1/1978 | Wiegert et al. |
| 4,082,345 A | | 4/1978 | Willey |
| 4,130,315 A | | 12/1978 | Shields |
| 4,269,445 A | | 5/1981 | Gager, Jr. |
| 4,402,379 A | * | 9/1983 | Hoshi .................... F02B 75/20 55/385.3 |
| 4,479,676 A | | 10/1984 | Hayes |
| 4,536,005 A | | 8/1985 | Tanaka et al. |
| 4,580,537 A | | 4/1986 | Uchiyama |
| 4,597,466 A | | 7/1986 | Yamada |
| 4,615,556 A | | 10/1986 | Stahel |
| 4,650,204 A | | 3/1987 | Bothwell |
| 4,657,299 A | | 4/1987 | Mahan |
| 4,993,731 A | | 2/1991 | Fuller |
| 5,664,715 A | | 9/1997 | Gogan et al. |
| 5,732,965 A | | 3/1998 | Willey |
| 5,757,165 A | | 5/1998 | Minks |
| 5,881,833 A | | 3/1999 | Branch et al. |
| 6,042,171 A | | 3/2000 | Hesse |
| 6,105,701 A | * | 8/2000 | Buell .................... B62J 17/10 180/229 |
| 6,114,668 A | | 9/2000 | Ogata et al. |
| 6,161,513 A | | 12/2000 | Lohr et al. |
| 6,196,614 B1 | | 3/2001 | Willey |
| 6,203,093 B1 | | 3/2001 | Suzuki et al. |
| 6,234,554 B1 | | 5/2001 | Willey |
| 6,250,173 B1 | | 6/2001 | Huston |
| 6,251,151 B1 | * | 6/2001 | Kobayashi ........... F02M 35/024 55/DIG. 28 |
| 6,254,166 B1 | | 7/2001 | Willey |
| 6,347,804 B1 | | 2/2002 | Seibel |
| 6,443,344 B1 | | 9/2002 | Nicosia et al. |
| 6,484,914 B1 | | 11/2002 | Willey |
| 6,505,877 B1 | | 1/2003 | Devlin et al. |
| 6,520,275 B2 | | 2/2003 | Galbraith et al. |
| 6,520,545 B2 | | 2/2003 | Johll et al. |
| 6,595,877 B2 | | 7/2003 | Pearson |
| 6,686,572 B1 | | 2/2004 | Wu |
| 6,736,441 B1 | | 5/2004 | Barber et al. |
| 6,844,524 B2 | | 1/2005 | Downey et al. |
| 6,927,367 B2 | | 8/2005 | Livingstone |
| 7,055,454 B1 | | 6/2006 | Whiting et al. |
| 7,091,450 B1 | | 8/2006 | Hollander |
| 7,104,585 B2 | | 9/2006 | Miura et al. |
| 7,150,253 B2 | | 12/2006 | Itou et al. |
| 7,150,382 B2 | | 12/2006 | Zickefoose |
| 7,178,858 B1 | | 2/2007 | Hesse |
| 7,222,582 B2 | | 5/2007 | Whiting et al. |
| 7,270,207 B2 | | 9/2007 | Idei et al. |
| 7,311,232 B2 | | 12/2007 | Watanabe et al. |
| 7,315,779 B1 | | 1/2008 | Rioux et al. |
| 7,360,819 B1 | | 4/2008 | Hahne |
| 7,380,538 B1 | | 6/2008 | Gagnon et al. |
| 7,530,345 B1 | | 5/2009 | Plante et al. |
| 7,543,879 B2 | | 6/2009 | Morin |
| 7,753,980 B2 | * | 7/2010 | Kobayashi ............. F02M 35/04 55/315 |
| 7,891,270 B2 | | 2/2011 | Higashi |
| 7,975,640 B1 | | 7/2011 | Whiting et al. |
| 8,151,925 B2 | | 4/2012 | Aramayo et al. |
| 8,272,460 B2 | | 9/2012 | Song et al. |
| 8,481,889 B2 | | 7/2013 | Fujiwara et al. |
| 8,517,449 B2 | | 8/2013 | Okubo |
| 8,558,140 B2 | | 10/2013 | Hazlett et al. |
| 8,579,169 B2 | | 11/2013 | Racz et al. |
| 8,596,941 B2 | | 12/2013 | Marlow et al. |
| 9,024,236 B2 | | 5/2015 | Kurumagawa et al. |
| 9,132,805 B1 | | 9/2015 | King et al. |
| 9,216,789 B2 | * | 12/2015 | Hamlin .................... B62J 15/02 |
| 9,349,859 B1 | * | 5/2016 | Lien ................ H01L 21/823481 |
| 9,394,859 B2 | | 7/2016 | Parnofiello et al. |
| 9,550,541 B2 | | 1/2017 | Lenton et al. |
| 9,668,405 B2 | | 6/2017 | Albinger et al. |
| 9,908,577 B2 | | 3/2018 | Novak et al. |
| 9,958,111 B2 | | 5/2018 | Oltmans |
| 10,183,717 B2 | | 1/2019 | Holt et al. |
| 10,760,536 B2 | * | 9/2020 | Stimpson ................ B01D 46/10 |
| 10,760,730 B2 | | 9/2020 | Lenton et al. |
| 2002/0185323 A1 | | 12/2002 | Tsutsumi et al. |
| 2003/0010558 A1 | | 1/2003 | Buell et al. |
| 2004/0007567 A1 | | 1/2004 | Downey et al. |
| 2004/0011777 A1 | | 1/2004 | Richlen |
| 2004/0169392 A1 | | 9/2004 | Suzuki |
| 2005/0051375 A1 | * | 3/2005 | Momosaki ....... F02M 35/10262 180/219 |
| 2005/0103769 A1 | | 5/2005 | Marquis |
| 2005/0140162 A1 | | 6/2005 | Yamasaki |
| 2005/0150921 A1 | | 7/2005 | Schneider |
| 2005/0173406 A1 | | 8/2005 | Kurumagawa et al. |
| 2006/0006016 A1 | | 1/2006 | Nishizawa |
| 2006/0042601 A1 | | 3/2006 | Hotta et al. |
| 2006/0049161 A1 | | 3/2006 | Richlen |
| 2007/0221644 A1 | | 9/2007 | Gifford et al. |
| 2008/0116188 A1 | | 5/2008 | Fukuda et al. |
| 2009/0001114 A1 | | 1/2009 | Sonnetag et al. |
| 2009/0049161 A1 | | 2/2009 | Takeuchi et al. |
| 2009/0065491 A1 | | 3/2009 | Fitzgerald et al. |
| 2009/0079219 A1 | | 3/2009 | Caprio |
| 2009/0250963 A1 | | 10/2009 | Nakamura |
| 2010/0301627 A1 | | 12/2010 | Kern |
| 2011/0084055 A1 | | 4/2011 | Park et al. |
| 2011/0101724 A1 | | 5/2011 | Wu |

(56) References Cited

U.S. PATENT DOCUMENTS

| | | |
|---|---|---|
| 2011/0118961 A1 | 5/2011 | Koenen et al. |
| 2011/0180345 A1* | 7/2011 | Iida ..................... B62K 11/04 180/68.1 |
| 2011/0215901 A1 | 9/2011 | Van et al. |
| 2011/0233956 A1 | 9/2011 | Okubo |
| 2011/0297462 A1 | 12/2011 | Grajkowski et al. |
| 2012/0248812 A1 | 10/2012 | Fukuda et al. |
| 2012/0267911 A1 | 10/2012 | Ransone |
| 2012/0305540 A1 | 12/2012 | Paxton et al. |
| 2013/0057016 A1* | 3/2013 | Yamada ................... B62J 17/02 296/78.1 |
| 2013/0066525 A1 | 3/2013 | Tomik et al. |
| 2013/0220257 A1 | 8/2013 | Campbell |
| 2013/0320696 A1 | 12/2013 | Yokouchi et al. |
| 2013/0320697 A1 | 12/2013 | Yokouchi et al. |
| 2014/0048347 A1 | 2/2014 | Munzel et al. |
| 2014/0136076 A1 | 5/2014 | Novak et al. |
| 2014/0229092 A1 | 8/2014 | Hermann |
| 2014/0345555 A1 | 11/2014 | Koenen et al. |
| 2015/0025746 A1 | 1/2015 | Yoshizawa |
| 2015/0129342 A1 | 5/2015 | Bagnariol et al. |
| 2015/0130209 A1 | 5/2015 | Hamlin et al. |
| 2015/0135886 A1 | 5/2015 | Winters |
| 2015/0217726 A1 | 8/2015 | Lee et al. |
| 2015/0274246 A1 | 10/2015 | Ichikawa et al. |
| 2016/0137262 A1 | 5/2016 | Ohashi et al. |
| 2016/0185358 A1 | 6/2016 | Todasco et al. |
| 2016/0318569 A1 | 11/2016 | Zellmer et al. |
| 2017/0057511 A1 | 3/2017 | Woodley |
| 2017/0057513 A1 | 3/2017 | Ohashi et al. |
| 2017/0080938 A1 | 3/2017 | Ohashi et al. |
| 2017/0101149 A1 | 4/2017 | Lenton et al. |
| 2017/0274958 A1 | 9/2017 | Felicilda |
| 2017/0327004 A1 | 11/2017 | Mochizuki et al. |
| 2018/0216780 A1 | 8/2018 | Oltmans |
| 2018/0354363 A1 | 12/2018 | Rolfes et al. |
| 2019/0120195 A1 | 4/2019 | King et al. |

FOREIGN PATENT DOCUMENTS

| | | |
|---|---|---|
| EP | 0968909 A2 | 1/2000 |
| EP | 1515037 A1 | 3/2005 |
| EP | 1614886 A1 | 1/2006 |
| EP | 2371688 A1 | 10/2011 |
| GB | 0733208 A | 7/1955 |
| JP | 59-026090 U | 2/1984 |
| JP | 60-137120 | 9/1985 |
| JP | 62-043993 | 3/1987 |
| JP | 62-197619 | 9/1987 |
| JP | 01-102087 U | 7/1989 |
| JP | 2001-106150 A | 4/2001 |
| JP | 2003-106148 A | 4/2003 |
| JP | 2005-069221 A | 3/2005 |
| JP | 2005-153664 A | 6/2005 |
| JP | 2007-145130 A | 6/2007 |
| JP | 2013-018307 A | 1/2013 |
| WO | 2006/073244 A1 | 7/2006 |

OTHER PUBLICATIONS

English Translation of Japanese Office Action issued by the Japanese Patent Office, dated Aug. 21, 2018, for Japanese Patent Application No. 2016-526840; 16 pages.

Examination Report No. 1 issued by the Australian Government IP Australia, dated Aug. 25, 2017, for corresponding Australian patent application No. 2014346428; 4 pages.

International Preliminary Report on Patentability issued by the Patent Cooperation Treaty, dated Jan. 3, 2016, for related International Application No. PCT/US2014/065012; 41 pages.

International Search Report and Written Opinion issued by the European Patent Office, dated May 19, 2015, for related International Application No. PCT/US2014/065012; 30 pages.

Japanese Office Action issued by the Japanese Patent Office, dated Aug. 21, 2018, for Japanese Patent Application No. 2016-526840; 12 pages.

Office Action issued by the Canadian Intellectual Property Office, dated Oct. 4, 2019, for Canadian Patent Application No. 2,929,306; 8 pages.

Photo of EDGE Brackets Quick Release Saddlebag System Installation with Mustang Hard Bags, available at https://www.youtube.com/watch?v=2CP_f3cTQeU, May 28, 2009, 1 page.

Photo of Victory's Matthew Cardenas talks about new saddlebag system, available at https://www.youtube.com/watch?/=ttrOAFAzWac, Aug. 1, 2012, 1 page.

* cited by examiner

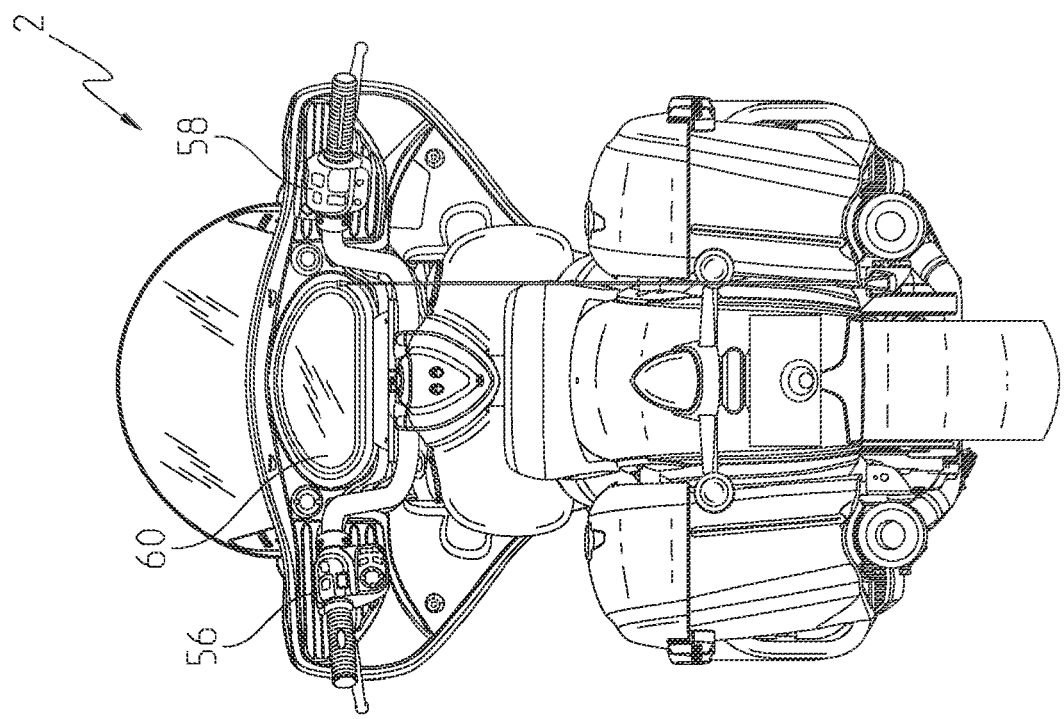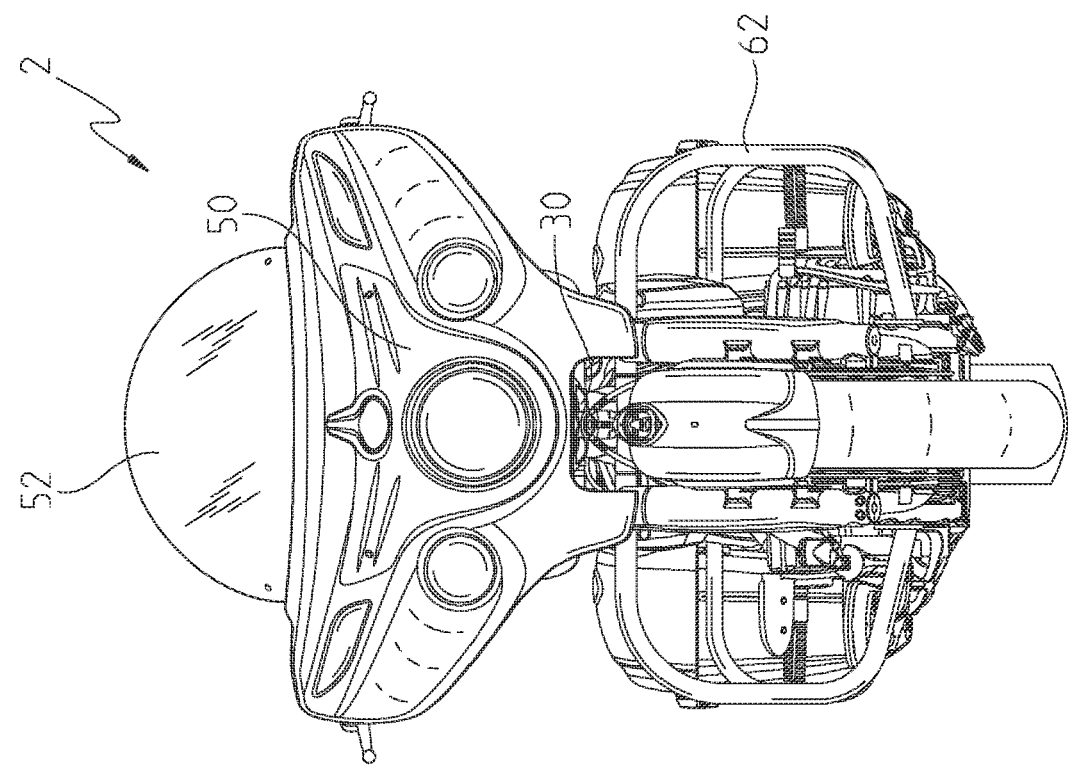

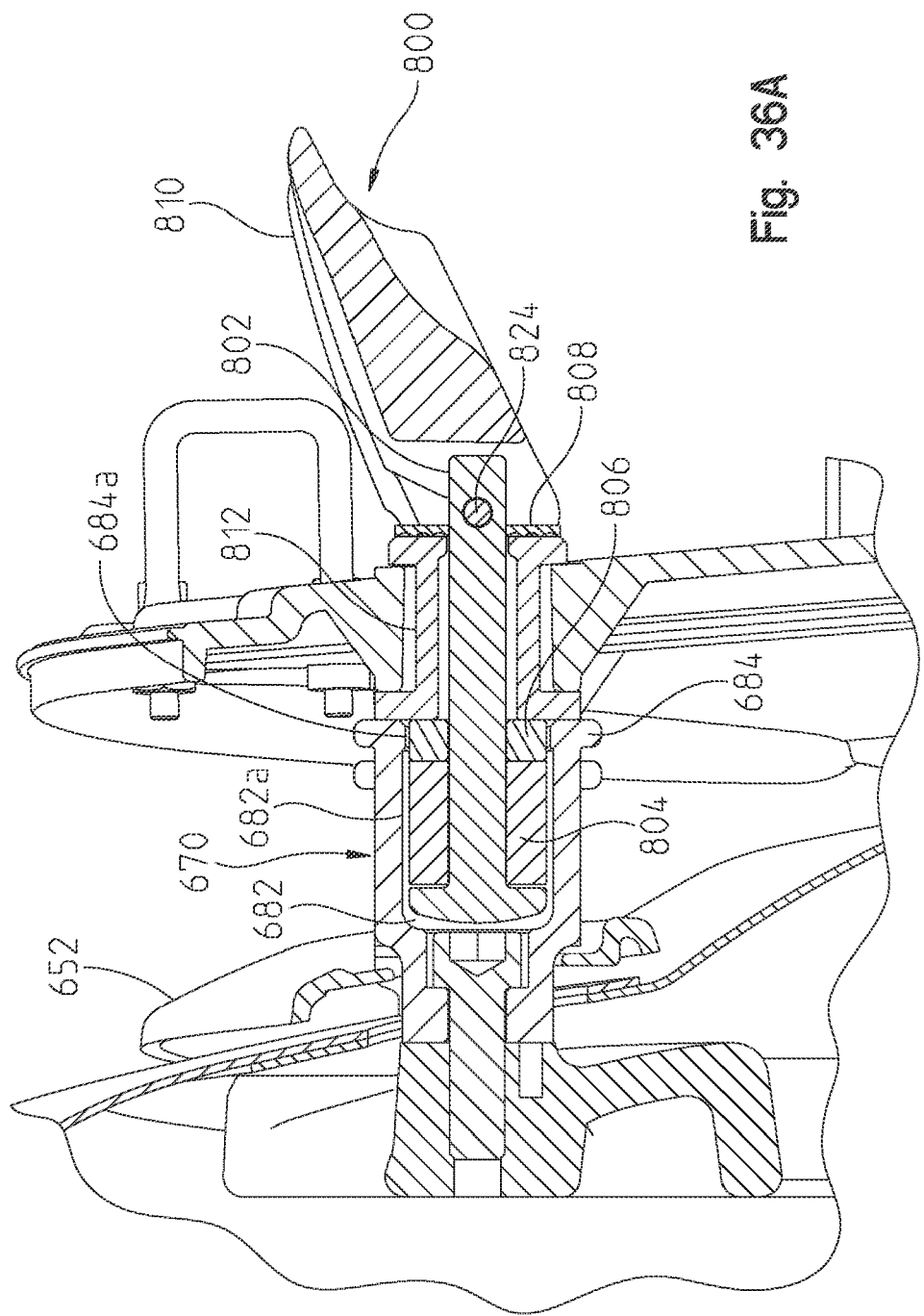

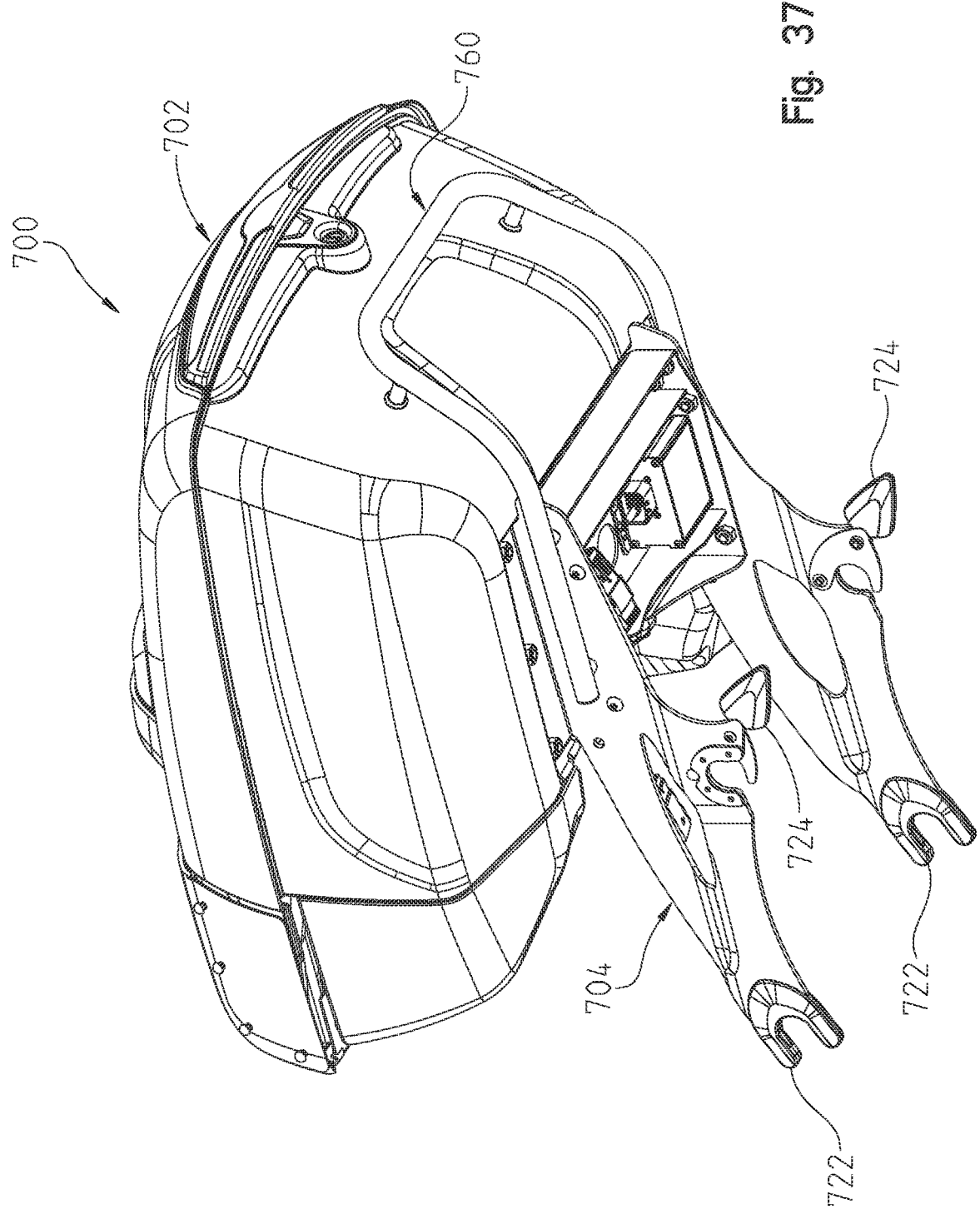

TWO-WHEELED VEHICLE

CROSS-REFERENCE TO RELATED APPLICATIONS

The present application is a continuation of U.S. patent application Ser. No. 15/937,190, filed Mar. 27, 2018, which is a continuation of U.S. patent application Ser. No. 15/183,638, filed on Jun. 15, 2016, which is a divisional of U.S. patent application Ser. No. 14/341,356, filed Jul. 25, 2014, which is a Continuation-in-Part application of U.S. patent application Ser. No. 14/077,037, filed Nov. 11, 2013, and is related to U.S. Design Patent Application Serial Number 29/437,022, filed Nov. 12, 2012; U.S. Provisional Patent Application Ser. No. 61/725,440, filed on Nov. 12, 2012; and U.S. Provisional Patent Application Ser. No. 61/773,708, filed Mar. 6, 2013; the complete disclosures of which are expressly incorporated herein by reference.

BACKGROUND OF THE INVENTION

The present disclosure relates to a two-wheeled vehicle and, more particularly, to a motorcycle having added rider comfort, such as improved wind/rain protection, improved heated hand grips, an improved trunk area and an improved communication system.

Conventional two-wheeled vehicles include a frame for supporting an operator. The frame may also support a passenger rearward of the driver. An engine is typically positioned below the driver and is coupled to the frame. The front of the vehicle may include a panel or cover positioned forwards of the driver for supporting additional components of the vehicle, for example a light. The rear of the vehicle may include a cargo area, for example saddle bags extending laterally outward from the frame.

SUMMARY OF THE INVENTION

In an exemplary embodiment of the present invention, a motorcycle air cleaner housing comprising a housing element; an air intake defined in the housing element; an air output defined in the housing element; an air cleaning path linking the air intake to the air output, the air cleaning path including an air cleaner disposed therein; and an air deflector coupled to the housing element, the air deflector including a deflector input positioned to receive ambient air, the air deflector providing an air deflector path distinct from the air cleaning path.

A further exemplary embodiment of the present invention includes motorcycle, comprising a frame; front and rear wheels supporting the frame; a powertrain drivingly connected to the rear wheel, the powertrain including an internal combustion engine having at least first and second cylinders, the second cylinder being located rearward of the first cylinder; an air cleaner; and an air deflector, the air deflector including an air intake receiving ambient air, the air deflector defining an air path from the air intake to an air output, the air output being positioned adjacent the rear cylinder.

In yet another embodiment of the present invention, a windshield assembly for a vehicle, comprising a windshield having an upper end, a lower end and side edges. A bracket assembly comprises a first attachment point to the windshield adjacent the lower end, and a second attachment point positioned vertically above the first attachment point; a mount having an axis complementary to a handlebar of the vehicle; and a clamp that is attachable to a second point on the vehicle.

In yet another embodiment of the present invention, a coupling system for a vehicle, comprising a first coupler having an outer annual surface and an opening defining an inner surface, where the outer surface and the inner surface define gripping surfaces for gripping one or more alternative vehicle attachments.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 6 is a front view of the two-wheeled vehicle of FIG. 1;

FIG. 7 is a rear view of the two-wheeled vehicle of FIG. 1;

FIG. 36A is a cross-sectional view of the saddle bag mounting assembly of FIG. 36;

FIG. 37 shows a left rear perspective view of an accessory trunk used with the motorcycle;

Corresponding reference characters indicate corresponding parts throughout the several views. Unless stated otherwise the drawings are proportional.

DETAILED DESCRIPTION OF THE DRAWINGS

Figure 1:
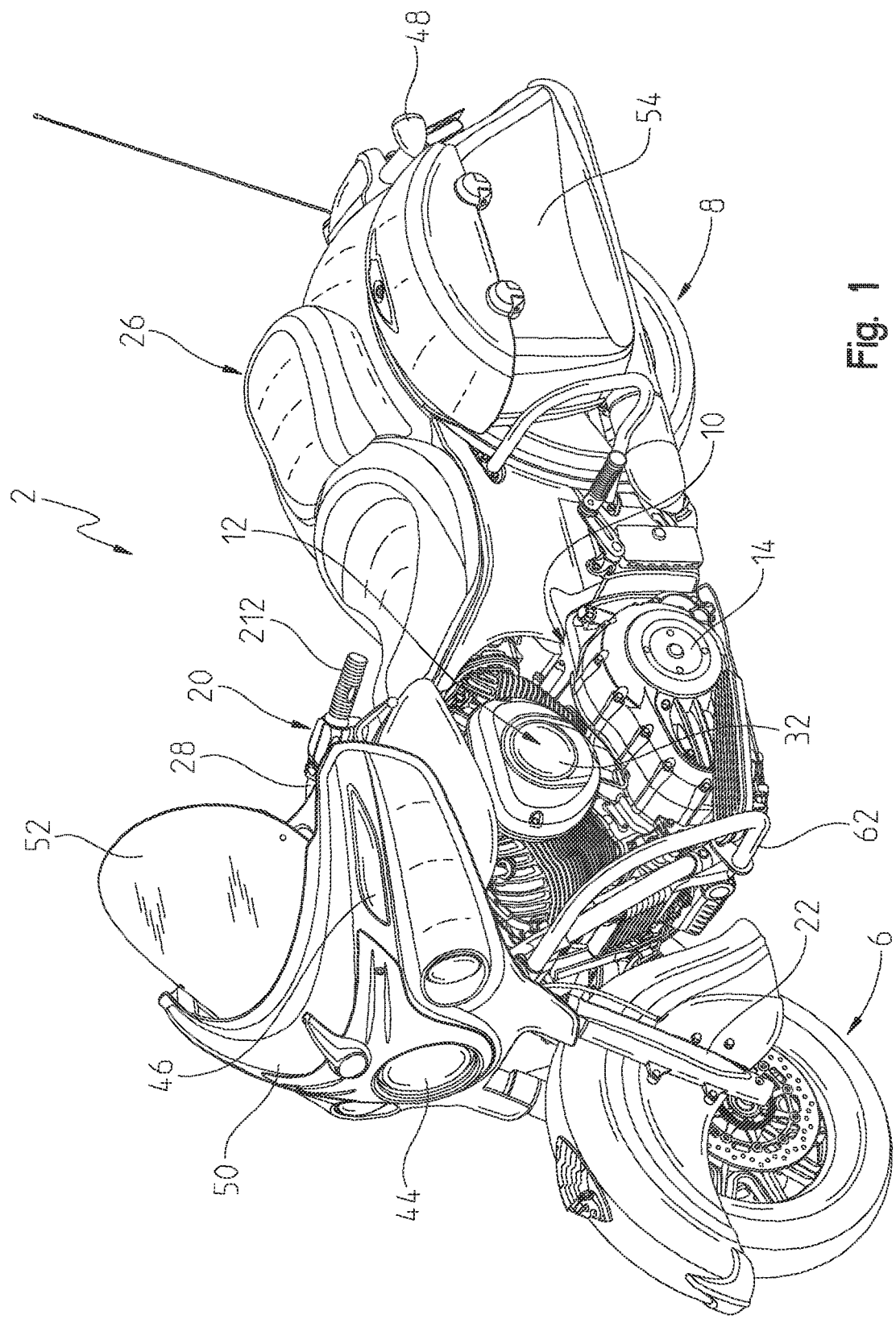
FIG. 1 is a left front perspective view of the two-wheeled vehicle.

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as all-terrain vehicles, motorcycles, watercraft, utility vehicles, scooters, golf carts, and mopeds.

With reference first to FIGS. 1-7, an illustrative embodiment of a two-wheeled vehicle 2 is shown. Vehicle 2 as illustrated is a touring style motorcycle although the majority of components may be used for a cruiser style motorcycle as described herein. Vehicle 2 may also include any features known from U.S. Provisional Patent Application Ser. No. 61/725,440, filed Nov. 12, 2012, entitled "TWO-WHEELED VEHICLE", or Ser. No. 61/773,708, filed Mar.

6, 2013, entitled "TWO-WHEELED VEHICLE", the disclosures of which are expressly incorporated by reference herein.

U.S. patent application Ser. No. 11/624,103 filed Jan. 17, 2007, entitled "FUEL TANK ARRANGEMENT FOR A VEHICLE,"(now U.S. Pat. No. 7,748,746 (2010 Jul. 6)); U.S. Provisional Patent Application Ser. No. 60/880,999, filed Jan. 17, 2007, entitled "TWO-WHEELED VEHICLE", U.S. patent application Ser. No. 11/624,142 filed Jan. 17, 2007, entitled "REAR SUSPENSION FOR A TWO WHEELED VEHICLE," (now U.S. Pat. No. 7,669,682 (2010 Mar. 2)); U.S. patent application Ser. No. 11/324,144 filed Jan. 17, 2007, entitled "TIP OVER STRUCTURE FOR A TWO WHEELED VEHICLE," (now U.S. Pat. No. 7,658,395 (2010 Feb. 9)); and U.S. Provisional Patent Application Ser. No. 60/880,909 filed Jan. 17, 2007, entitled "TWO-WHEELED VEHICLE", are also expressly incorporated by reference herein.

Vehicle 2 includes a frame 4 (FIGS. 3 and 33) supported by ground engaging members, namely a front ground engaging member, illustratively wheel 6, and a rear ground engaging member, illustratively wheel 8. Vehicle 2 travels relative to the ground on front wheel 6 and rear wheel 8.

Rear wheel 8 is coupled to a power train assembly 10, to propel the vehicle 2 through rear wheel. Power train assembly 10 includes both an engine 12 and transmission 14. Transmission 14 is coupled to engine 12 which provides power to rear wheel 8. In the illustrated embodiment, engine 12 is a 49° V-twin spark-ignition gasoline engine available from Polaris Industries, Inc. located at 2100 Highway 55 in Medina, Minn. 55340. In alternative embodiments, rear wheel 8 is coupled to a drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuously variable transmission (CVT).

It will be appreciated that while the vehicle 2 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Figure 2:
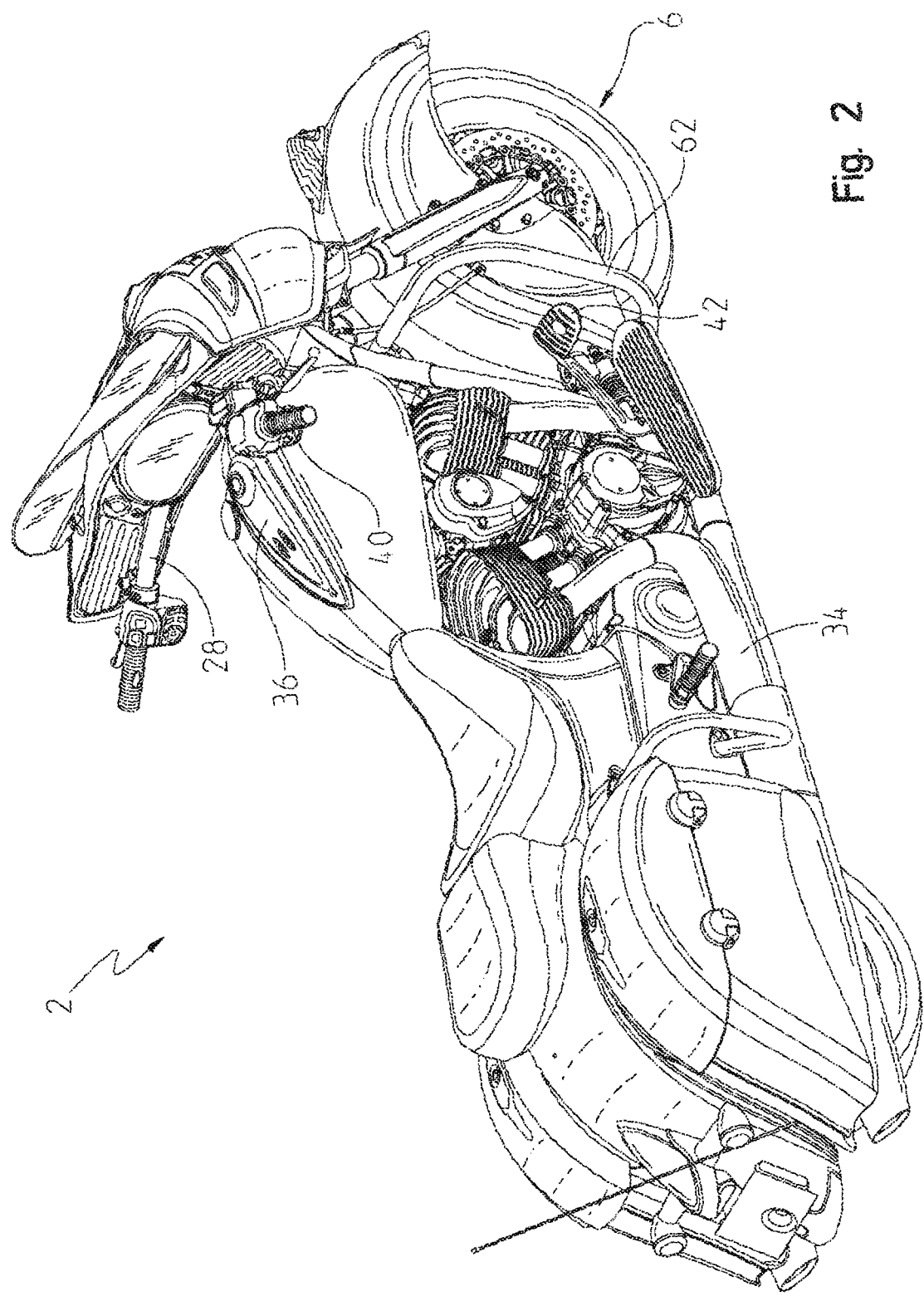
FIG. 2 is a right rear perspective view of the two-wheeled vehicle.
Figure 3:
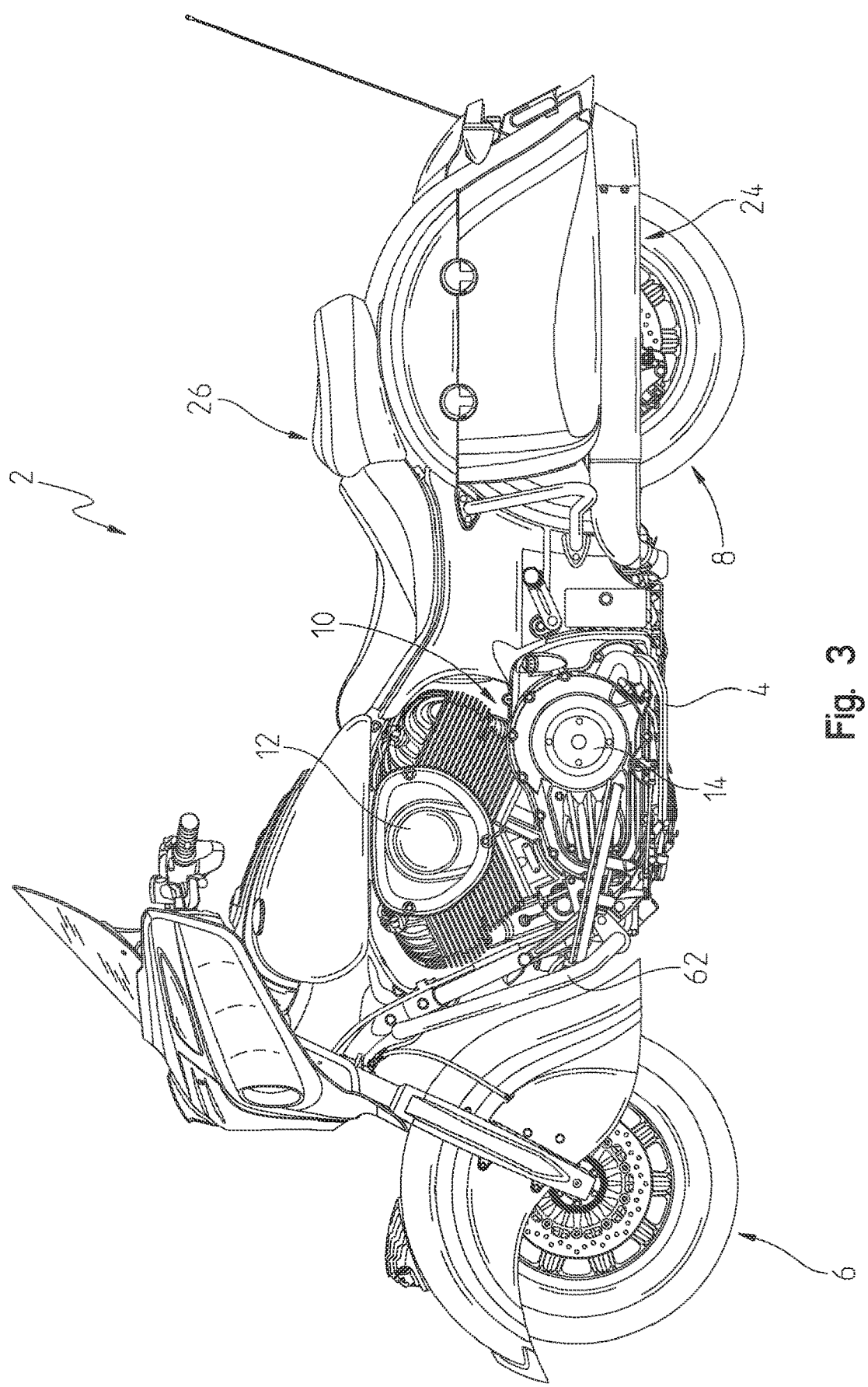
FIG. 3 is a left side view of an illustrative embodiment of the two-wheeled vehicle.
Figure 4:
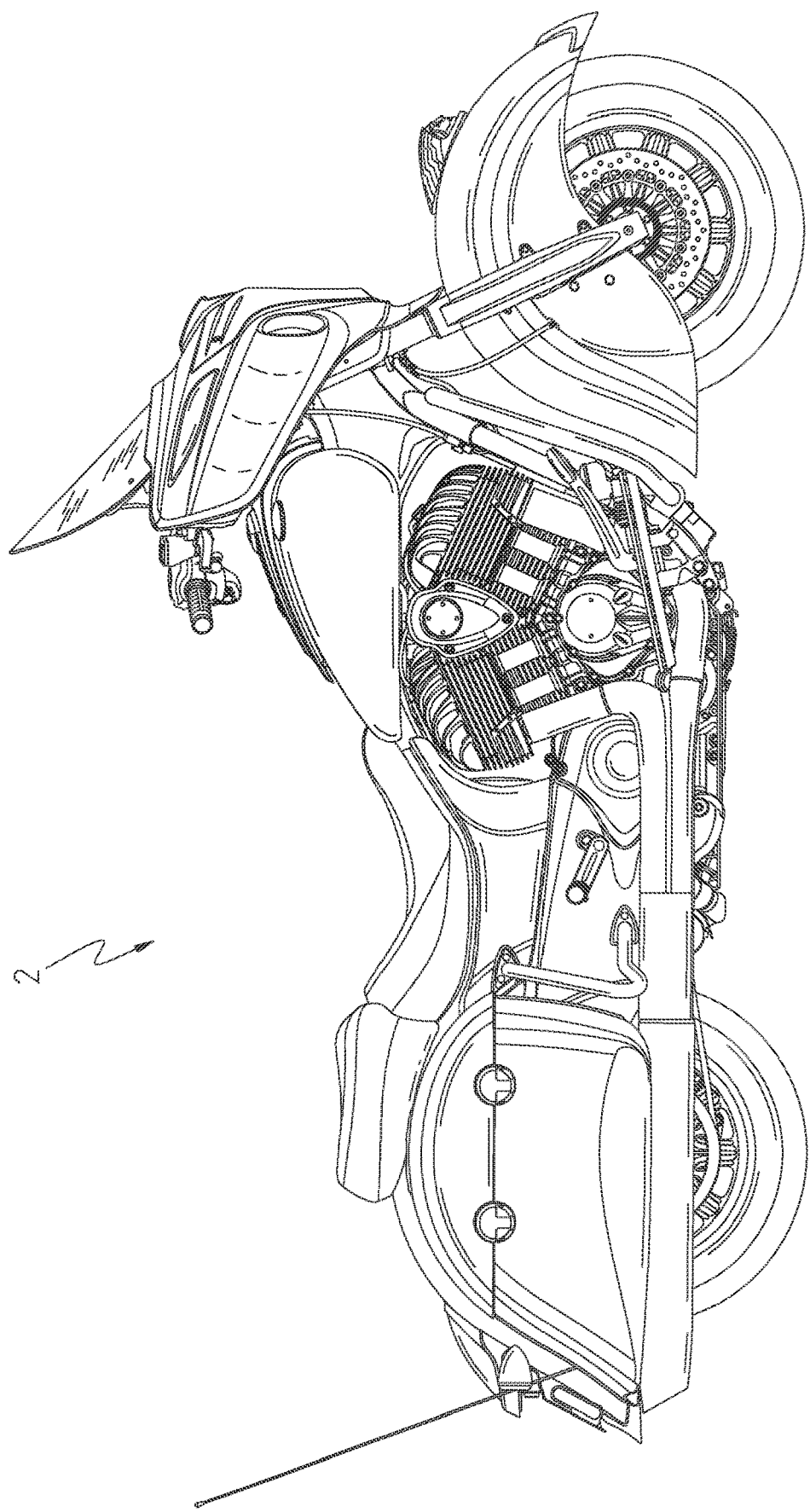
FIG. 4 is a right side view of an illustrative embodiment of the two-wheeled vehicle.
Figure 5:
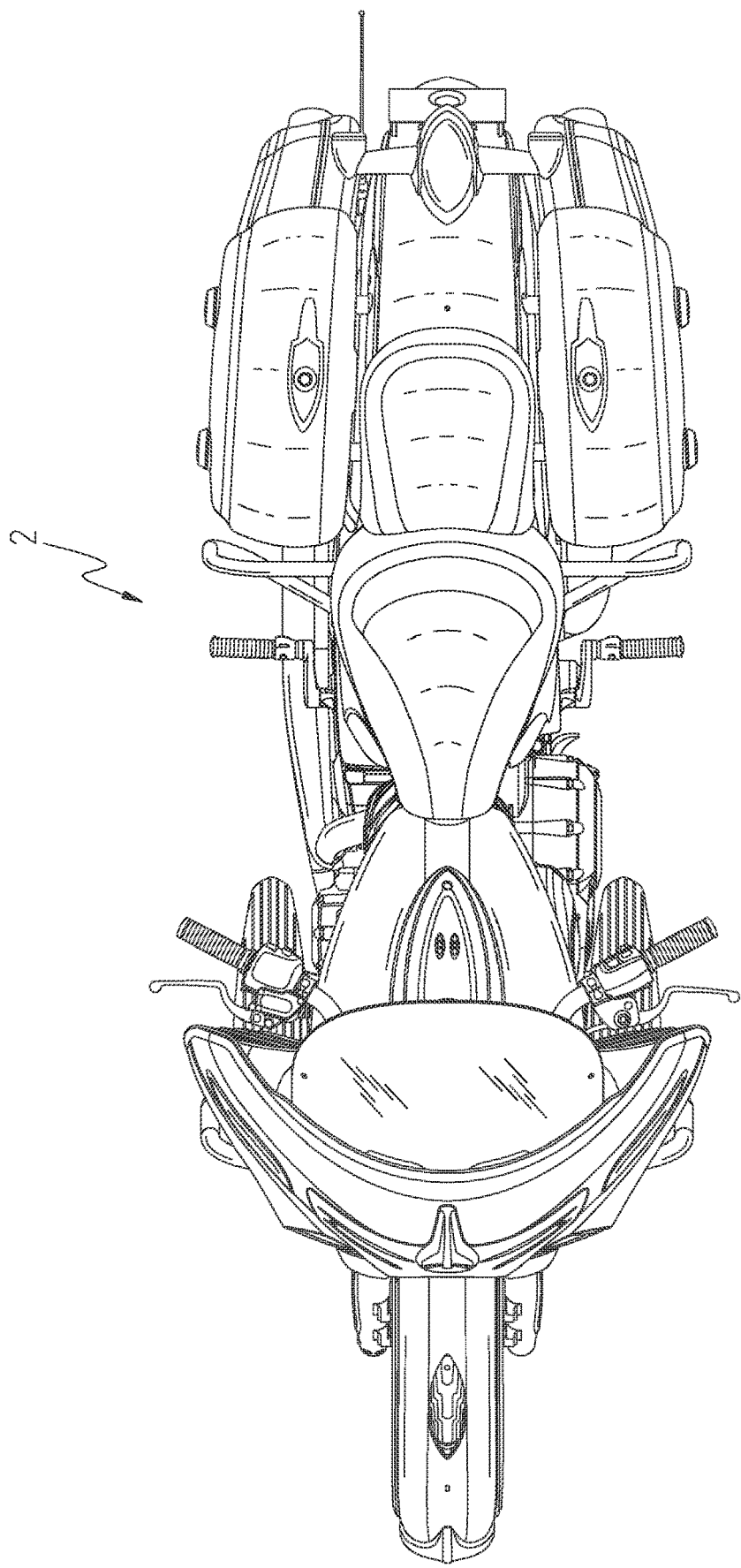
FIG. 5 is a top view of the two-wheeled vehicle of FIG. 1.
Figure 8:
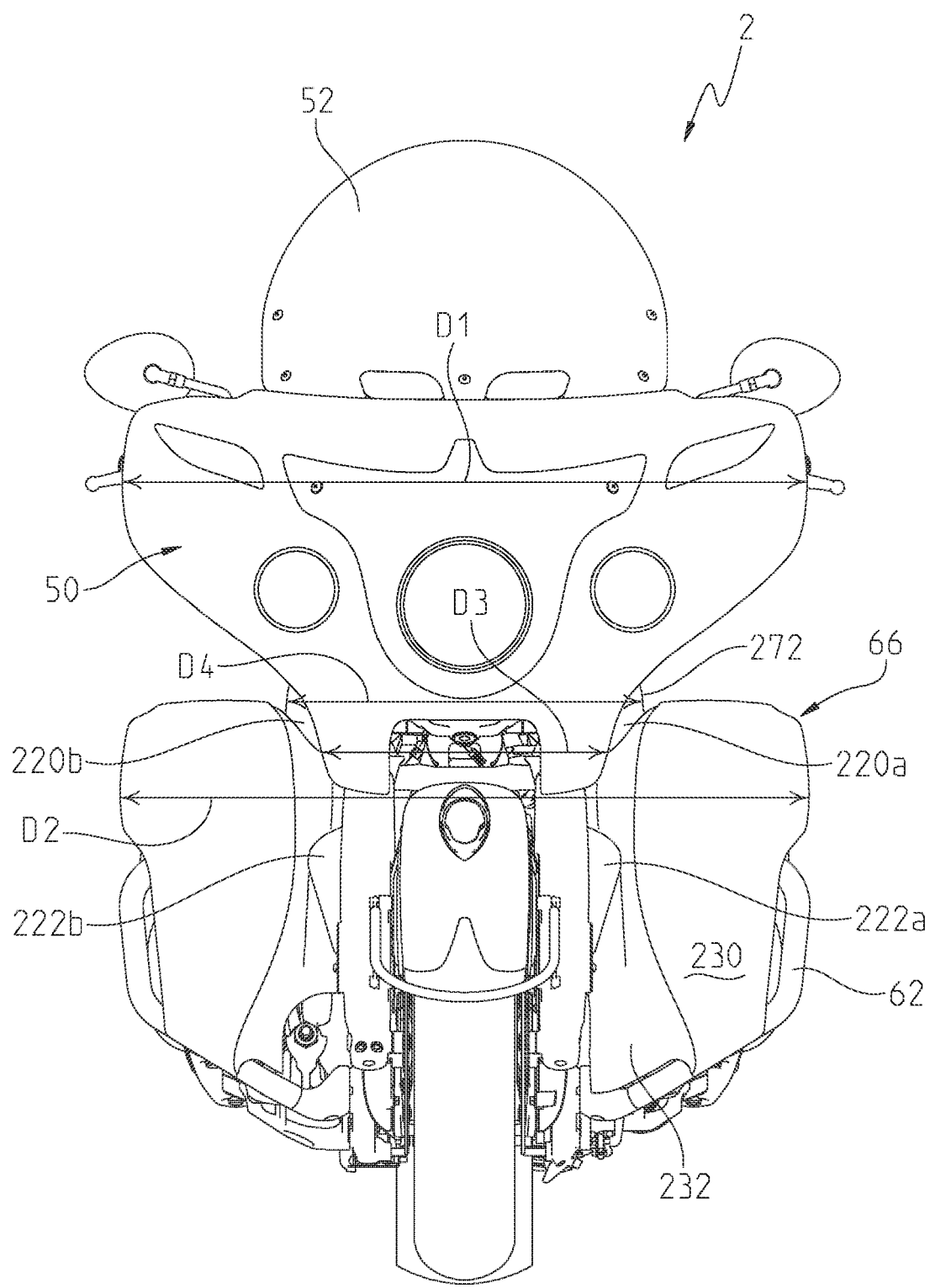
FIG. 8 is a view similar to that of FIG. 6, showing an upper fairing and a lower fairing on a cruiser motorcycle.
Figure 9:
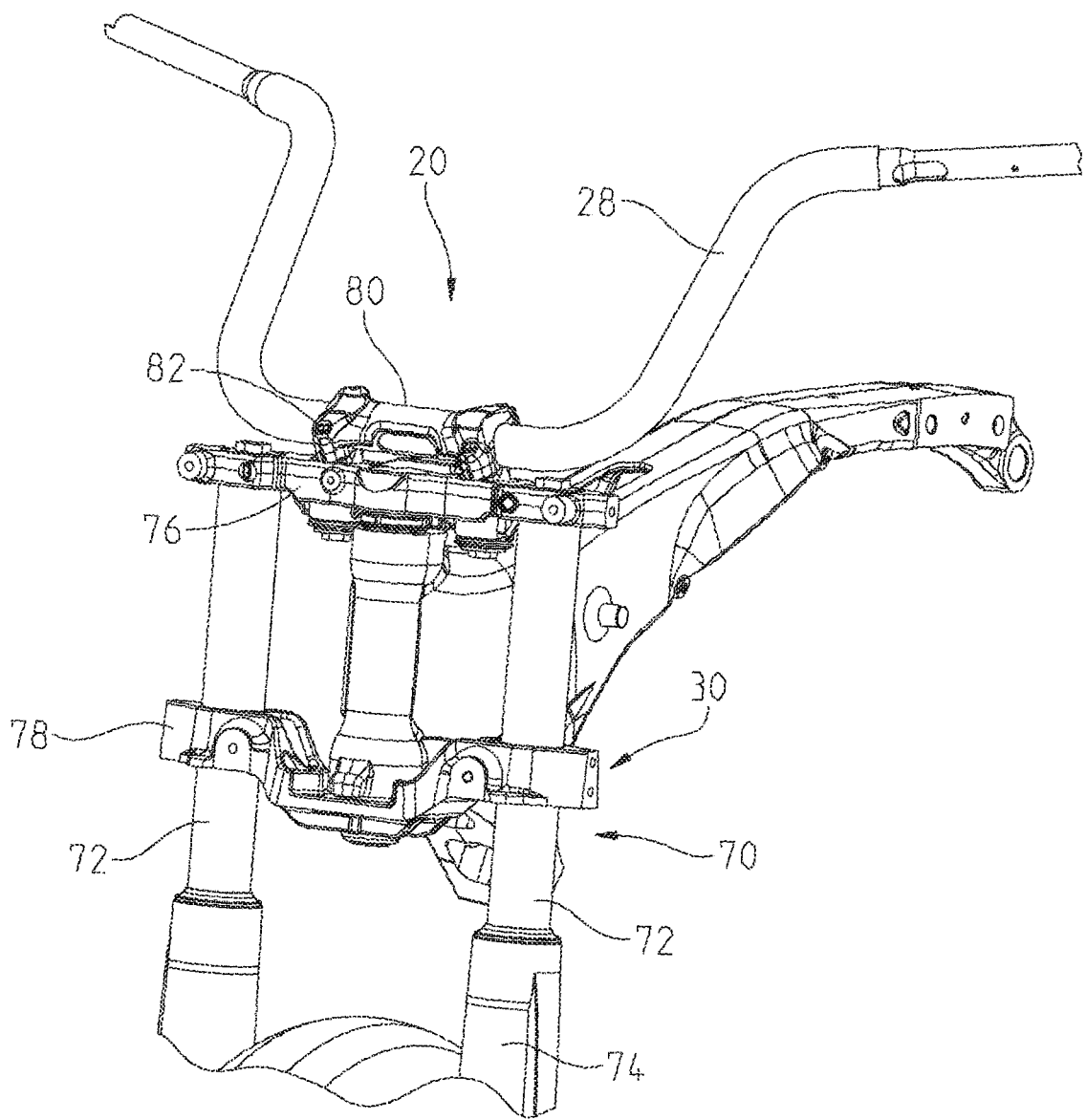
FIG. 9 is a front perspective view of a steering assembly of the illustrative vehicle.

Motorcycle 2 also generally includes a steering assembly 20, front suspension 22, rear suspension 24 (FIG. 3), and seat 26. Steering assembly 20 includes handlebars 28 which may be moved by an operator to rotate front wheel 6 either to the left or the right, where steering assembly is coupled to the motorcycle through triple clamp assembly 30 (FIGS. 6 and 9). Engine operating systems are also included such as an air intake system 32 and exhaust system 34 (FIG. 2). Operator controls are also provided for operating and controlling vehicle 2, which may include vehicle starting system 36, vehicle speed controls 40 and vehicle braking systems 42. Safety systems may also be provided such as main lighting 44, front turn signals 46, and rear turn signals 48. Ergonomic systems may include front fairing 50, windshield assembly 52 and saddlebag assembly 54. Control systems may include control modules 56 and 58, and instrument cluster 60. Safety equipment may include highway bars 62. Referring to FIG. 8, motorcycle 2 is shown having an upper fairing 50 and a lower fairing 66.

Figure 10:
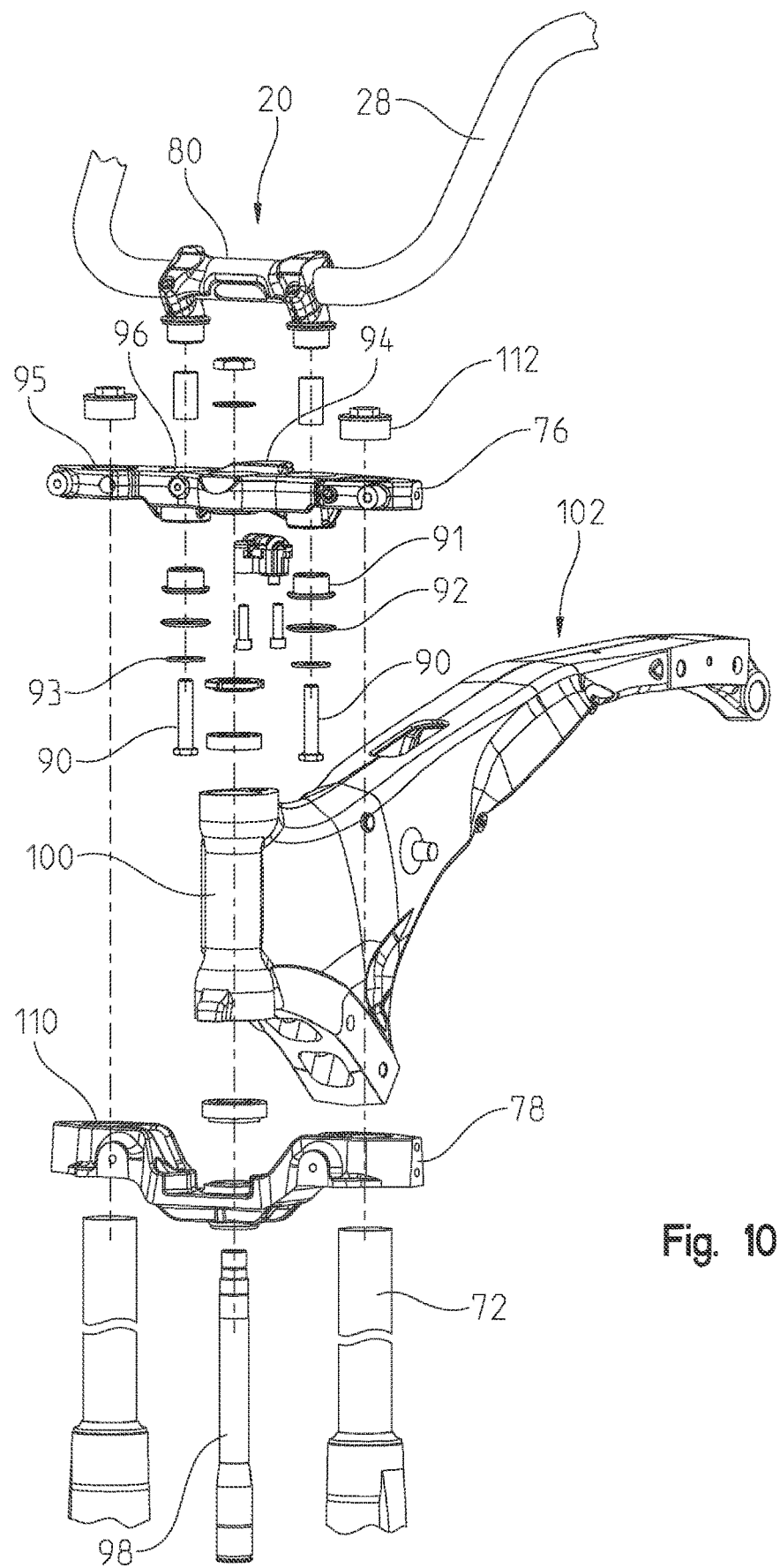
FIG. 10 is an exploded view of the steering assembly of FIG. 9.

Referring to FIGS. 9-10, steering assembly 20 is shown. Steering assembly 20 includes front fork assembly 70 having front fork members 72 operably coupled to handlebars 28 and triple clamp assembly 30. The outer diameter of front fork members 72 is smaller than the inner diameter of front shocks 74 and, as such, front fork members 72 are received within front shocks 74 and telescope or move relative thereto as front wheel 6 moves along a surface.

Front fork members 72 are coupled together through the front wheel axis and triple clamp assembly 30. As such, front fork members 72 move together when the operator is steering motorcycle 2 with handlebars 28. Triple clamp assembly 30 includes an upper clamp member 76 and a lower clamp member 78. Lower clamp member 78 is positioned between front shocks 74 and upper clamp member 76. Upper clamp member 76 is positioned below handlebars 28.

Handlebars 28 include a clamp 80 which is coupled to handlebars 28. Clamp 80 is secured to handlebars 28 by way of fasteners 90 (FIG. 10), which extend through bearings 92, spacers 94 and washers 96. Illustratively, fasteners 90 are bolts. Handlebars 28 and/or bracket 80 may include vibration isolating members in order to dampen the vibration from motorcycle 2 felt by the operator.

Upper clamp member 76 also includes a central opening 92 and outer openings 94. Central opening 92 is positioned between openings 96 and outer openings are positioned outward from openings 96. As such, openings 96 are positioned between central opening 92 and outer openings 94. Central opening is configured to secure a steering shaft 98 of steering assembly 20 to triple clamp assembly 30.

Steering shaft 98 is positioned between upper and lower clamp members 76, 78. More particularly, steering shaft 98 is positioned within head tube 100 of mainframe tube 102. Steering shaft 98 is configured to rotate within head tube 100 to transmit motion from handlebars 28 to triple clamp assembly 30. Steering shaft 98 is angled at the same rake angle as head tube 100. Steering shaft 98 is coupled to head tube 100 and to triple clamp assembly 30.

Outer openings 94 of upper clamp member 76 are configured to secure front fork members 72 to triple clamp assembly 30. More particularly, front fork members 72 are received through outer openings 110 of lower clamp member 78 and extend toward upper clamp member 76. The top ends of front fork members 72 are positioned within outer openings 94 of upper clamp member 76 and are secured thereto with couplers 114.

In operation, steering assembly 20 is controlled by the operator via handlebars 28. As the operator moves handlebars 28, front fork assembly 70 moves as a unit in a similar manner. As such, handlebars 28 rotate steering shaft 98 and both front fork members 72 which then moves front wheel 6. With reference now to FIGS. 8-25, upper fairing assembly 50 and lower fairing assembly 66 will be described in greater detail.

Referring first to FIGS. 11-15, front fairing 50 covers a portion of steering assembly 20, including a portion of front fork members 72, triple clamp assembly 30, and handlebars 28. Front fairing 50 includes an outer panel 120, an inner panel 122, a support bracket 124, and an intermediate panel 126. Outer panel 120 may be comprised of a polymeric and/or metallic material. As shown best in FIG. 14, outer panel 120 includes a plurality of openings for receiving accessories, such as lighting units. For example, outer panel 120 includes an opening 128 for a headlight unit 130, openings 132 for secondary lighting units 134, and openings 136 for turn signal lighting units 138. Lighting units 130, 134, and 138 are generally flush with outer panel 120 such that lighting units 130, 134, and 138 are generally integral with outer panel 120 and do not protrude outwardly therefrom.

Figure 11:
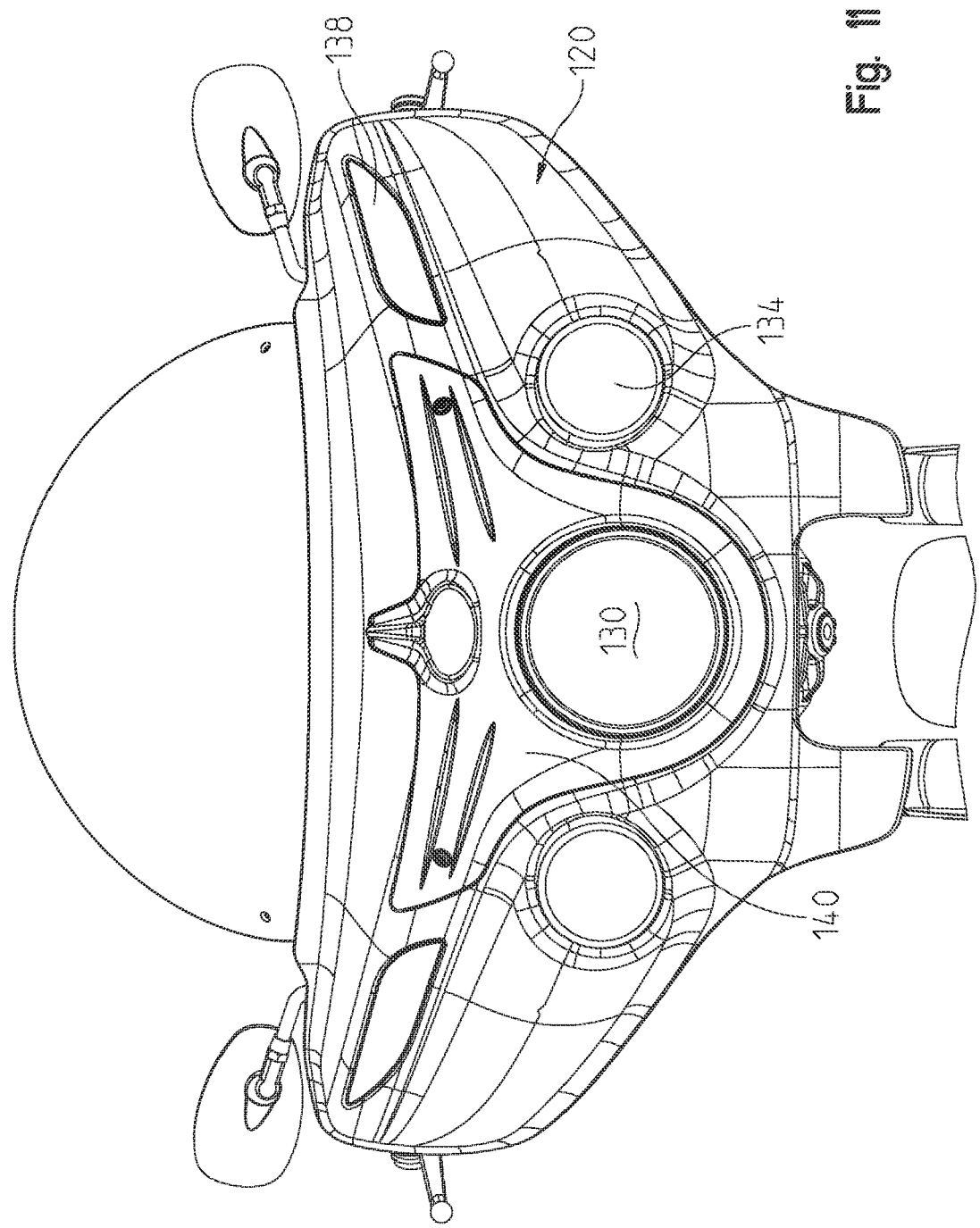
FIG. 11 is a front view of a upper fairing and a windshield assembly.

Outer panel 120 also is configured to support a cover member 140 which, as shown in FIG. 11, supports headlight unit 130. Cover member 140 is secured to outer panel 120 with lower brackets 142 FIG. 14). Cover member 140 may include additionally accessories, for example, cover member 140 may include a logo, sign, indicia, marking, or other emblem.

Figure 15:
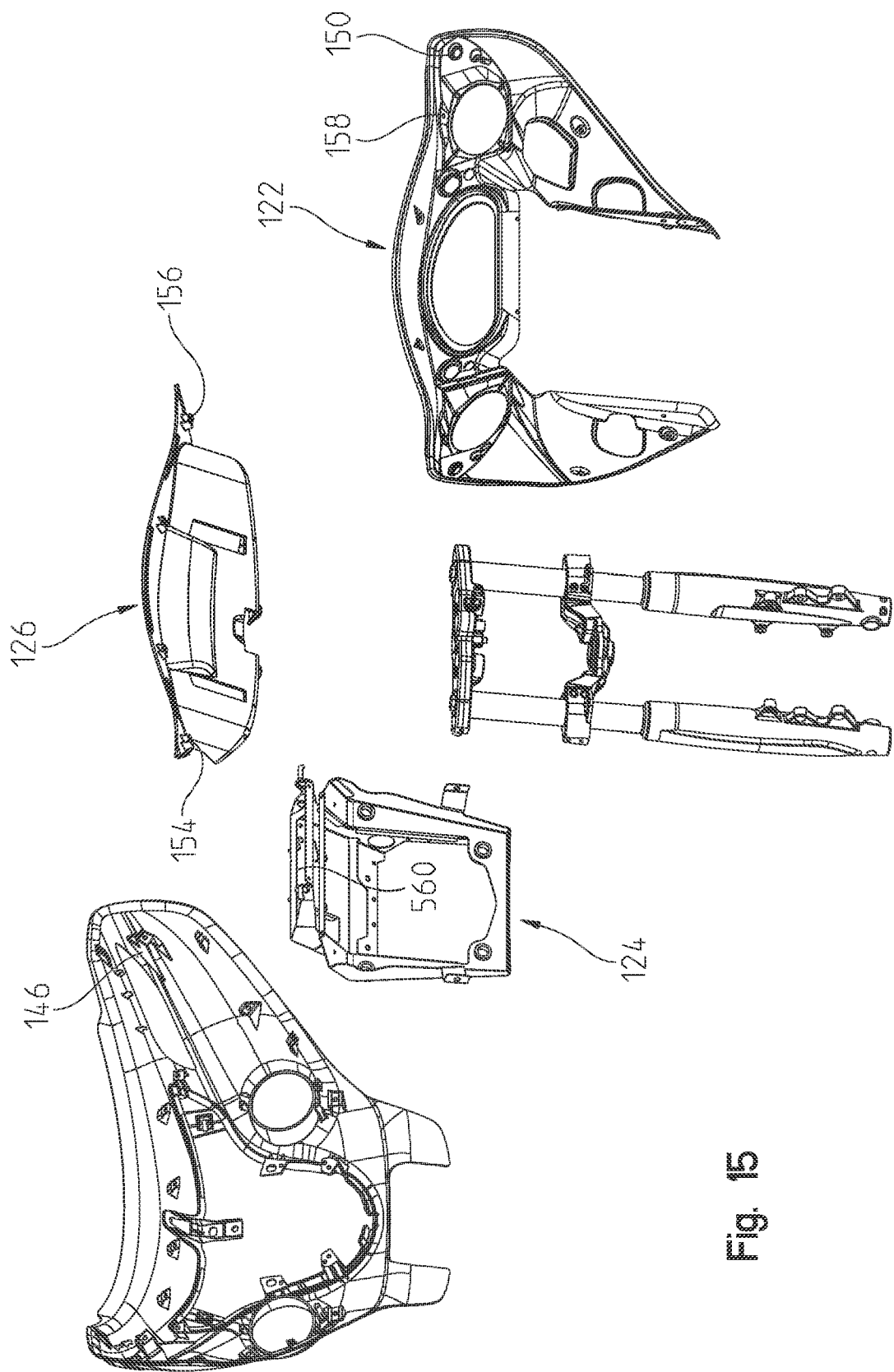
FIG. 15 is a rear exploded view of the upper fairing assembly of FIG. 14.

Outer panel 120 is coupled directly to intermediate panel 126. Outer panel 120 is also coupled to inner panel 122. As such, inner panel 122 and intermediate panel 126 support the load of outer panel 120 because outer panel 120 is not coupled to support bracket 124 or triple clamp assembly 30. Referring to FIG. 15, the rear surface of outer panel 120 also includes tabs 146, each of which includes an aperture for coupling outer panel 120 to inner panel 122. Apertures 148 generally correspond to apertures 150 on inner panel 122. Apertures 148 are aligned with apertures 150 in order to receive conventional fasteners therethrough for coupling outer panel 120 to inner panel 122.

Inner panel 122 is also coupled to intermediate panel 126. As shown in FIG. 15, intermediate panel 126 includes brackets 154, each of which has an aperture 156. Illustratively, intermediate panel 126 includes four brackets 154 and four apertures 156. Apertures 156 align with apertures 158 at an upper end of inner panel 122. Apertures 156 and 158 receive conventional fasteners for coupling intermediate panel 126 to inner panel 122. Inner panel 122 is further coupled to intermediate panel 126 through a plurality of tongue-and-groove connections. As such, inner panel 122 and intermediate panel 126 are coupled together with conventional fasteners at aperture 156 and 158.

Figure 14:
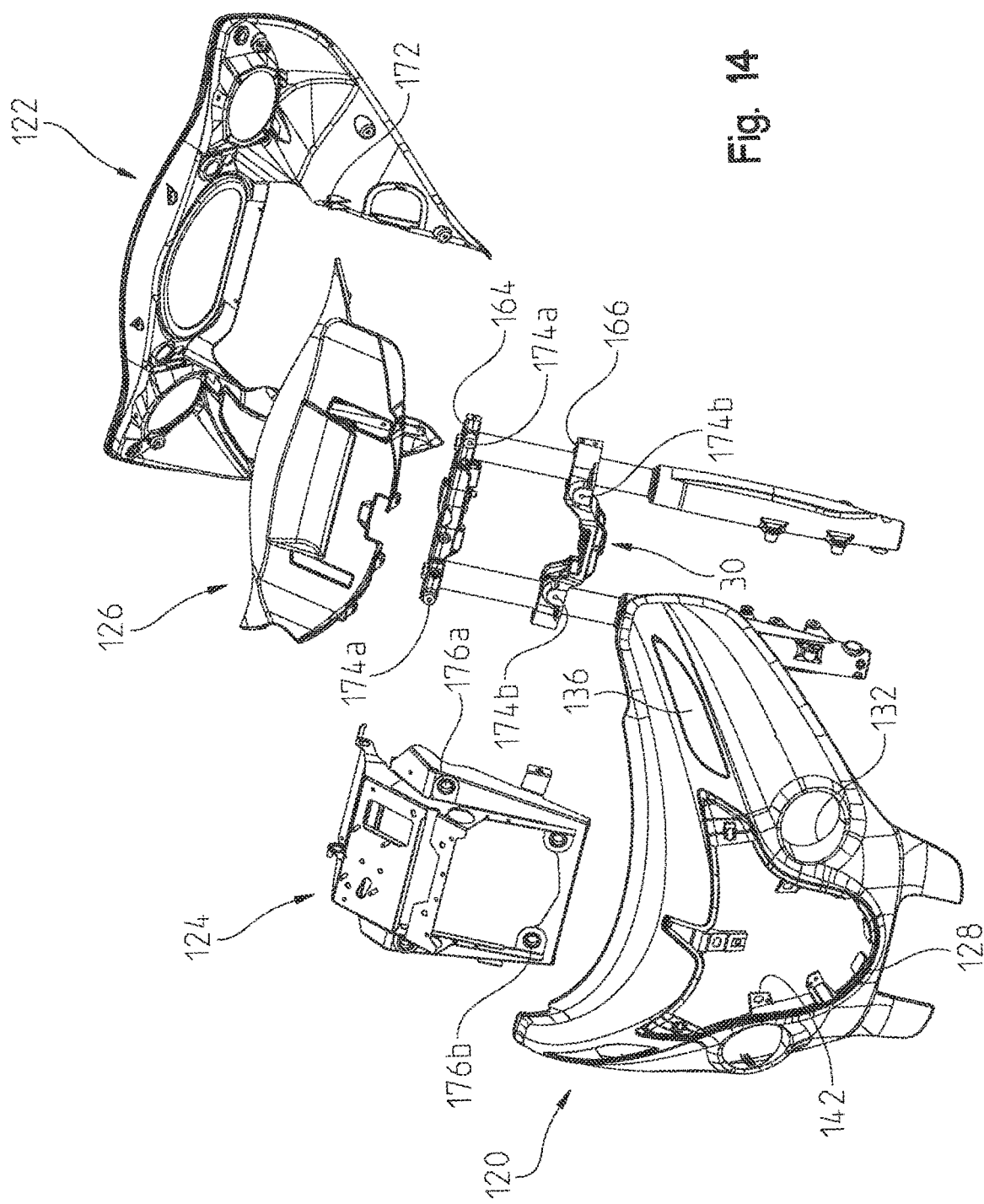
FIG. 14 is a front exploded view of the upper fairing assembly of FIG. 11.

Inner panel 122 also may be coupled to triple clamp assembly 30 through brackets 164 on upper clamp member 76 and brackets 166 on lower clamp member 78. As shown in FIG. 14, brackets 164 on upper clamp member 76 may include at least one aperture. Similarly, brackets 166 on lower clamp member 78 may include at least one aperture. Inner panel 122 may include at least one aperture 172 (FIG. 14) that align with apertures in brackets 164, 166 in order to couple inner panel 122 to triple clamp assembly 30.

Support bracket 124 couples with triple clamp assembly 30. As shown in FIGS. 11-15, triple clamp assembly 30 includes apertures 174 and, illustratively, includes four apertures 174, for coupling triple clamp assembly 30 to support bracket 124. More particularly, upper clamp member 76 includes two apertures 174a and lower clamp member 78 includes two apertures 174b. Support bracket 124 includes apertures 176 and, more particularly, includes four apertures 176. Illustratively, support bracket includes upper apertures 176a that align with apertures 174a, and lower apertures 176b that align with apertures 174b. Conventional fasteners are received through apertures 174, 176 for coupling support bracket 124 to triple clamp assembly 30. Additionally, inner panel 122 is coupled to support bracket 124.

Front fairing 50 is configured to support a plurality of accessories and controls. For example, as shown in FIGS. 11-15 and shown best in FIG. 13, inner panel 122 includes openings or cut-out portions 190 for speakers 192 (FIG. 12), openings 194 for gauges and/or display screens 196, openings 198 for various controls and openings 200 for additional accessories or components. Further controls and accessories may be positioned on handlebars 28, which extend rearwardly from inner panel 122. For example, and as further described herein, controls for a cruise control function may be supported on handlebars 28. Also, a clutch lever 208 is positioned at left-side handlebar 206 and brake lever 210 is positioned at right-side handlebar 204. As such, the various controls for operating motorcycle 2 are easily accessible to the operator.

Both right-side and left-side handlebars 204 and 206 (FIG. 12) include grips 212, 214. Grips 212, 214 may be heated as further described herein.

With reference now to FIGS. 8 and 16-25, the lower fairing 66 will be described in greater detail. With reference first to FIG. 8, lower fairing assembly 66 includes deflectors 220, namely, a left deflector 220A and a right deflector 220B. Lower fairing assembly 66 also includes a lower left vent 222A and a lower right vent 222B. As shown, fairing assembly 66 includes an outer shell portion 230 coupled to an inner shell 232 by way of fasteners. As shown, inner shell 232 includes inner bosses 240, 242 (FIG. 16), which receives clamps for coupling lower fairing assembly 66 to highway bars 62.

Figure 16:
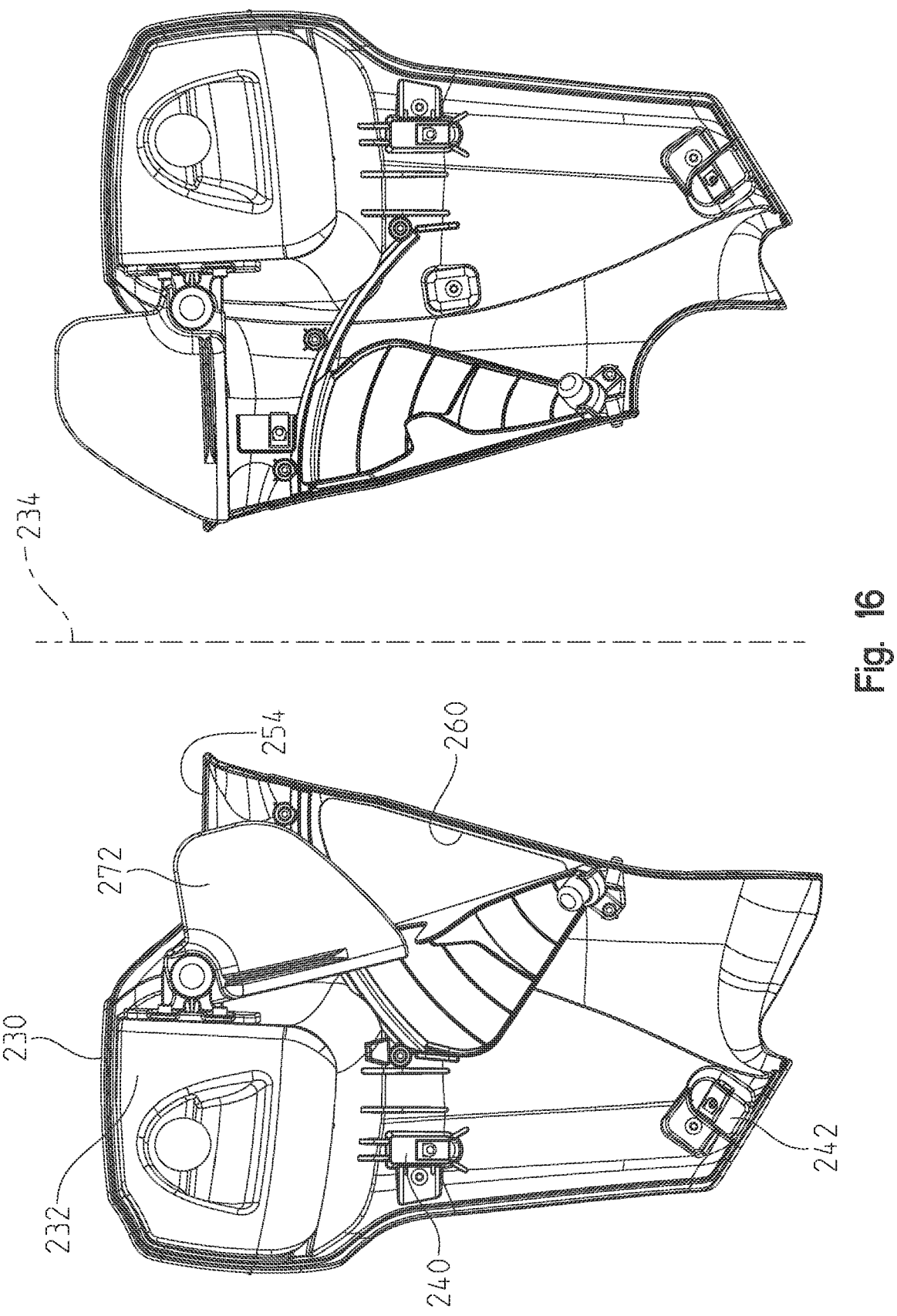
FIG. 16 is a rear view of the left and right side of the lower fairing.
Figure 17:
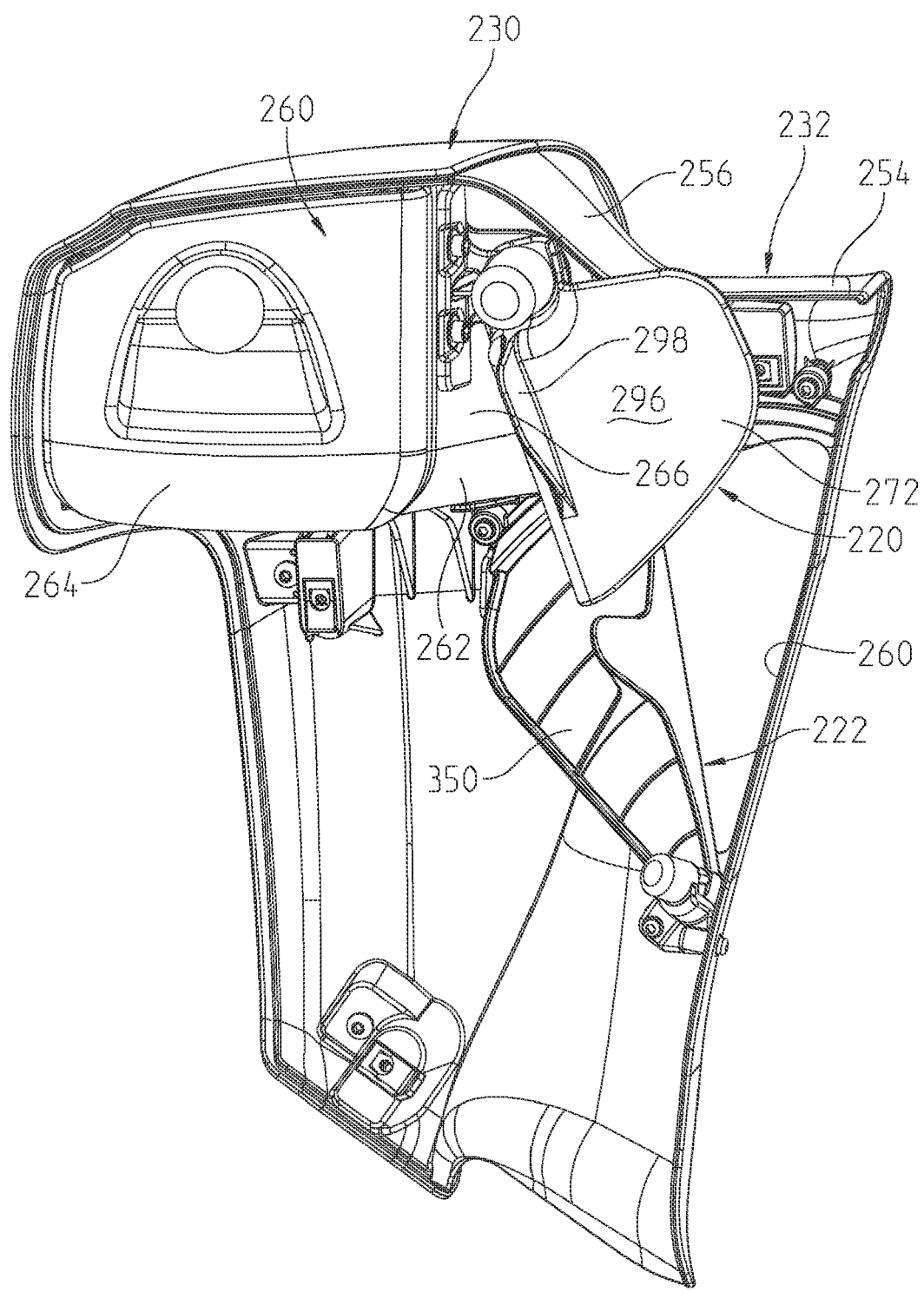
FIG. 17 is a rear perspective view of the left side of the lower fairing with the deflector and vent shown in open positions.
Figure 18:
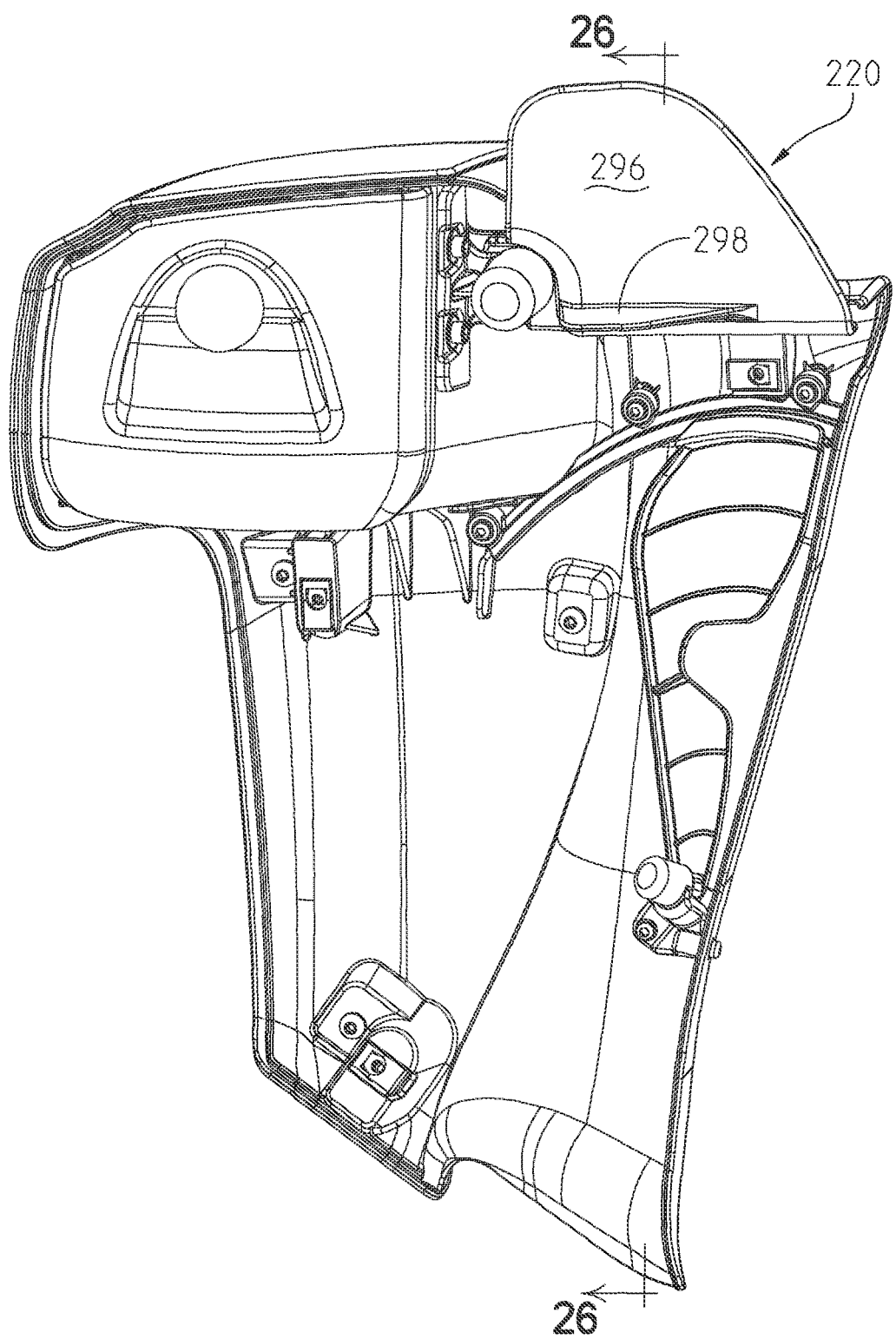
FIG. 18 is a rear perspective view of the left side of the lower fairing with the deflector and vent shown in closed positions.
Figure 19:
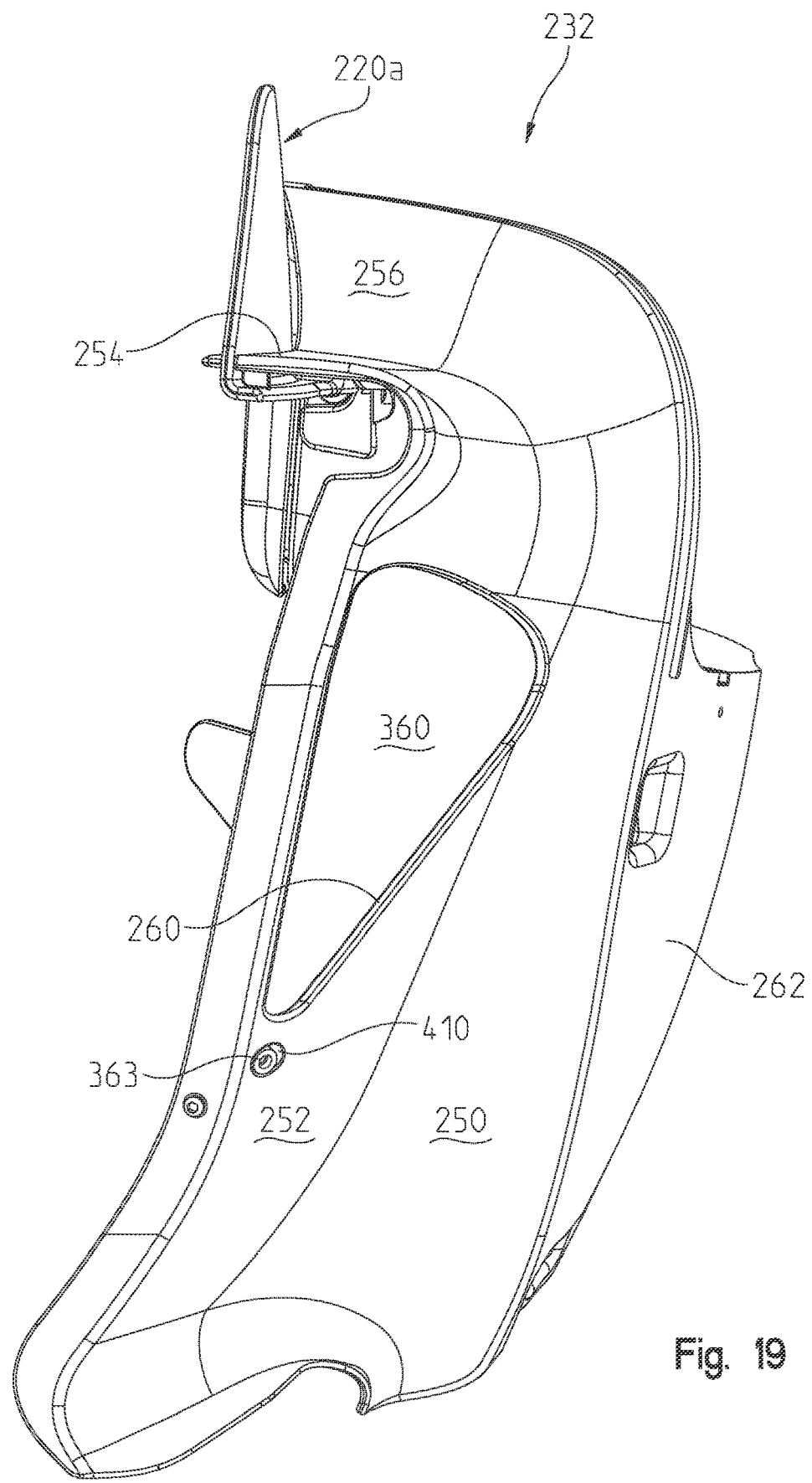
FIG. 19 shows a front perspective view of the left side of the lower fairing showing the contour of an inner portion of the lower fairing.

With reference to FIG. 19, inner shell portion 232 is shown having a front contoured wall 250, which curves inwardly towards the front wheel. The contoured wall 250 leads into a generally planar wall 252, which is generally transverse to a longitudinal axis of the vehicle. Wall 252 leads into a generally horizontally extending wall 254, which can also be seen in FIG. 16. Meanwhile, arcuately shaped wall 252 extends upwardly and defines an angled wall 256 coupled to wall 254, which defines a flow path for air. Vent opening 260 is positioned in and through wall 252 and is approximately at a midpoint of inner portion 232. Inner portion 232 also includes an extension 262 extending from the side thereof to which outer portion 230 may be coupled. As also shown in FIG. 17, inner portion 232 includes an integrated compartment 260 comprising a box portion 262 and an outer hinged cover at 264. Box portion 262 includes sidewall 266 to which deflector assembly 220 is coupled.

Figure 20:
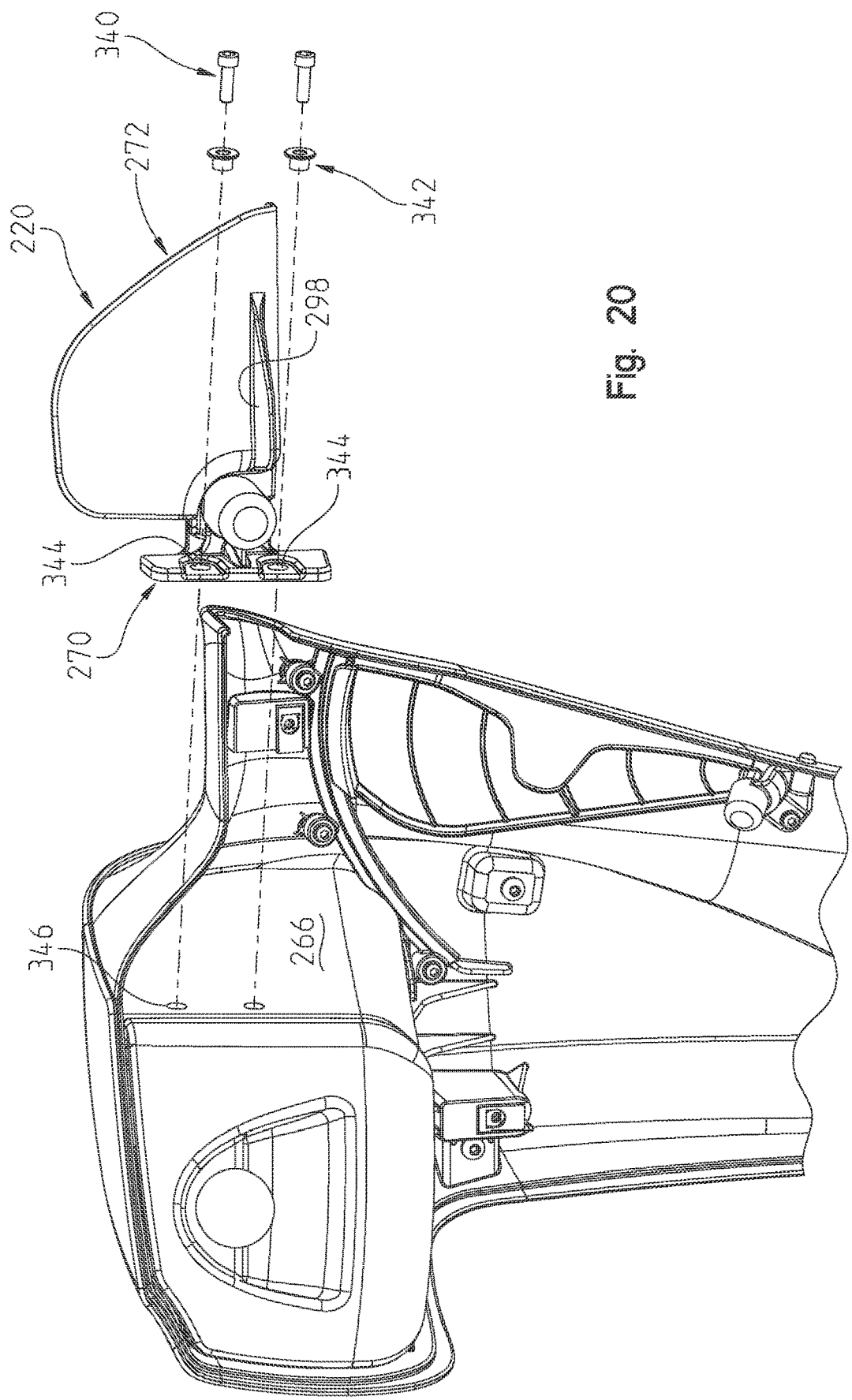
FIG. 20 is a rear perspective view of the left side of the lower fairing with the deflector shown exploded from the lower fairing.
Figure 21:
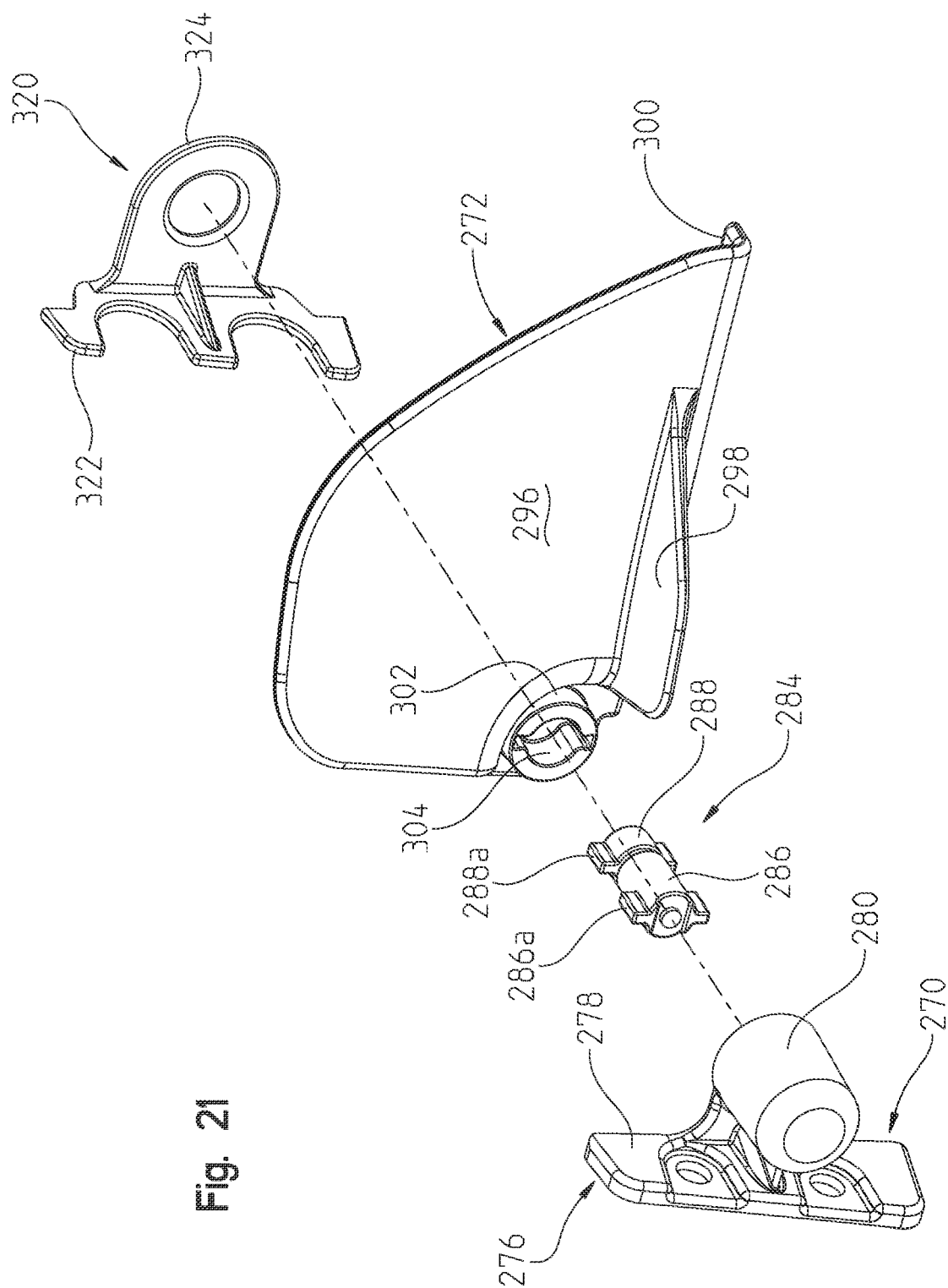
FIG. 21 shows an exploded view of the deflector assembly.
Figure 22:
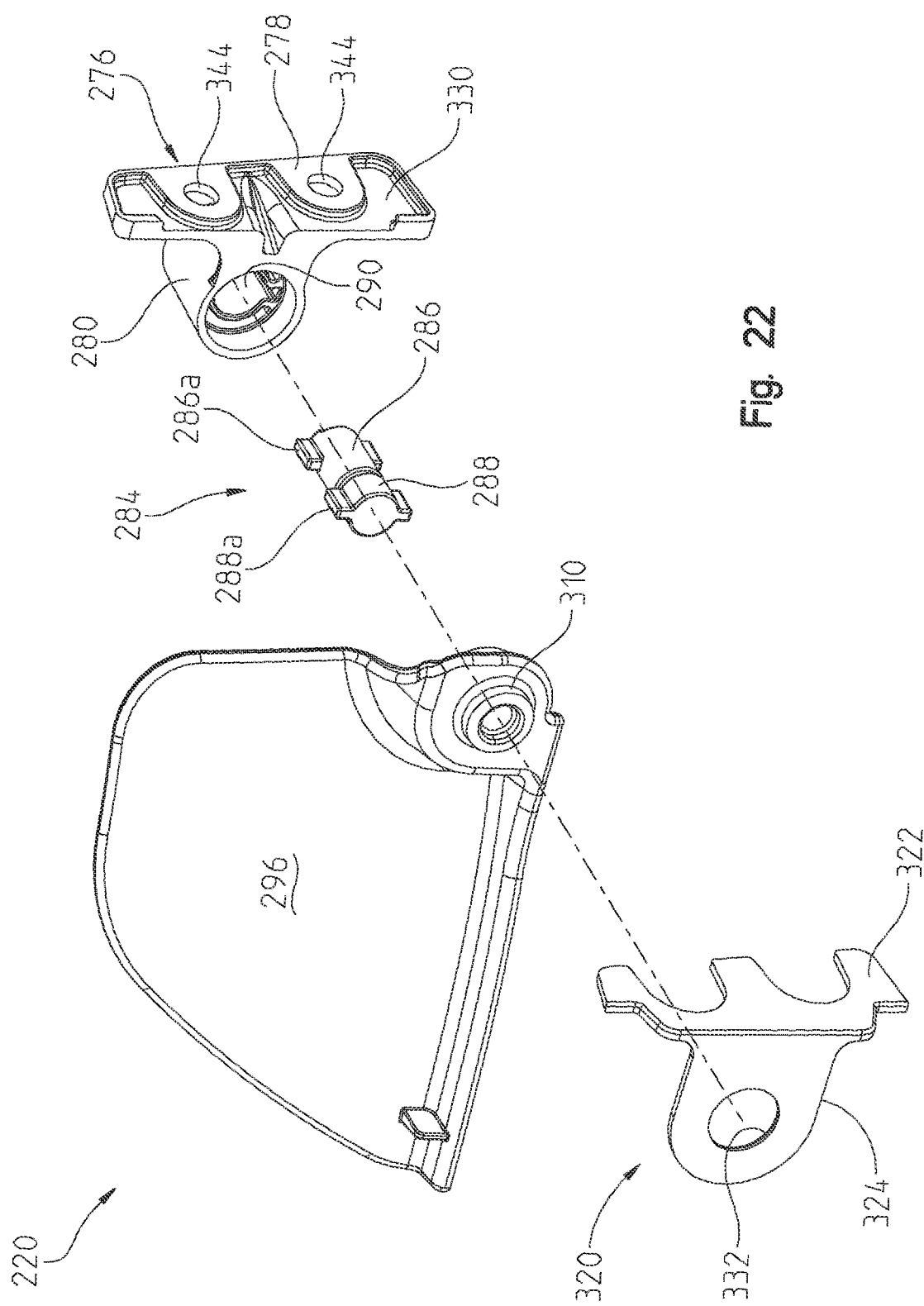
FIG. 22 shows an exploded view of the deflector assembly from an opposite side as that shown in FIG. 21.

With reference now to FIGS. 20 and 21, deflector assembly 220 is shown in greater detail. As shown in FIG. 20, deflector assembly 220 generally includes a flange 270 and a deflector member 272. As shown in FIG. 21, hinge 270 includes hinge portion 276 having a flange 278 supporting a trunnion 280. An axle member 284 is provided having portion 286, 288 being frictionally rotatable relative to each other and have aligning tabs 286A, 288A. As shown best in FIG. 22, trunnion 280 includes an opening 290 profiled to receive portion 286. With reference again to FIG. 21, deflector member 272 includes a deflector plate 296 having a handle 298 coupled directly thereto and a forwardly projecting stop wall 300. An integrated collar 302 is provided having an opening 304 similarly profiled as opening 290 to receive portion 288 of axle member 284. On a backside thereof (and as best shown in FIG. 22), deflector plate 296 includes an integrated boss 310, which is aligned with axle member 284 and with trunnion 280.

Hinge 276 further includes a complimentary hinge portion 320 having a flange portion 322 and an upstanding wall 324. As shown best in FIG. 22, flange portion 278 includes a profiled recess 330, which is profiled to receive flange portion 322; thus the deflector assembly 220 may be assembled by positioning axle member 284 in collar 302 (FIG. 21), placing axle 284 within trunnion 280, placing aperture 332 of flange portion 320 over boss 310 and placing flange portion 322 in profiled recess 330. Fasteners 340 (FIG. 20) and washers 342 are then received through apertures 344 and into threaded openings 346 of sidewall 266. In this manner, an operator can grip the handle 298 and move the deflector from a fully open position as shown in FIG. 17, or rotated upwardly and counterclockwise to the fully closed position shown in FIG. 18.

Figure 23:
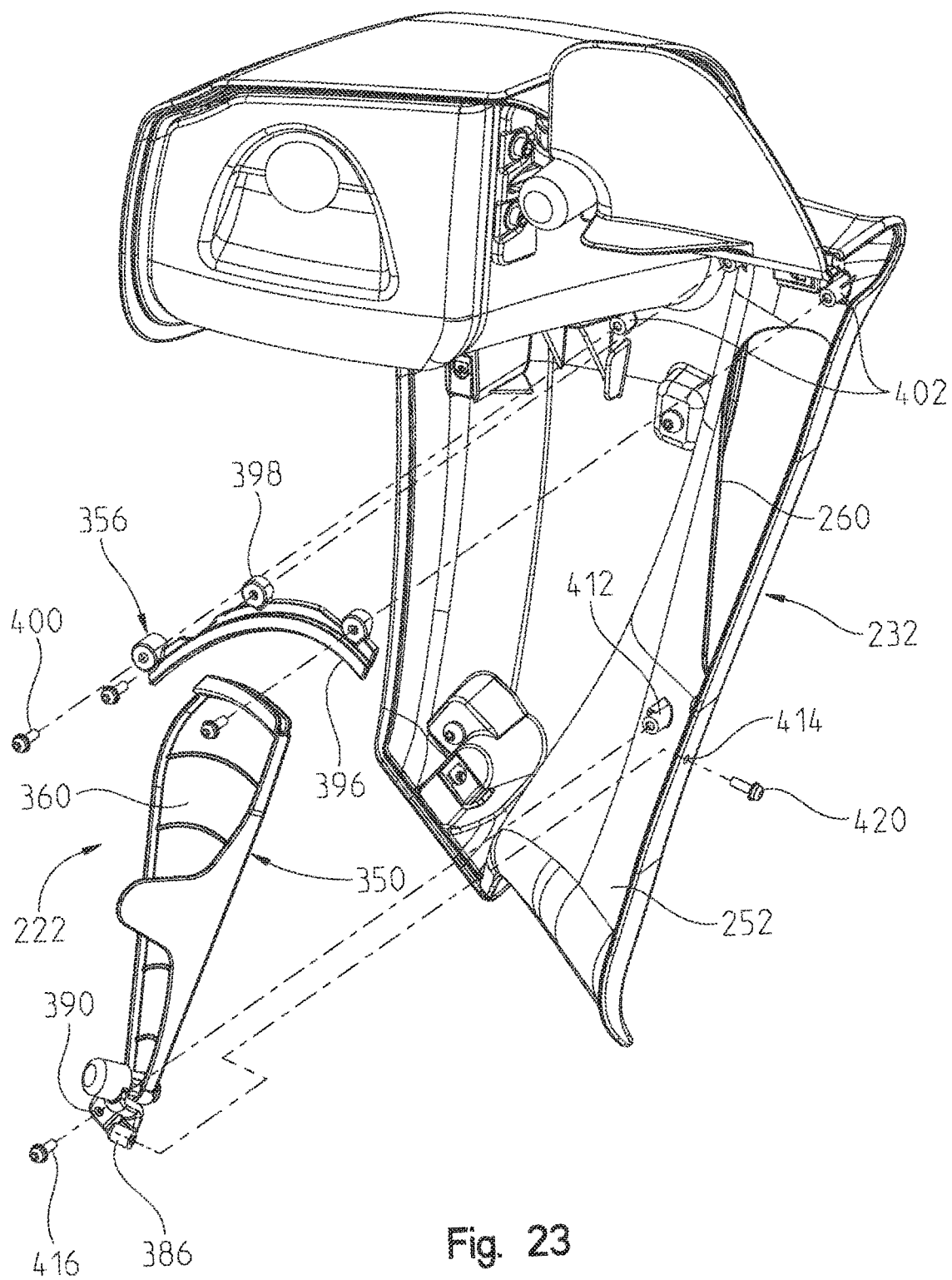
FIG. 23 shows a rear perspective view showing the vent assembly exploded from the left side of the lower fairing.
Figure 24:
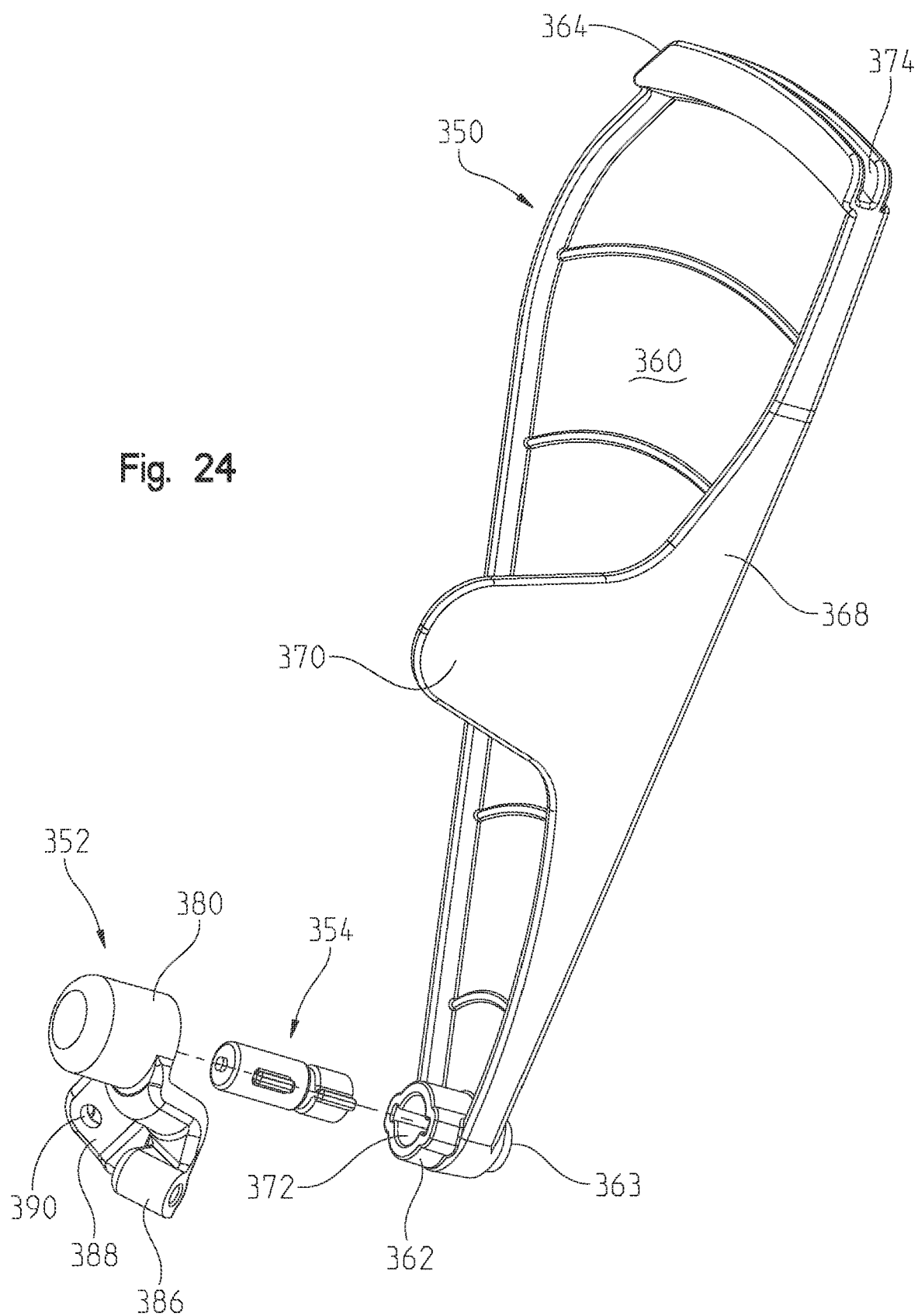
FIG. 24 shows an exploded view of the vent assembly.
Figure 25:
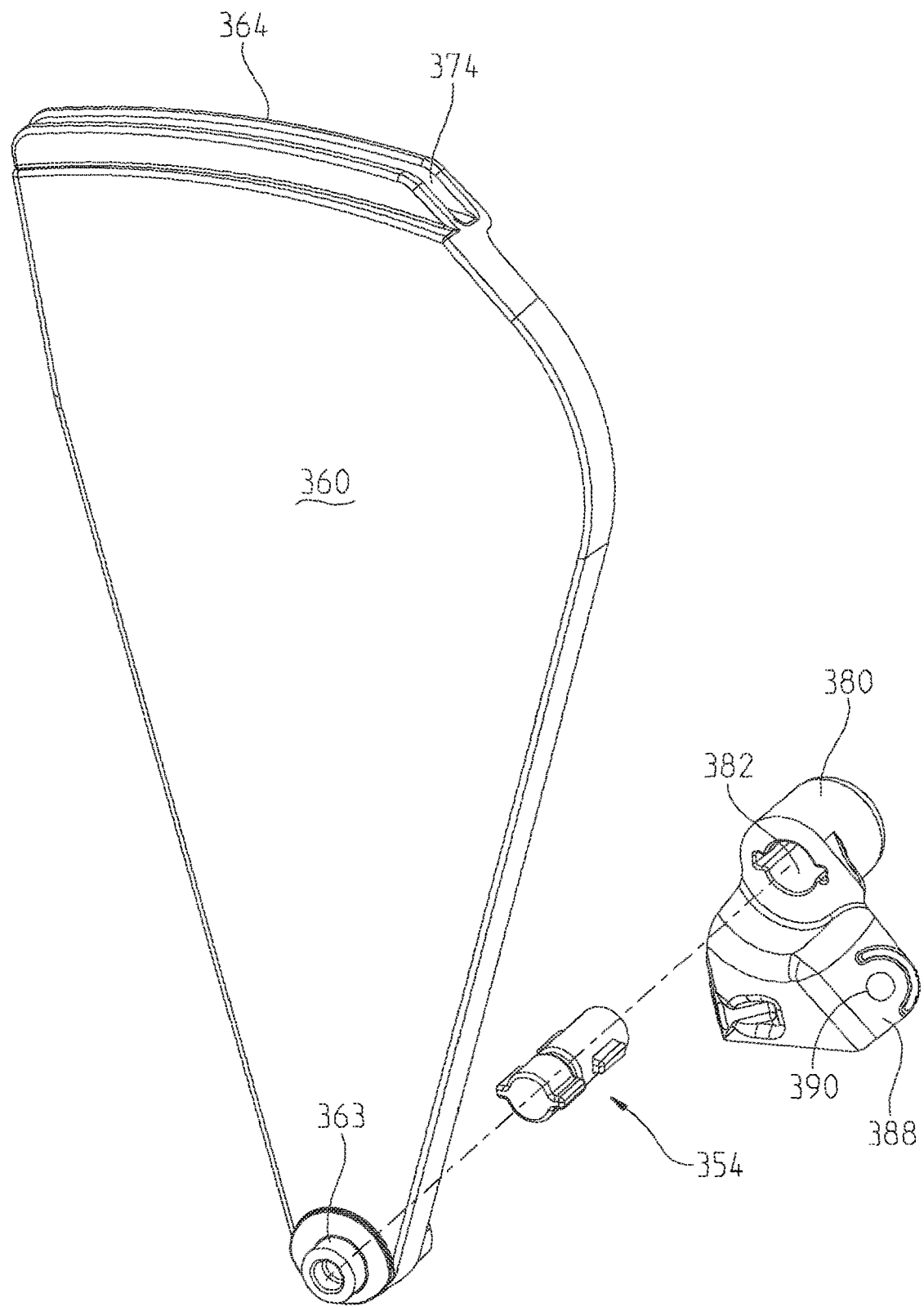
FIG. 25 shows an exploded view of the vent assembly from an opposite side as that shown in FIG. 24.

With reference now to FIGS. 23-25, vent assembly 222 will be described in greater detail. As shown best in FIG. 23, vent assembly 222 may be coupled to an inside of wall 252 and cover opening 260. As shown, vent assembly 222 includes a vent member 350, flange member 352 (FIG. 24), axle 354, and guide 356. As shown, vent member 350 includes a vent plate 360 having a coupling 362 and a boss 363 at a lower end, and a guide 364 at an upper end. Vent member 350 further includes a marginal wall at 368 having a handle 370 for an operator to grip. As shown, coupling 362 includes an opening 372, which is substantially similar as opening 304 as described with reference to FIG. 21. Guide 364 is positioned at an upper end of guide member 350 and includes a guide slot 374. Flange member 352 includes a trunnion 380 having an opening 382 (FIG. 25) for receipt of axle 354. Flange member 352 further includes a threaded boss 386 and flange member 388 having an aperture 390. As shown best in FIG. 23, slide 356 includes a curved guide member 396 coupled to bosses 398. It should be appreciated that guide member 396 is arcuately configured and is receivable in slide 374.

Thus to assembly vent assembly 222 to the lower fairing 66, axle 354 is positioned in opening 372 (FIG. 24, 25) and axle 354 is positioned in trunnion 380. Guide member 356 is coupled to the inner member 232 by way of fasteners 400 being received through bosses 398 into threaded bosses 402 (FIG. 23). Vent assembly 222 is thereafter positionable on an inside of inner member 232 with slot 374 overlying guide member 396. Boss 363 is thereafter receivable in an aperture 410 (FIG. 19) of inner member 232. This also positions flange portion 388 (FIG. 24) adjacent to boss 412 (FIG. 23) and boss 386 adjacent to aperture 414. Thus a fastener 416 is receivable through aperture 390 and into threaded boss 412, whereas fastener 420 is receivable through aperture 414 and into threaded boss 386. It should be appreciated then that the vent member 350 is slidable in a plane and is moveable between the positions shown in FIG. 17 (open position) and FIG. 18 (closed position).

Thus, operation of the deflector assembly 220 and vent assembly 222 will be described in relation to FIG. 8 and FIGS. 16-26. As shown in FIG. 8, upper fairing 50 and lower fairing 66 work in combination with each other to provide the airflow around the motorcycle 2. As shown in FIG. 8, upper fairing 50 has a width equal to a distance D1, which is substantially the same as the width of lower fairing 66, labeled D2. Upper fairing 50 and lower fairing 66, define intersecting points, whereby the distance between the intersecting points is labeled D3. The maximum distance between the outer edges of the deflectors 272 is distance D4. As shown, D2 is greater than D3 and D4 is greater than D3. Also, D1 is substantially equal to D2.

Figure 26:
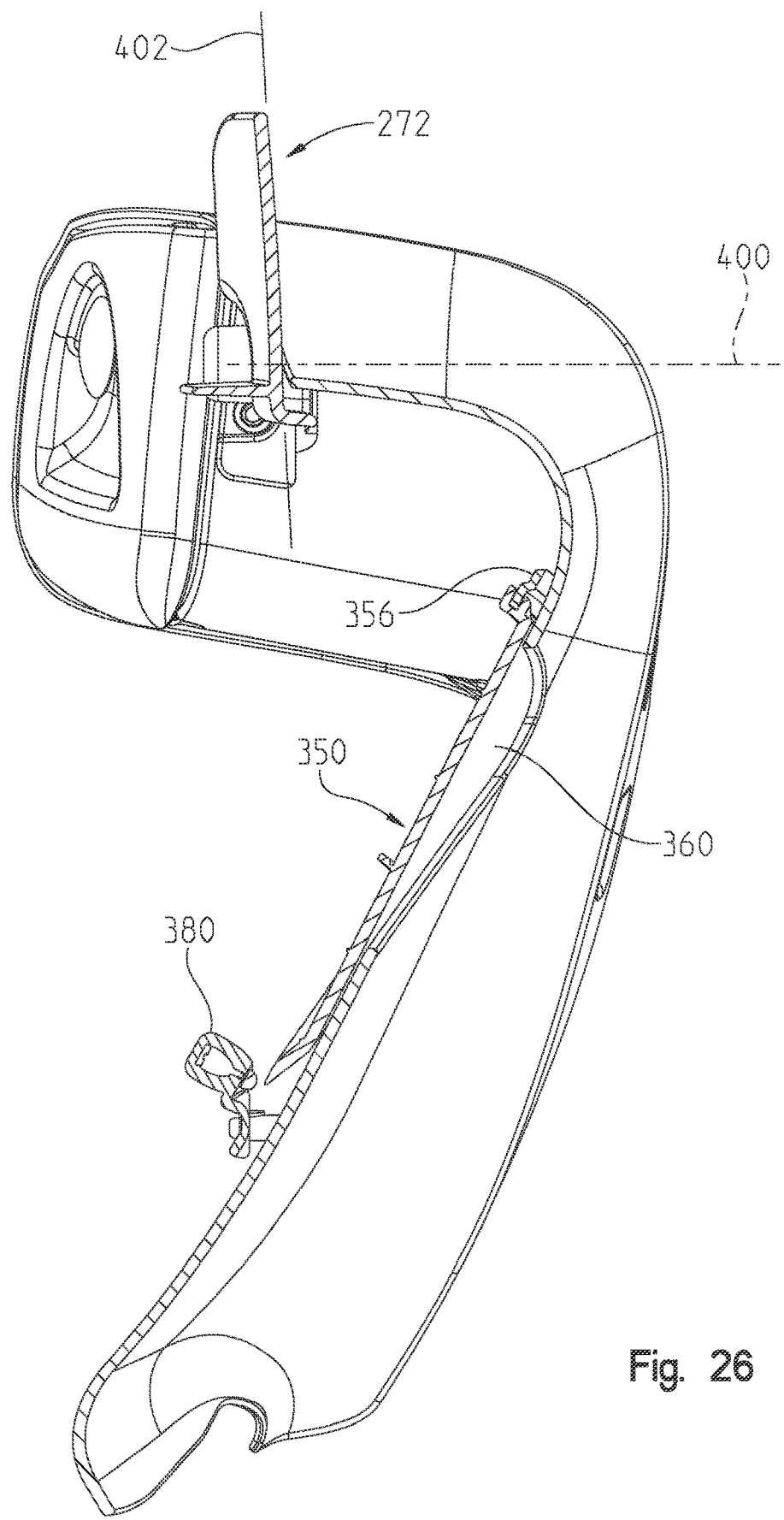
FIG. 26 is a cross-sectional view through lines 26-26 of FIG. 18.

As shown best in FIG. 26, the deflector member 272 is coupled about axis 400, which is generally longitudinally directed relative to the vehicle. Furthermore, deflector 272 rotates in a plane 402, which is generally transverse to the vehicle direction. Because the vent member 350 is angled slightly relative to a longitudinal direction, that is trunnion 380 is located rearward of guide 356, a substantial amount of volume is located rearward of guide 356 and below deflector member 272, as best shown in FIG. 26. Thus, as shown in FIGS. 16 and 17, the deflector plate 272 can rotate downwardly to the fully opened position and not conflict with the operation of vent member 350. Alternatively or in addition, a vent assembly 222 could also be incorporated into the upper fairing 50.

Figure 27:
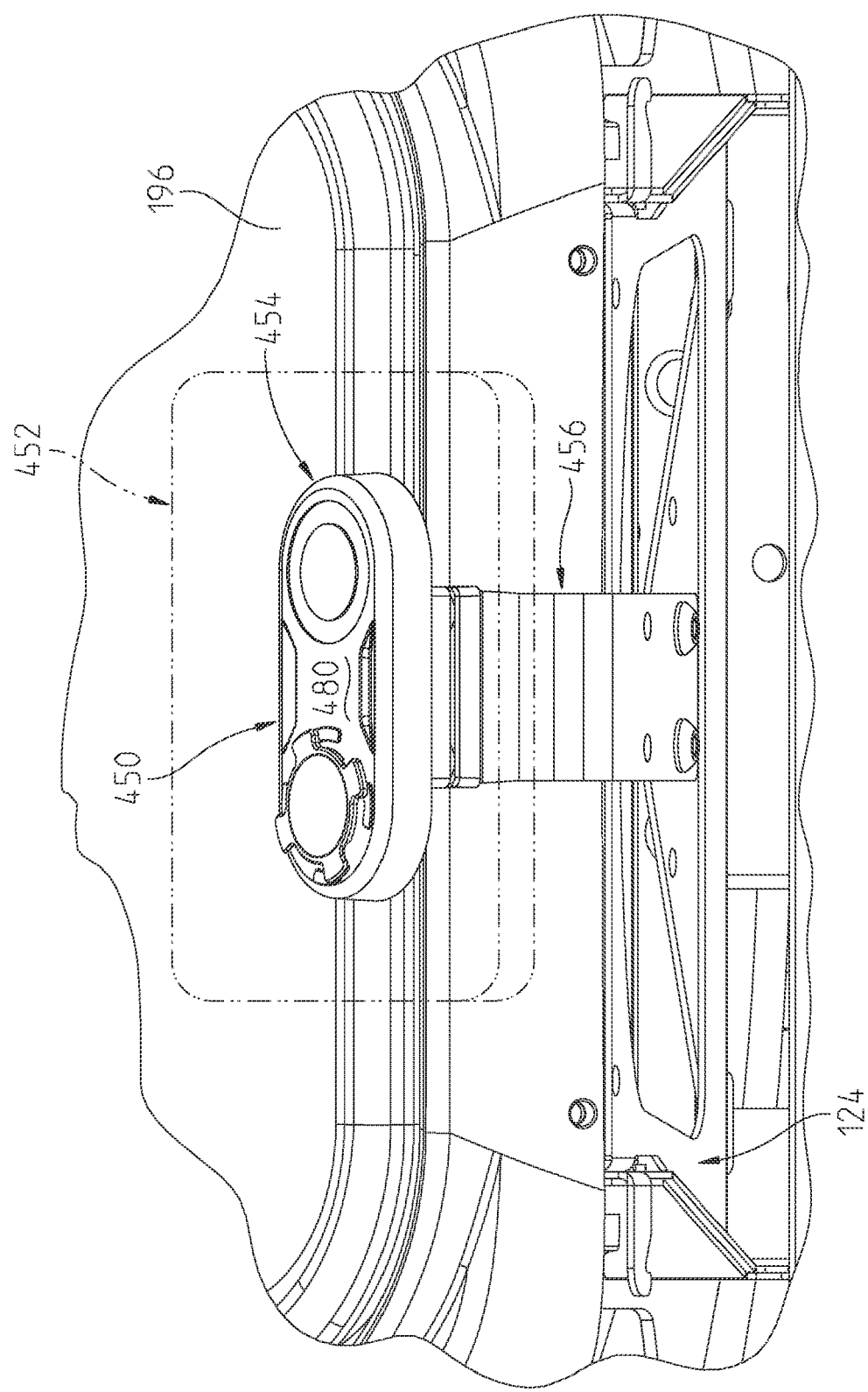
FIG. 27 is a perspective view of an accessory phone holder.
Figure 28:
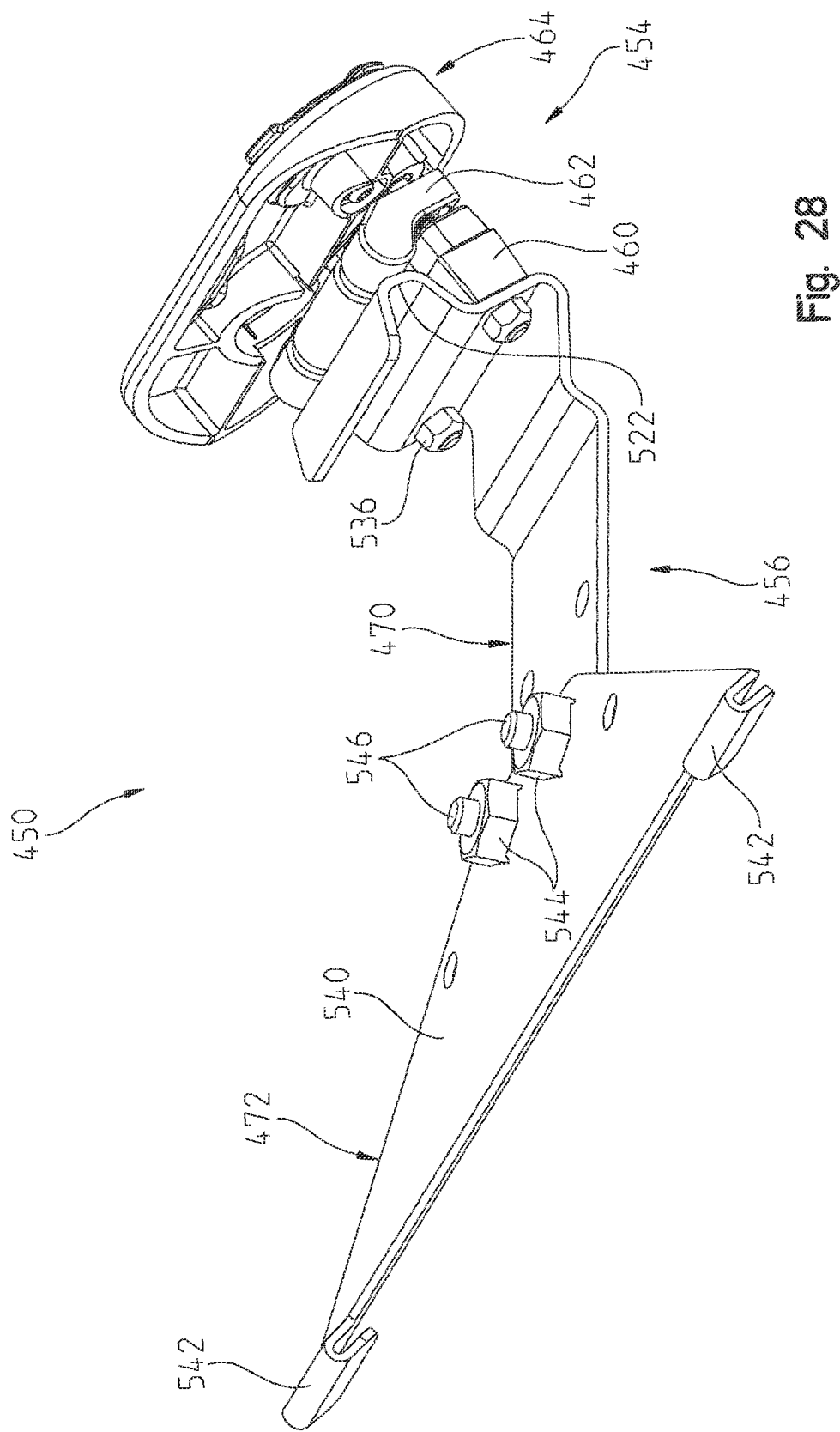
FIG. 28 shows a rear perspective view of the phone holder.
Figure 29:
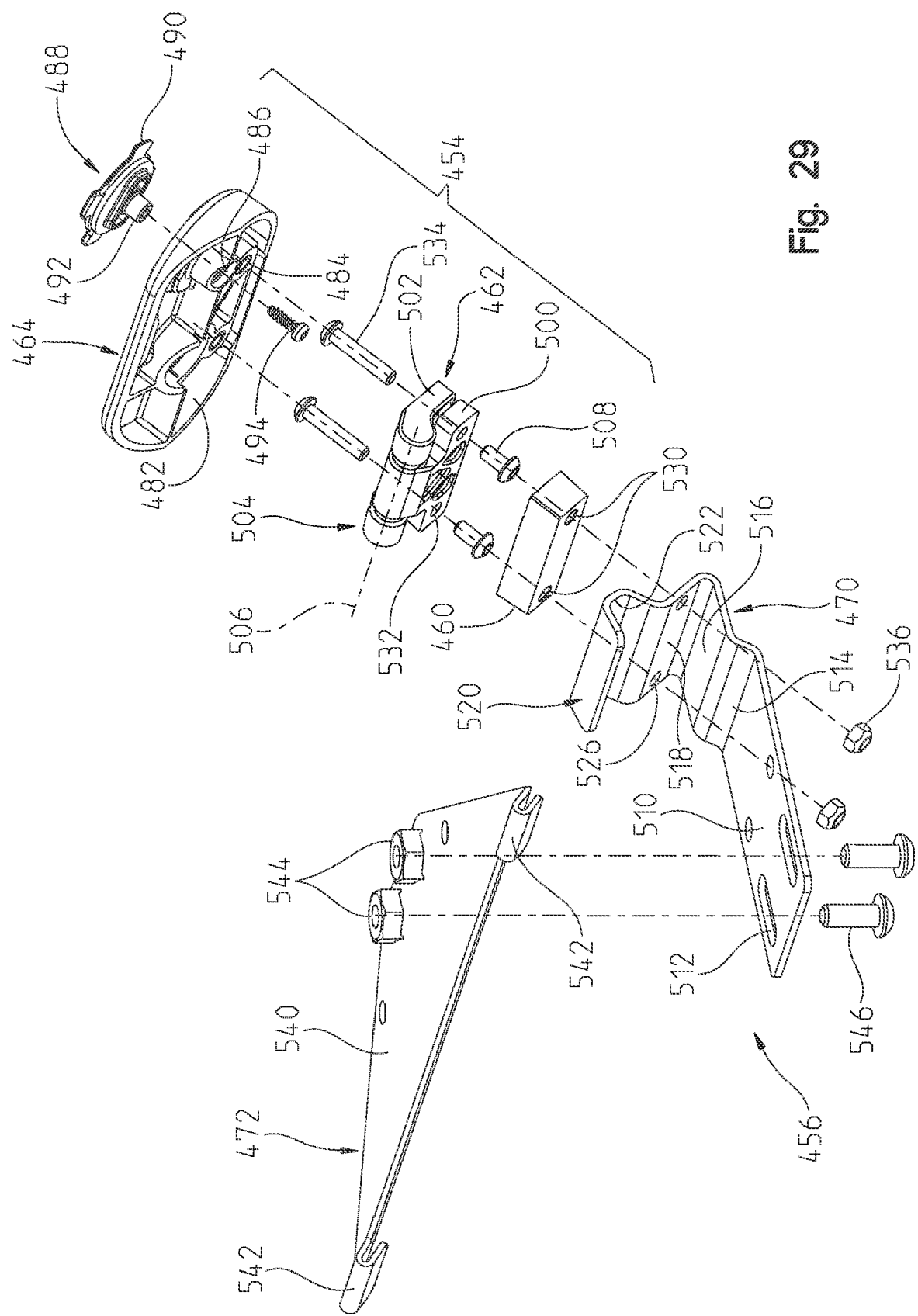
FIG. 29 is a perspective view similar to that of FIG. 28, showing the components exploded away from each other.

With reference now to FIGS. 27-32, an accessory phone holder will be described. With reference first to FIG. 27, a phone holder is shown generally at 450, which is used to couple a rider's phone or like-sized object (a smartphone or a GPS unit), shown generally at 452 in phantom, the phone holder 450 generally includes a phone retaining portion 454 and a bracket assembly 456. As shown best in FIGS. 28-29, phone retaining portion 454 generally includes a spacer 460, a friction hinge 462, and a base portion 464. Meanwhile the bracket assembly 456 includes a front bracket portion 470 and a rear bracket portion 472. With reference still to FIGS. 27 and 29, base portion 464 includes a front face 480 and an underside 482. Underside 482 includes threaded bosses 484 and aperture 486. Retaining portion 454 further includes a locking wheel 488 having locking tabs 490 and a threaded boss 492 (FIG. 29). Locking wheel 488 is coupled to the base 464 by way of fastener 494 in boss 492. Locking wheel 488 is profiled to receive a mountable case from Rokform, LLC available at www.rokform.com.

As shown best in FIG. 29, friction hinge 462 includes a lower hinge portion 500, an upper hinge portion 502, and a hinged portion 504, allowing hinge portion 500 and 502 to pivot about axis 506. This allows base 464 to be adjusted to move the phone relative to the motorcycle 2. Hinge portion 504 includes apertures 507 (FIG. 32), which are in alignment with threaded bosses 484 (FIG. 29) and fasteners 508 are provided to mount base portion 464 to upper hinge portion 502.

Front bracket portion 470 includes an extension portion 510 having slots at 512. Extension portion 510 is continuous with a radius portion 514, which leads into a v-shaped wall defined by wall portions 516 and 518. A gripping portion 520 extends from wall portion 518 defining an inner gripping surface at 522. Wall 518 also includes apertures 526. It should be appreciated that lower hinge portion 500 may be coupled to wall 518 by positioning fasteners 534 through apertures 532 and through apertures 530 of spacer 560. This positions fasteners 534 through apertures 526 wherein fasteners 536 may be coupled to fasteners 534. This couples base portion 464 and hinge 462 to the front bracket portion 470.

Rear bracket portion 472 includes a plate member 540 having gripping fingers 542 at a rear edge thereof and fasteners 544 at a leading edge thereof. Preferably fasteners 544 are coupled to the plate 540, for example by spot welding and would align with an aperture through the plate 540. This would allow fasteners 546 to be received through slots 512 and into threaded engagement with fasteners 544.

Figure 13:
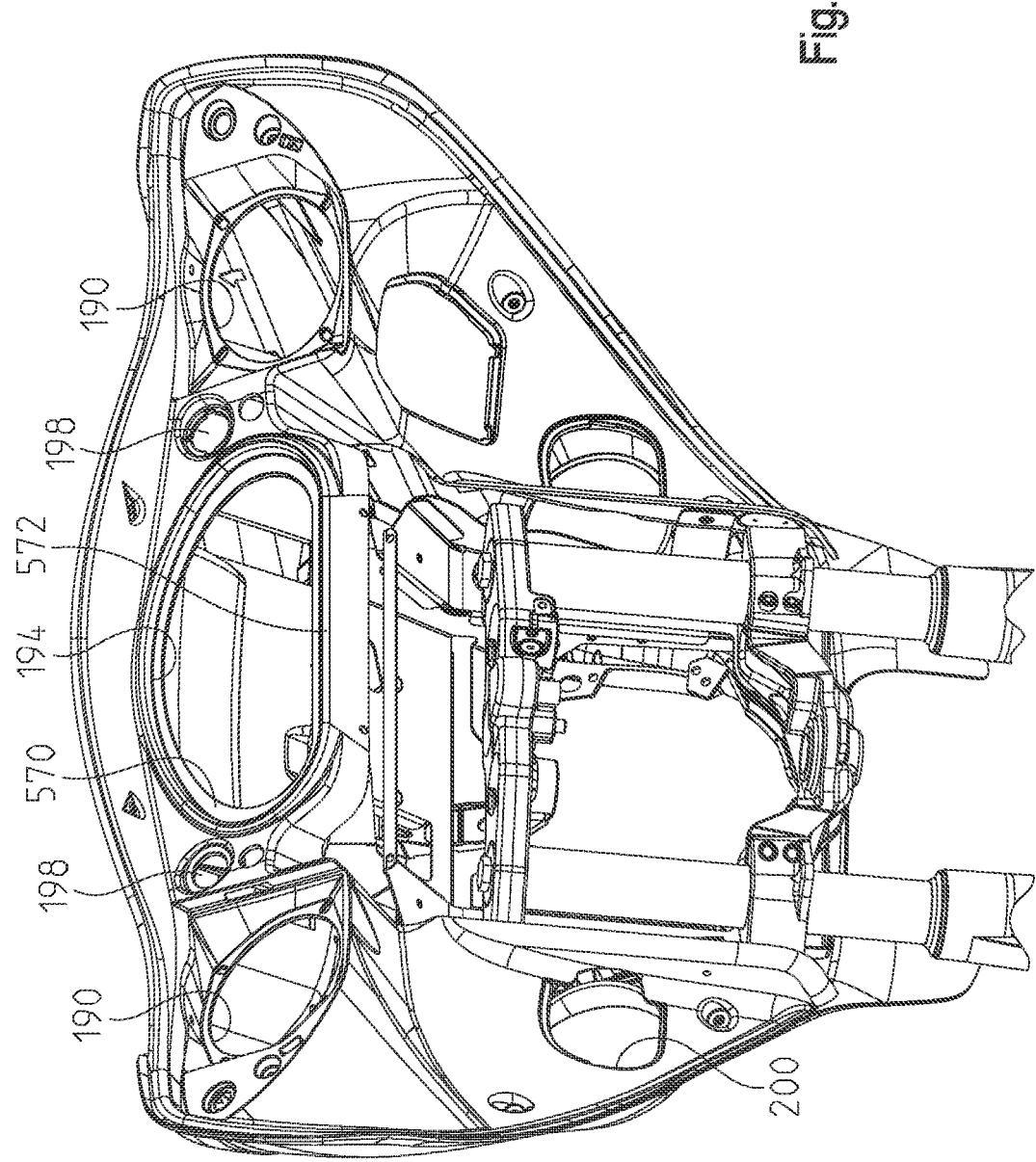
FIG. 13 is a is a rear perspective view of the upper fairing of FIG. 11.
Figure 30:
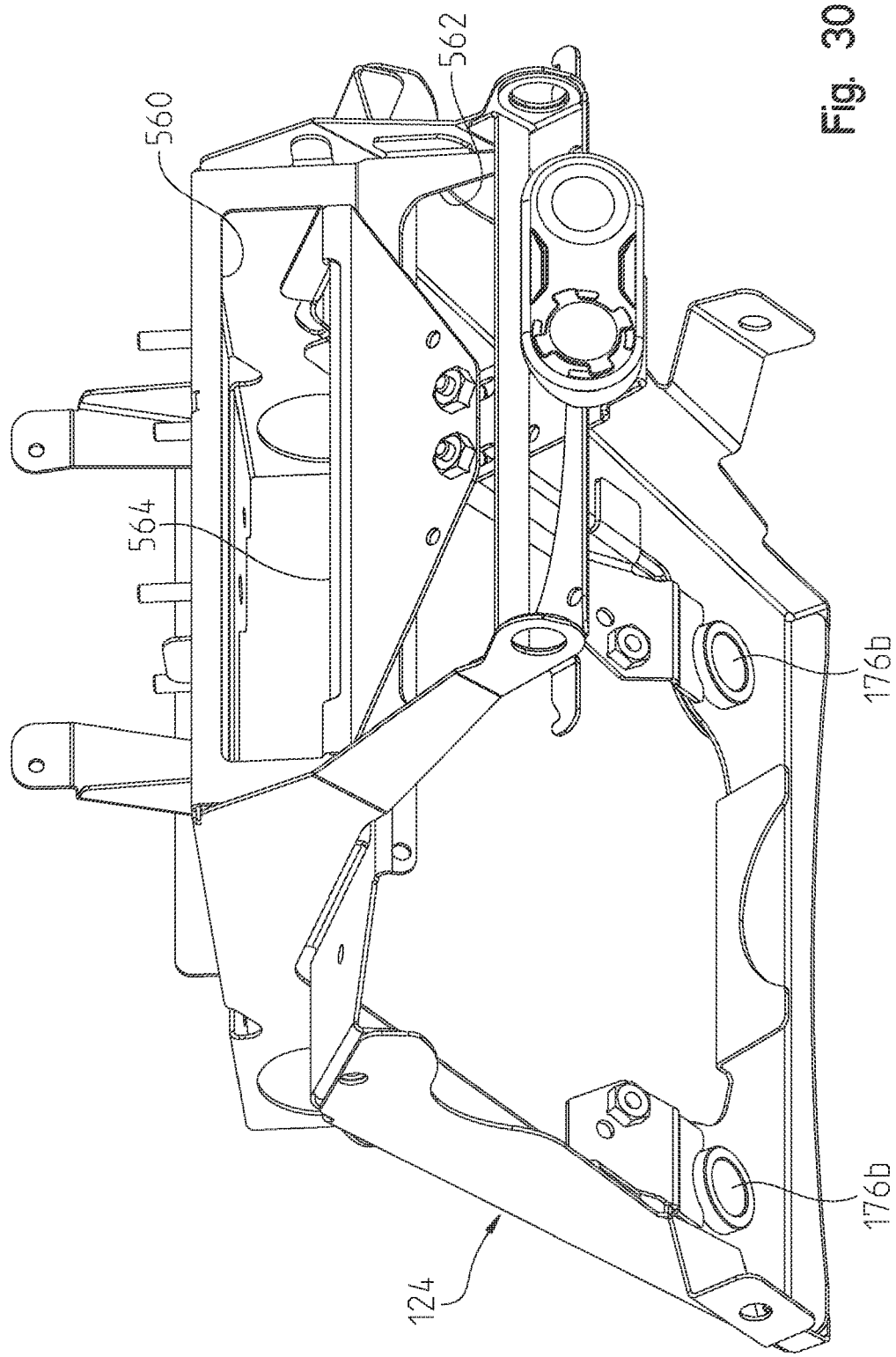
FIG. 30 shows the phone holder coupled to the upper fairing bracket.
Figure 31:
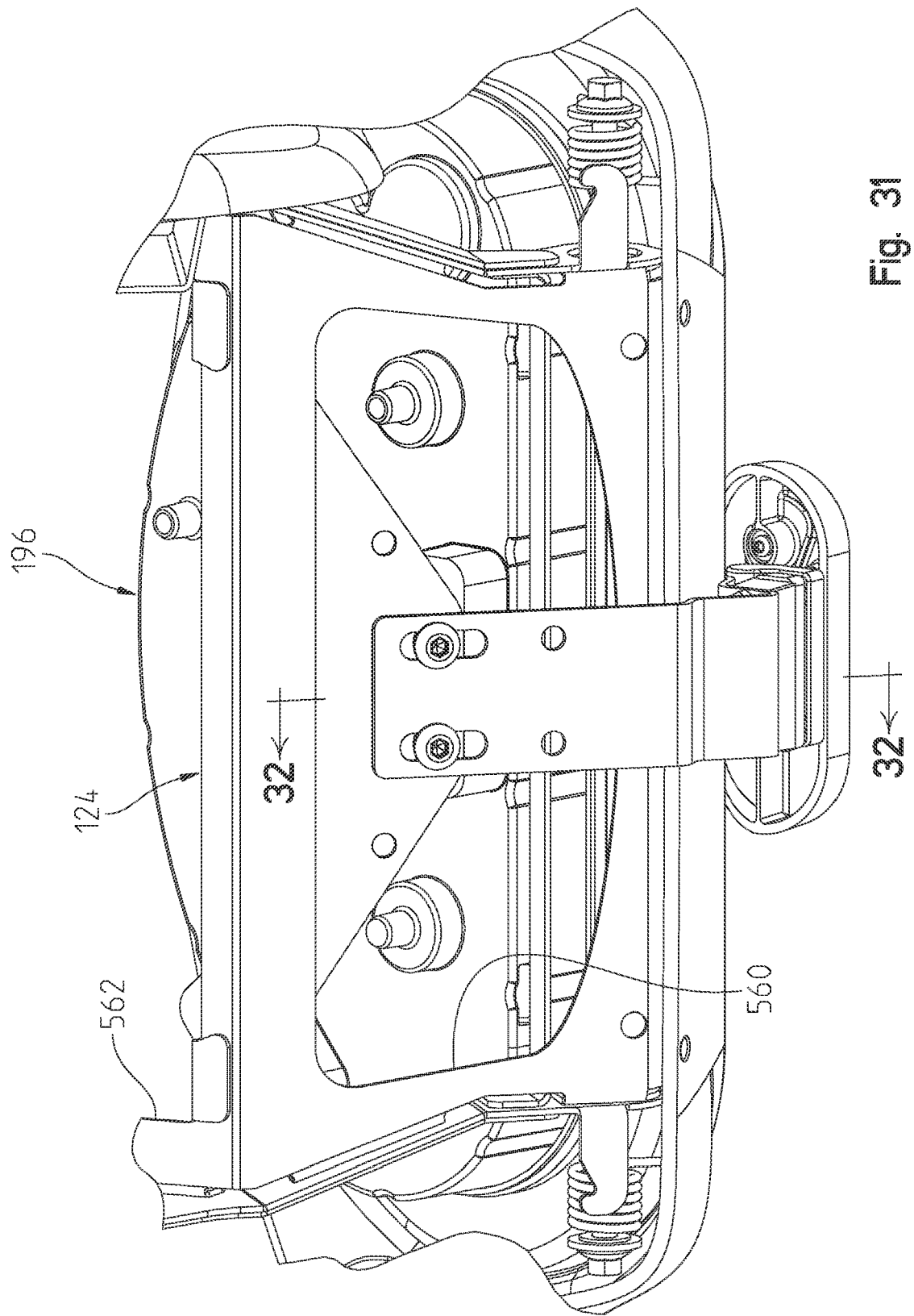
FIG. 31 is an underside perspective view of the phone holder mounted in position.
Figure 32:
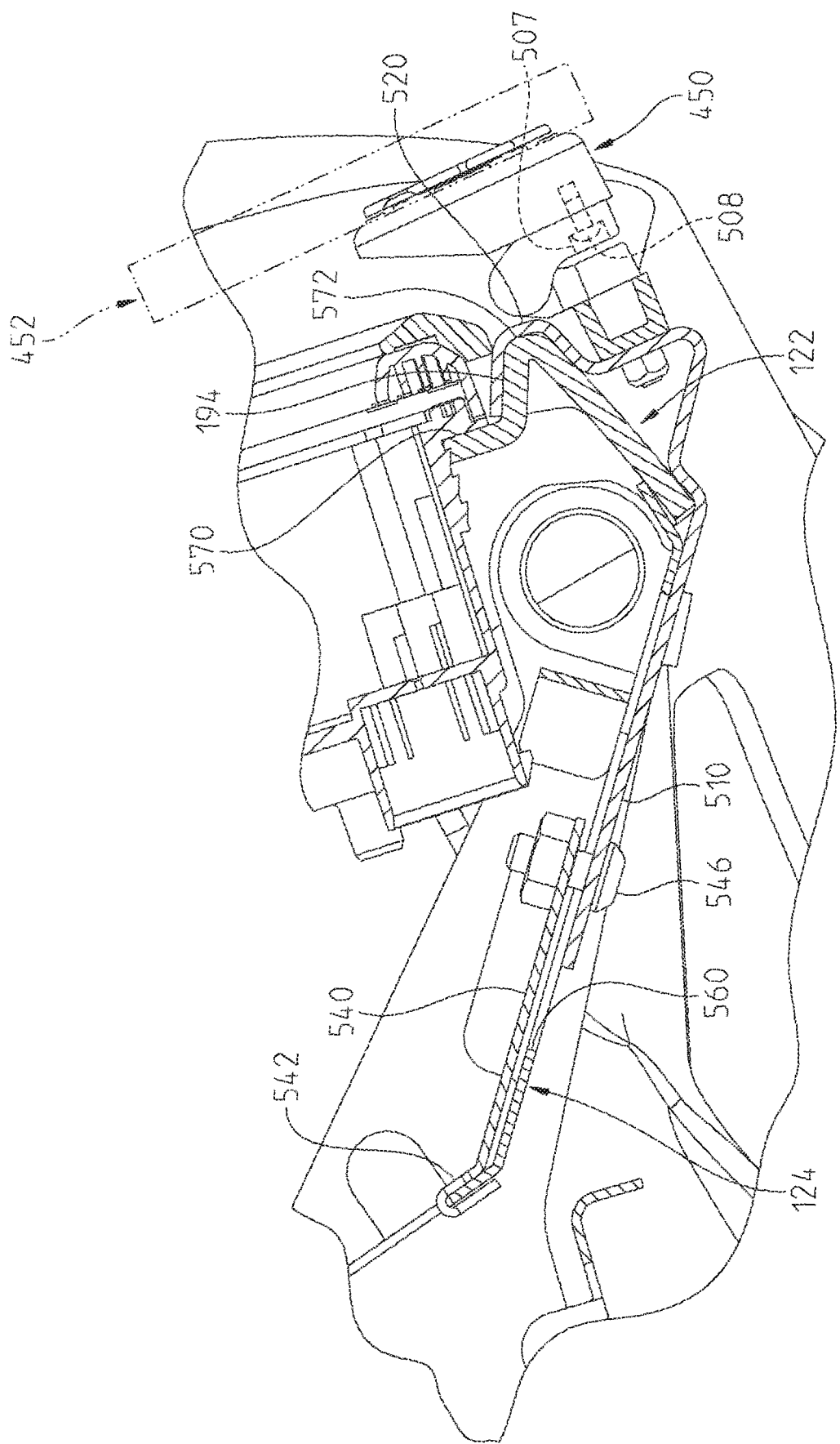
FIG. 32 is a cross-sectional view through lines 32-32 of FIG. 31.

With reference now to FIGS. 30-32, the assembly of phone holder 450 will be described. As shown best in FIG. 30, bracket 124 is shown having openings 560 (opening 560 may also be viewed in FIG. 15) and 562 therethrough. Opening 560 defines a gripping edge at 564. Gripping fingers 542 are then received over gripping edge 564. As shown in FIG. 13, opening 194 further includes a shoulder 570 and a front lip 572, which define mounting surfaces described herein. This allows gripping portion 520 to be received over lip 572 as best shown in FIG. 32.

When in the position shown in FIG. 32, fastener 546 may now be drawn tight, which pulls the extension portion 510 and plate portion 540 towards each other. As shown in this position, plate portion 540 is slightly angled relative to extension portion 510 and thus tightening fasteners 546 causes a tension gripping affect between gripping members 520 and 542; as well as, a torqued affect at gripping members 542.

Figure 33:
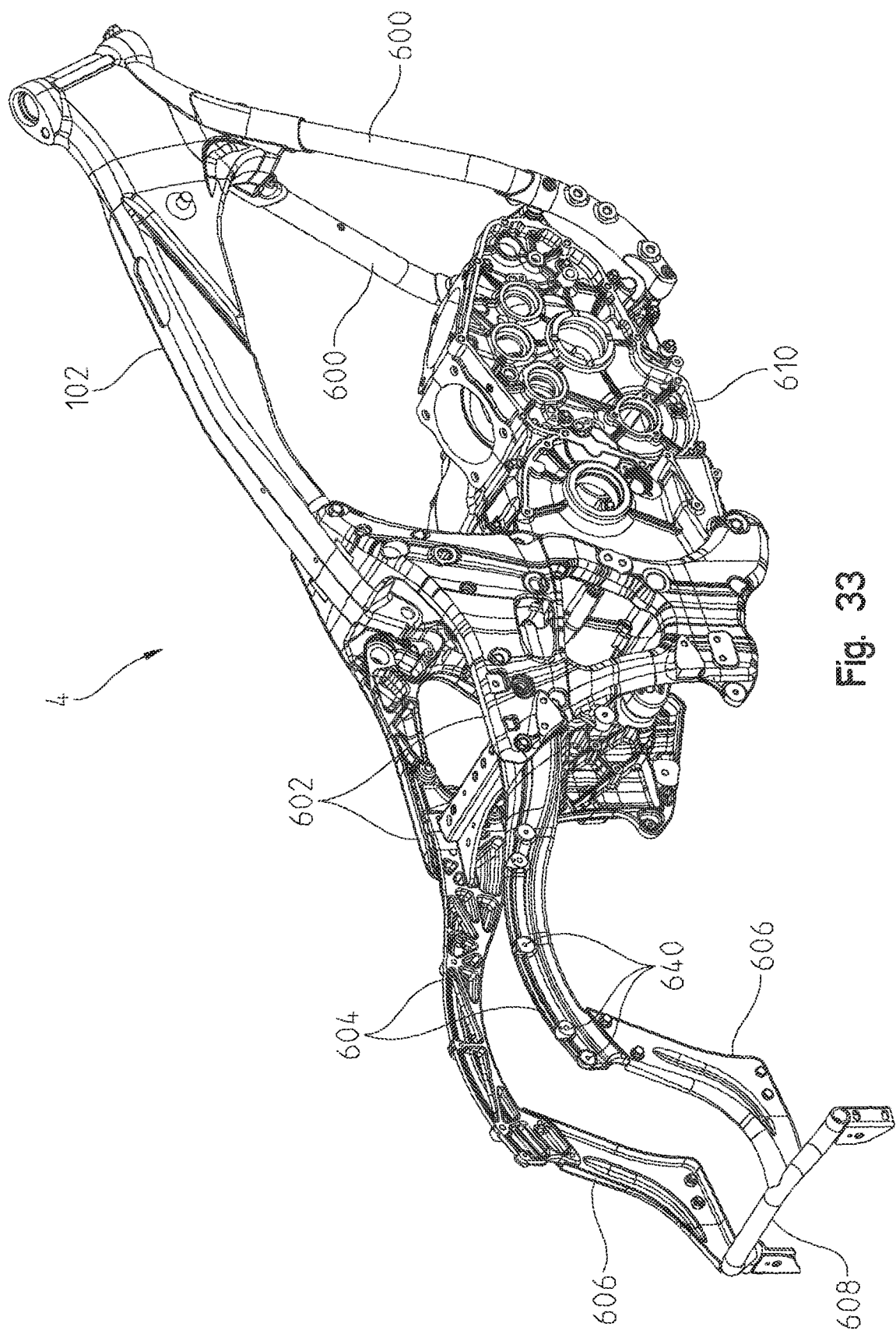
FIG. 33 shows a right rear perspective view of the frame of the motorcycle of FIG. 1.
Figure 34:
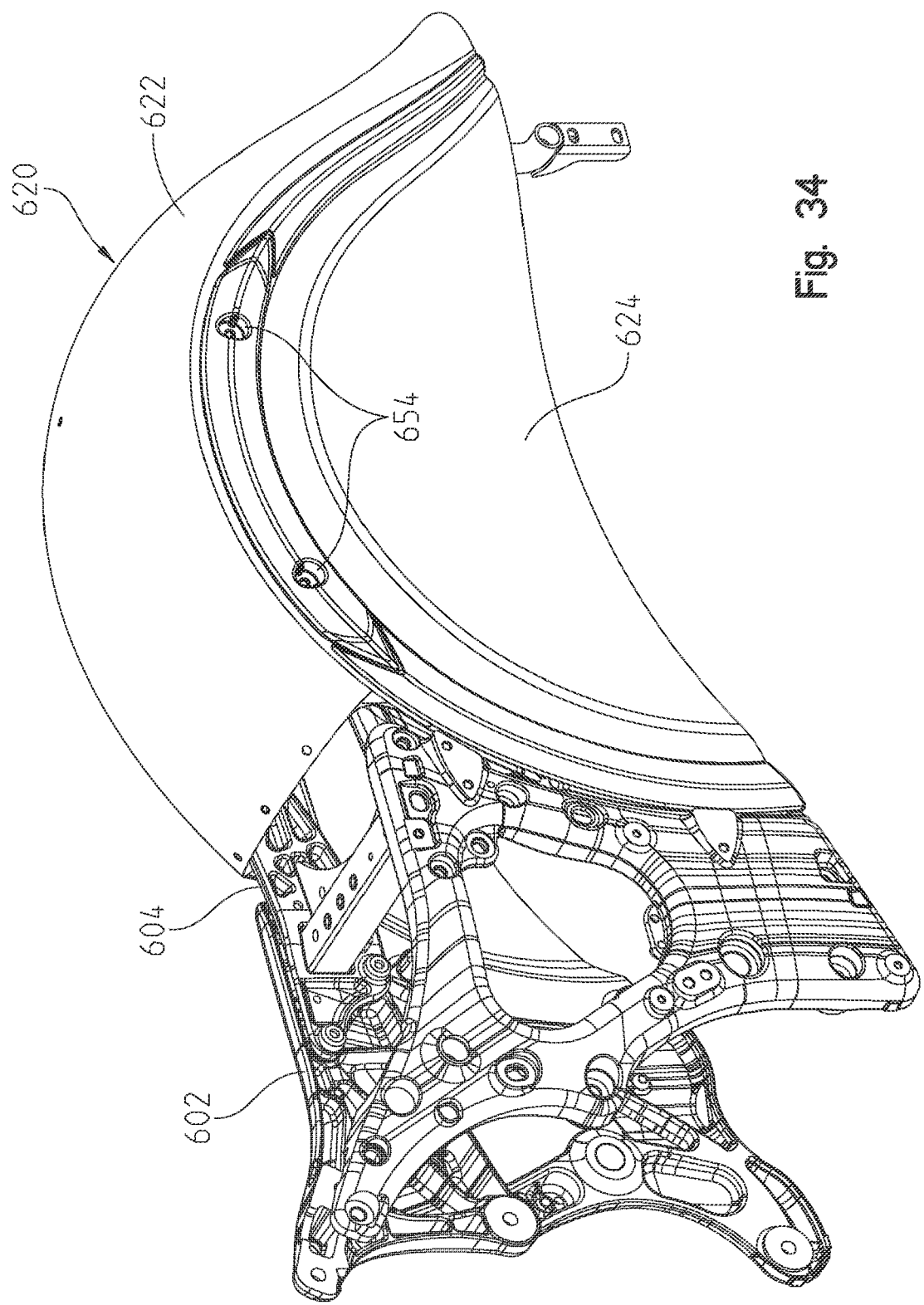
FIG. 34 shows a rear portion of the frame of FIG. 33 and a fender assembly coupled to the frame.
Figure 35:
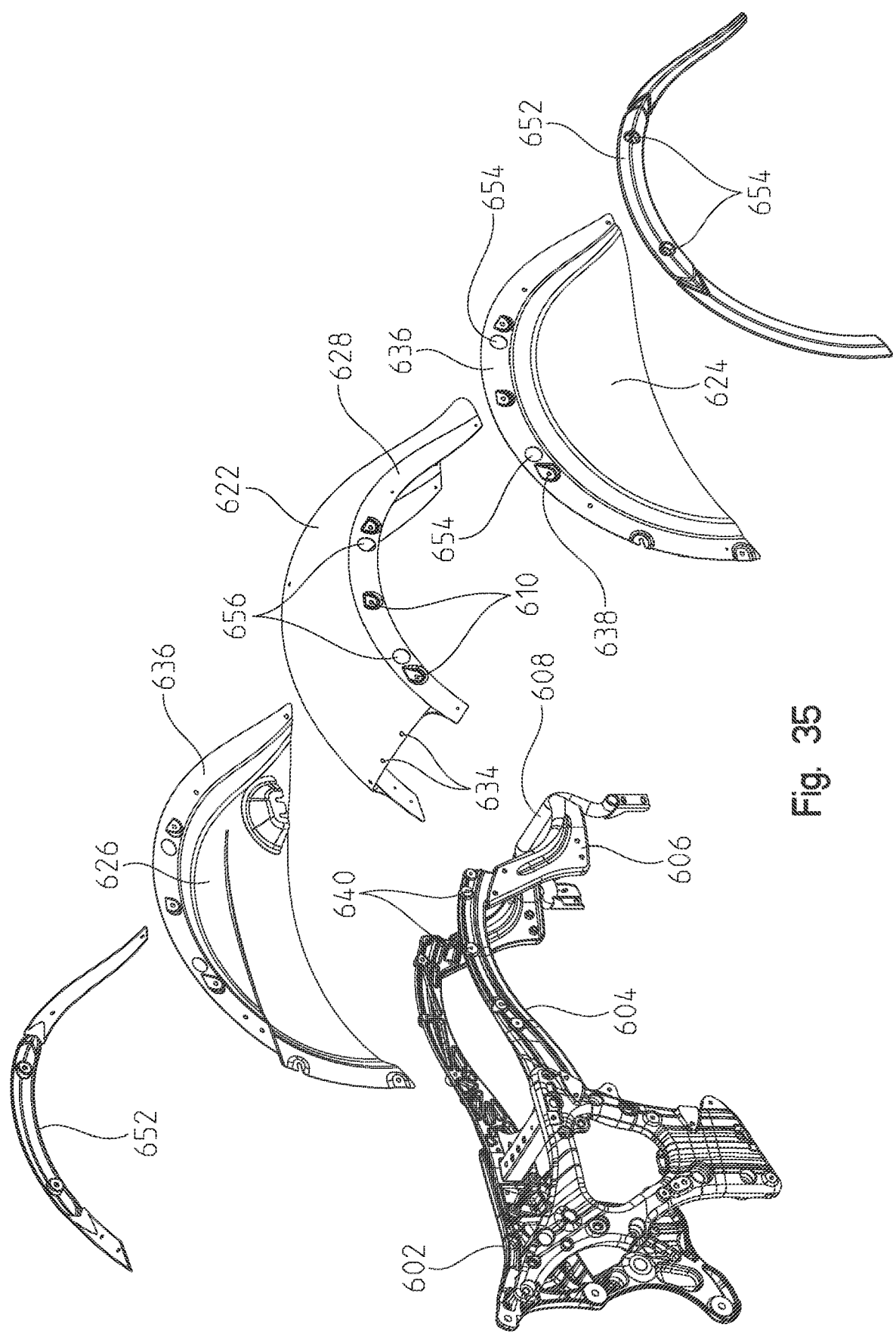
FIG. 35 is an exploded view of the frame and fender of FIG. 34.
Figure 36:
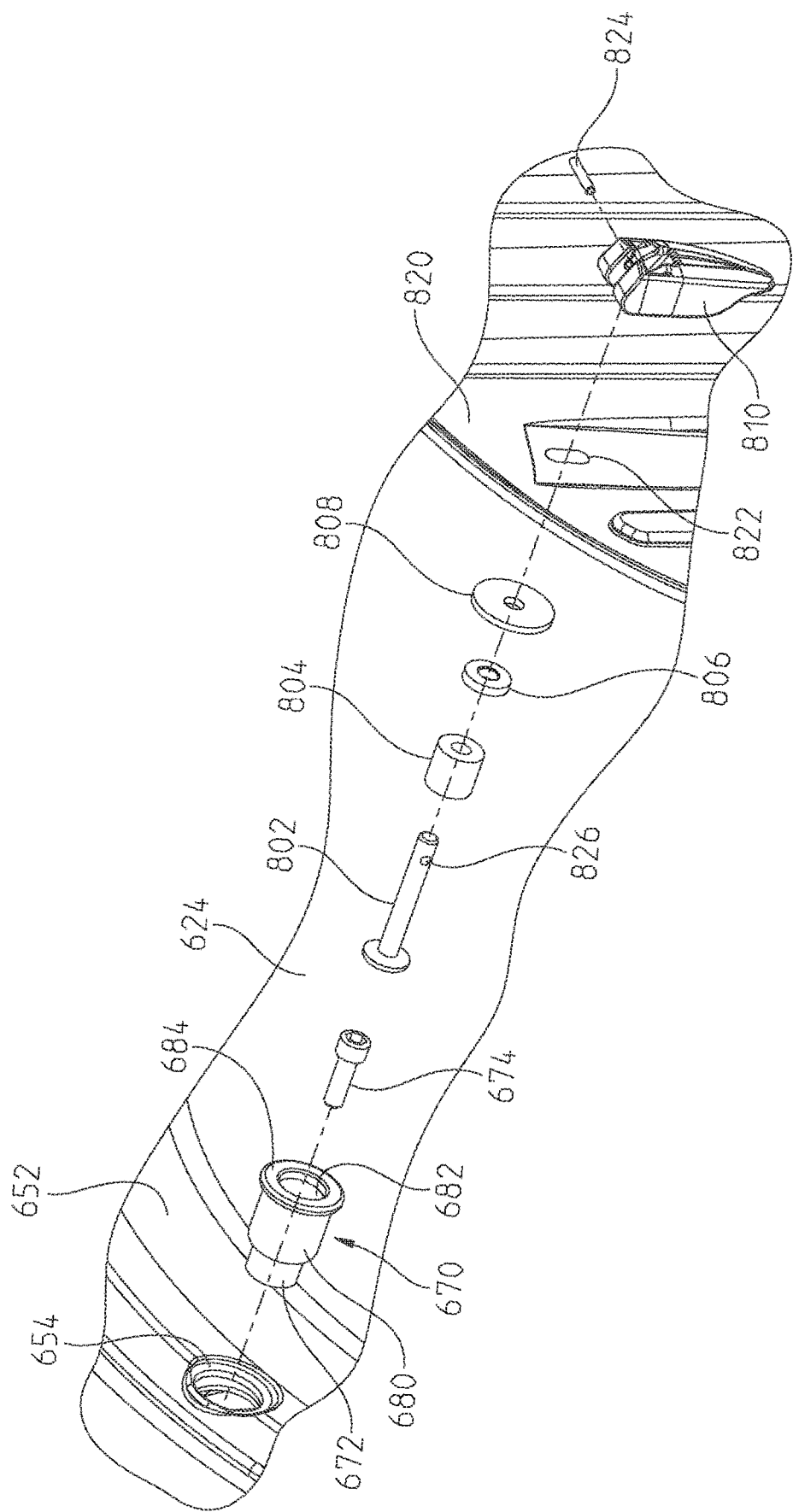
FIG. 36 is an exploded view showing the locking member for the fender to the frame and for an accessory saddlebag to the motorcycle.

With reference now to FIGS. 33-36, an accessory trunk will be described that mounts to frame 4. With reference first to FIG. 33, frame 4 will be described. Frame 4 is comprised of main frame portion 102, front frame tubes 600, side frames 602, frame extension portions 604, and rear frame portion 601. As shown in FIG. 33, frame 4 is coupled to power train housing 610 and power train housing 610 becomes an integral part of frame 4 as described herein. With reference now to FIGS. 34-36, rear fender assembly will be described in greater detail.

Referring now to FIGS. 34-36, a rear fender 620 is coupled to rear frame portion 604 and extends around a top portion of rear wheel 8. As shown in FIGS. 34-36, rear fender 620 extends rearwardly from rear frame portions 604, 606 and is positioned above a cross member 608, illustratively a mustache bar. Rear fender 620 may be comprised of metallic and/or polymeric materials and may increase the structural integrity of frame 4. Rear fender 620 includes a top member 622, a first side member 624, and a second side member 626. Illustratively, rear fender 620 is a skirted fender. Top member 622 includes side surfaces 628 having a plurality of recessed openings 610. Recessed openings 610 may be configured to receive mechanical fasteners. Additionally, a front end of top member 622 includes at least one aperture 634 which may be used to couple rear fender 620 to rear frame portion 604. First and second side members 624, 626, each include a flange 636 having recessed openings 638 that align with recessed openings 610 of top member 622 and apertures 640 of rear frame portion 604. Recessed openings 610, 638 and apertures 640 may be configured to receive fasteners therethrough Rear fender 620 further includes trim members 652 have a plurality of recessed openings 654 which align with openings 654 of side members 624 and 626, and with apertures 656 of the top member 622. As such, trim members 652 may be coupled to side members 624 and 626 with mechanical fasteners.

More particularly and with reference to FIG. 36, a coupler 670 is provided having a countersunk portion 672 profiled to be received in opening 654 and to receive fastener 674 therethrough coupling trim piece 652 and coupler 670 to fender 622 and frame 604. Coupler 670 defines an outer engagement surface 680, an inner opening 682, and an outer lip 684 as described herein. It should be appreciated that a portion of coupler 670 extends beyond opening 654 for engagement of a locking mechanism on a trunk assembly as further described herein.

With reference now to FIGS. 37-42, the trunk assembly will be described in greater detail. As shown first in FIG. 37, the trunk assembly is shown generally at 700 to include a trunk enclosure portion 702 and a lower frame portion 704. Upper enclosure portion 702 could be comprised of a plastic or fiberglass type material whereas lower frame portion 704 is comprised of a material such as aluminum, steel, and/or tubing as described. As shown best in FIGS. 38 and 39, frame portion 704 includes a base portion 710 having a base wall 712, sidewalls 714. Sidewalls 714 include a plurality of apertures 716, 718 as described herein.

Frame portion 704 further includes attachment legs 720 having a forward attachment yoke 722 and a rearward aperture 723 including a locking mechanism 724 having a locking jaw at 726. Legs 720 further include rearwardly extending plate portions 730 having a plurality of apertures 736 and 738. It should be appreciated that apertures 736 align with apertures 716 in sidewalls 714 and apertures 738 align with apertures 718 in sidewall 714. Leg portions 720 further include flanges 750 extending from plate portions 730 having fasteners 752 coupled thereto and having an aperture aligned with the threaded opening.

Figure 38:
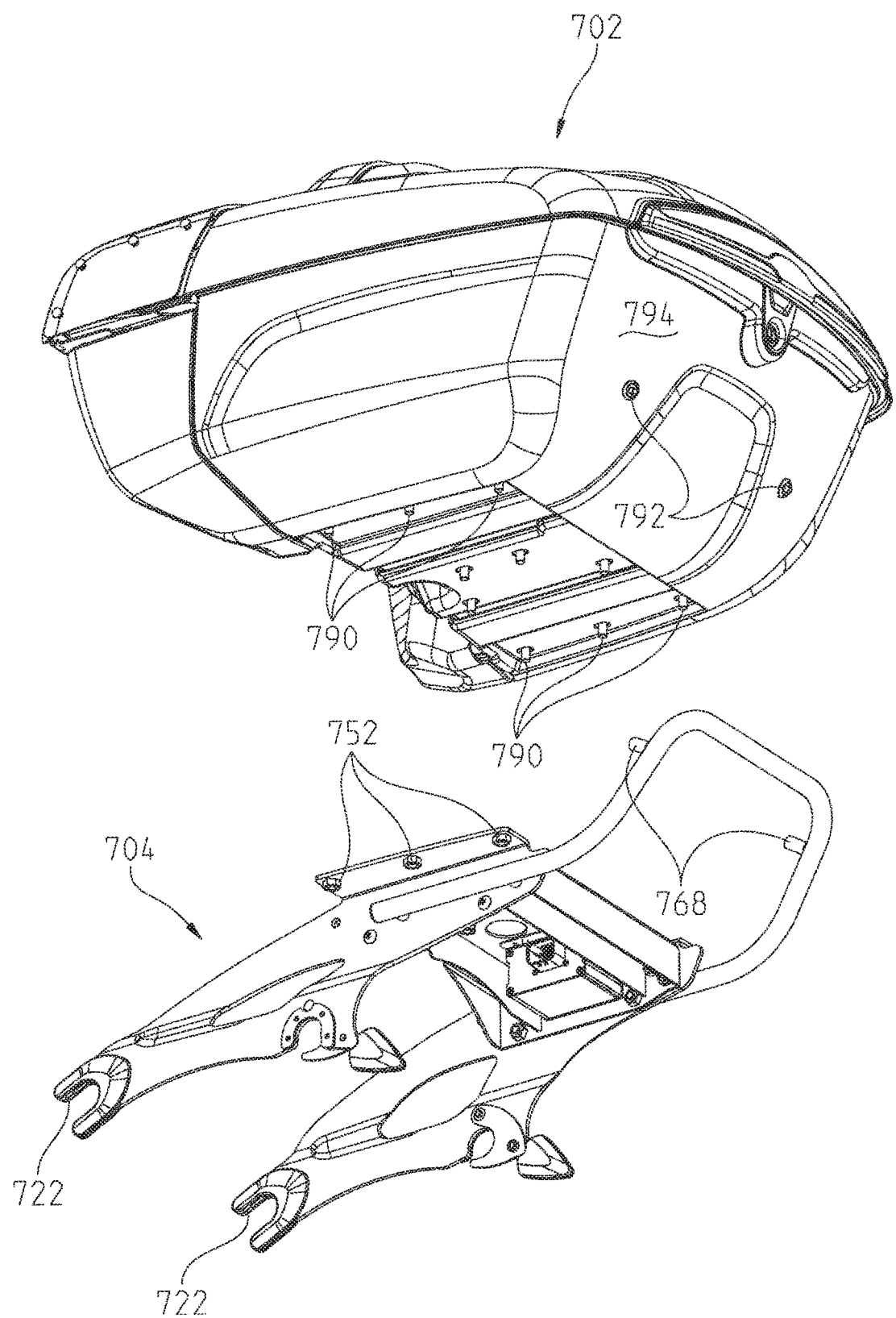
FIG. 38 is an exploded view of the trunk of FIG. 37.
Figure 39:
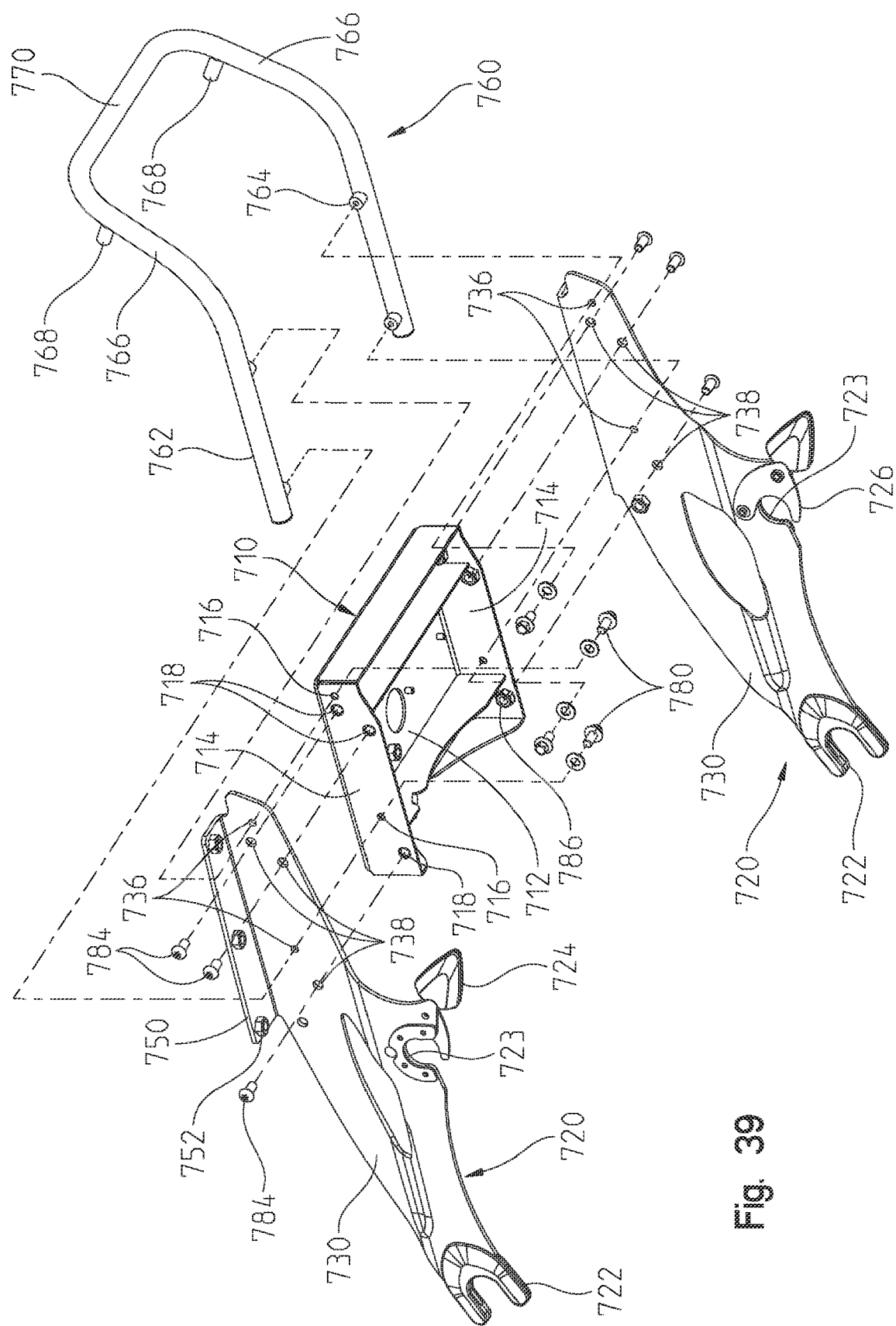
FIG. 39 is an underside perspective view showing the trunk frame in an exploded manner.

With reference still to FIG. 39, the frame further includes a tubular structure 760 having side arms 762 having threaded bosses 764, upwardly extending portions 766 having threaded bosses 768 and a transverse portion at 770. Thus, it should be appreciated from FIG. 39 that threaded bosses 764 may be aligned with apertures 736 and 716 whereupon fasteners 780 may be received through apertures 716 and 736 and into threaded engagement with threaded bosses 764. In a similar nature, fasteners 784 may be received through apertures 718, 738 and into threaded engagement with fasteners 786. Fasteners 790 (FIG. 39) extend downwardly through trunk portion 702 and may be coupled to fasteners 752. In a like manner, fasteners 792 project through a rear wall 794 of trunk 702 and into threaded engagement with threaded bosses 768 (FIG. 38).

Figure 40:
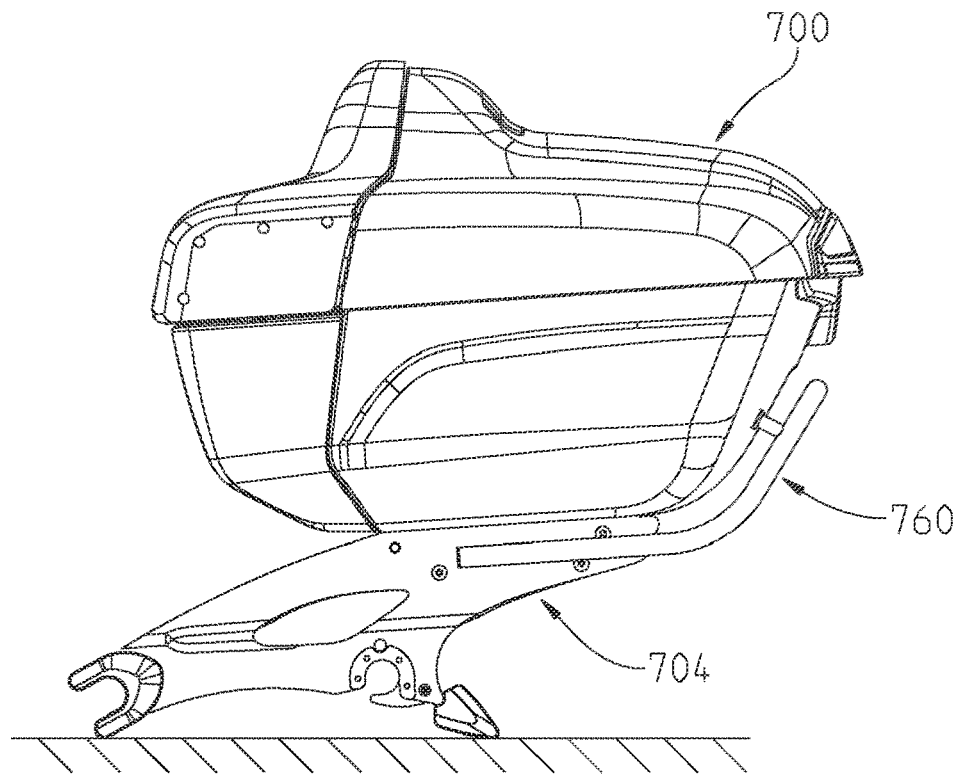
FIGS. 40 and 41 show the trunk in a standing and tipped position relative to the ground.
Figure 41:
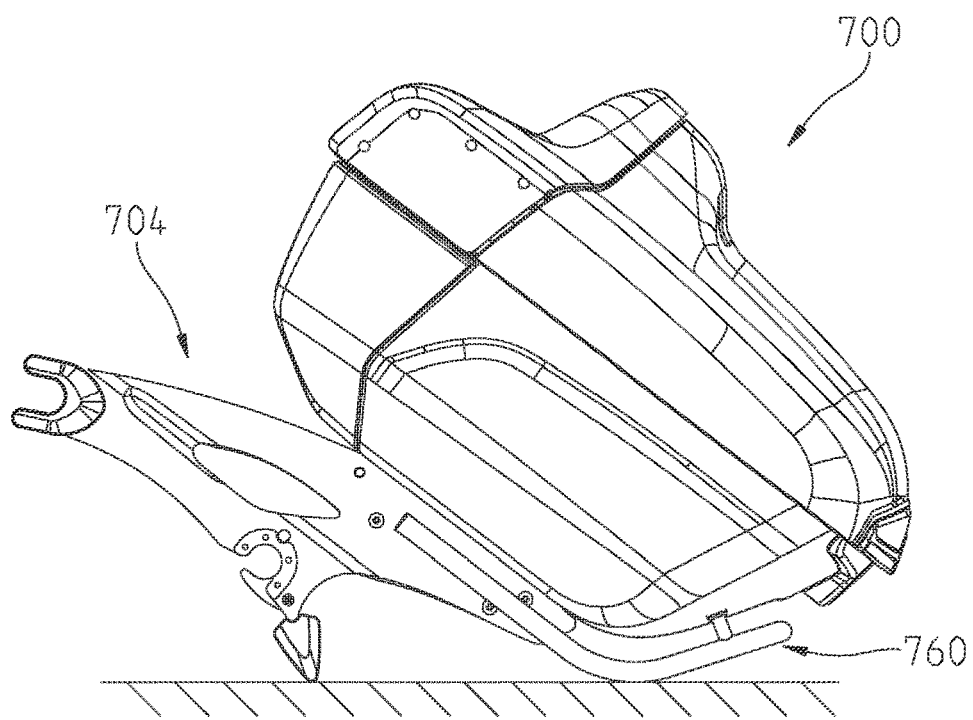
Figure 42:
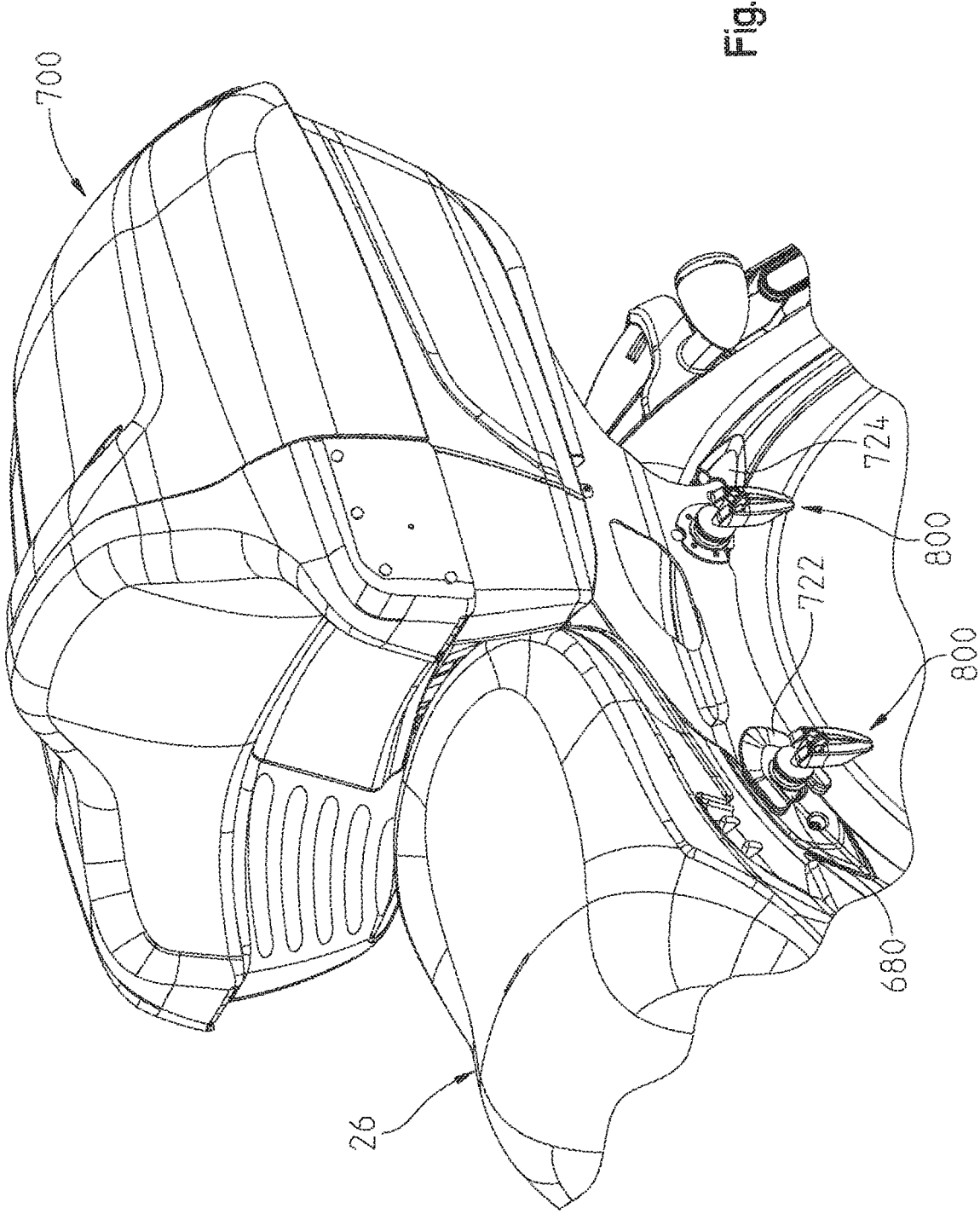
FIG. 42 shows the accessory trunk coupled to the motorcycle.

With reference now to FIGS. 40-42, the trunk as described above is strong and rigid with the frame structure 704 defining an exoskeletal frame to increase the rigidity. Tubular handle 760 may also be used as a handle. Furthermore, given the unbalanced nature of the trunk units themselves, if the trunk falls from a position from that shown in FIG. 40 to that shown in FIG. 41, the tubular structure 760 catches the trunk unit preventing scuffing or scratching of the upper trunk portion 702. Trunk 700 is therefore latchable to the motorcycle and in particular to couplers 670 (FIG. 36) where yokes 722 and latch opening 723 encircle engagement surface 680 (FIG. 36) of coupler 670. This is also shown in FIG. 42.

In addition, FIG. 42 shows a coupler member 800, which is not required for locking the trunk, but rather for locking an additional accessory saddlebag. This is shown in FIG. 36, where couplers 800 would comprise plunger 802, spacer 804, resilient and deformable member 806, outer washer 808, lever 810 and base portion 812. It should be appreciated that plunger 802 extends through items 804 and 808 and through saddlebag 820, particularly through aperture 822, where it couples with lever 810 by way of lock pin 824 and aperture 826. Thus the combination of saddlebag 820 and locking member 800 may be positioned with resilient member 804 and plunger 802 within aperture 682 of coupler 670, whereupon lever 810 is rotated to a position where plunger 802 is pulled, deforming resilient member 804 (to the right as viewed in FIG. 36) whereupon resilient member 804 is reduced in length, but increased in diameter where it grasps aperture 682. More particularly, the resilient member 804 grips surface 682*a*, behind surface 684*a*. Coupler 800 is an accessory coupling system similar to the one disclosed in U.S. Pat. No. 7,055,454, the disclosure of which is expressly incorporated herein by reference; also known as assignees' Lock & Ride® expansion coupler mounts.

Figure 43:
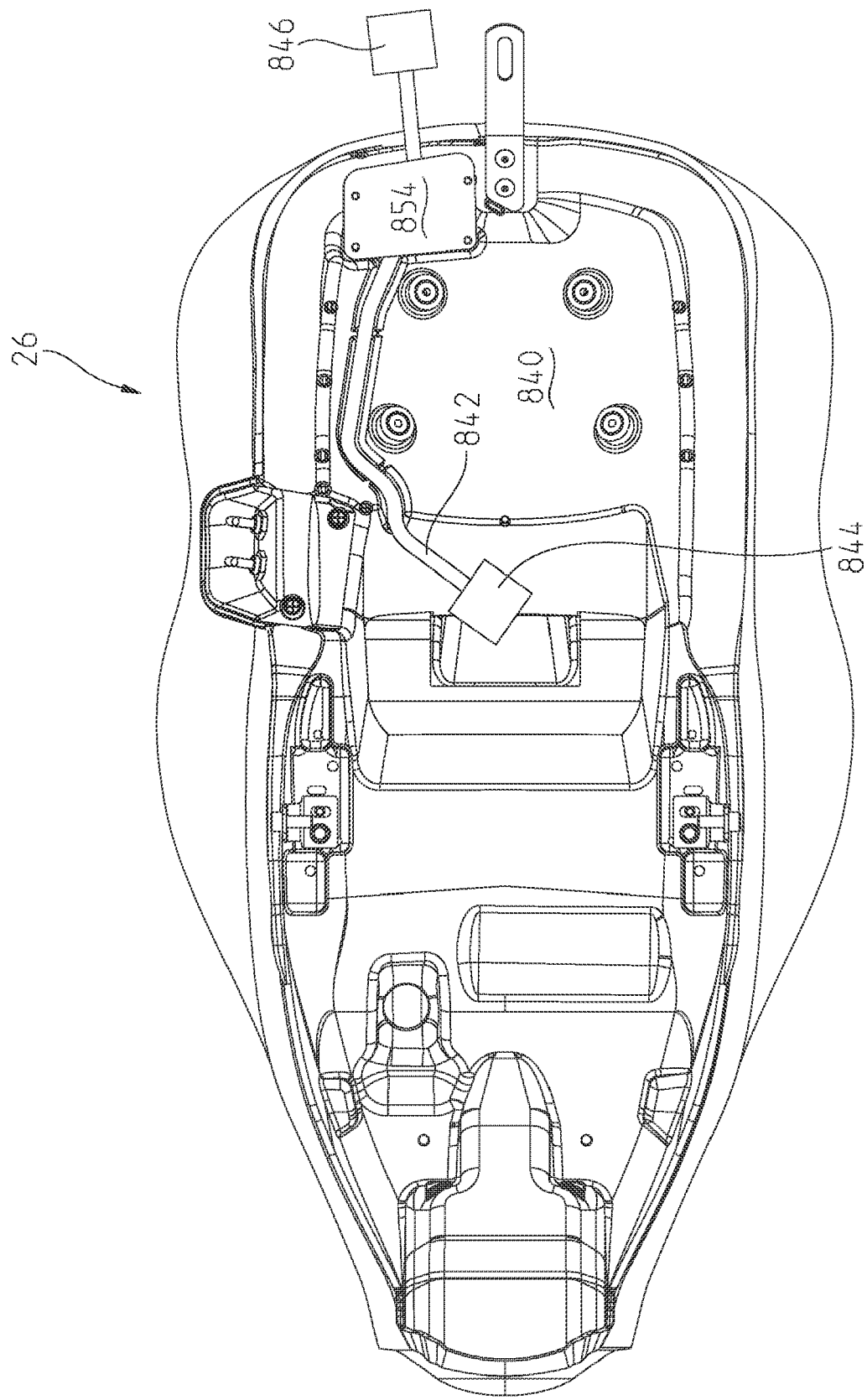
FIG. 43 is underside view of the motorcycle seat.

With reference now to FIG. 43, seat 26 is shown from an underside thereof including a frame portion such as 840. A wiring harness 842 is provided having a first connector at 844 and a second connector at 846. Connector 846 is to be connected to a harness in the trunk 700 and connector 844 is to be connected to a counterpart connector coming up through the frame (not shown). Connector 846 would be used for power to the trunk, namely to power an amplifier in the trunk for the motorcycle's audio system, as well as to provide power to the taillights and power lock on the trunk, and the like. As shown best in FIG. 44A, a pocket 850 is defined at the rear side of the motorcycle defined by an opening 852 in frame 840, as well as, a lower plate at 854.

Figure 44A:
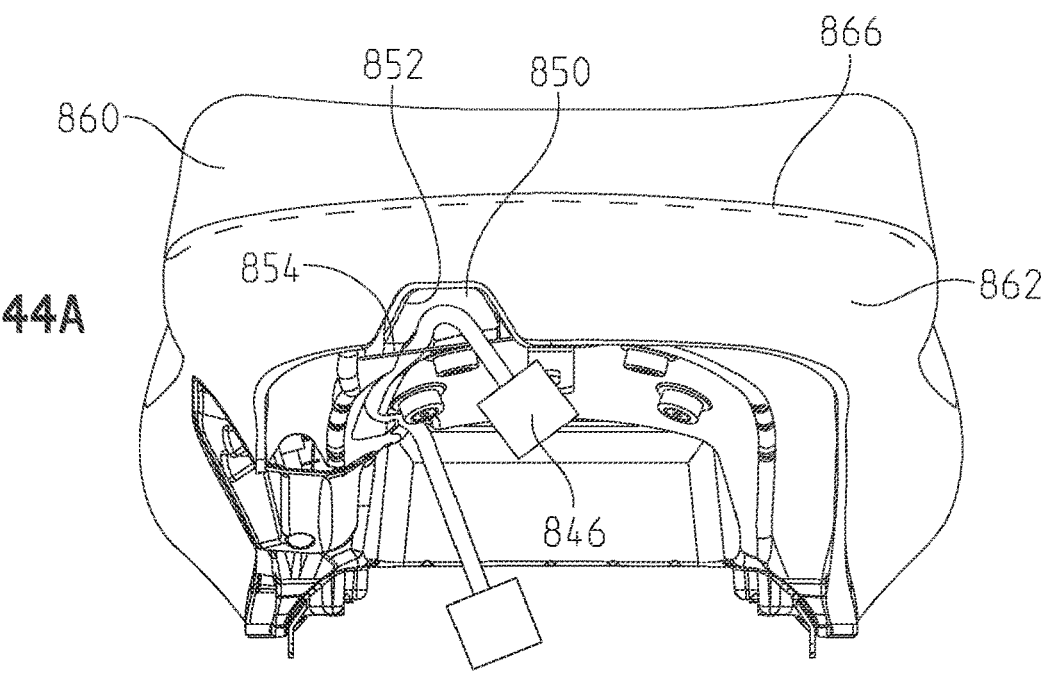
FIG. 44A is a rear view of the seat of FIG. 43 with a flap of the seat turned up.
Figure 44B:
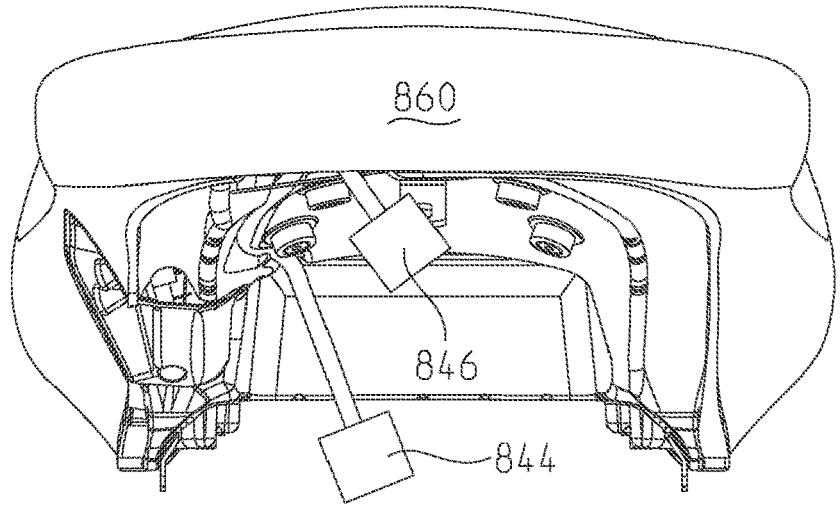
FIG. 44B shows a connector harness extending out of the seat with the flap in the turned down position.
Figure 44C:
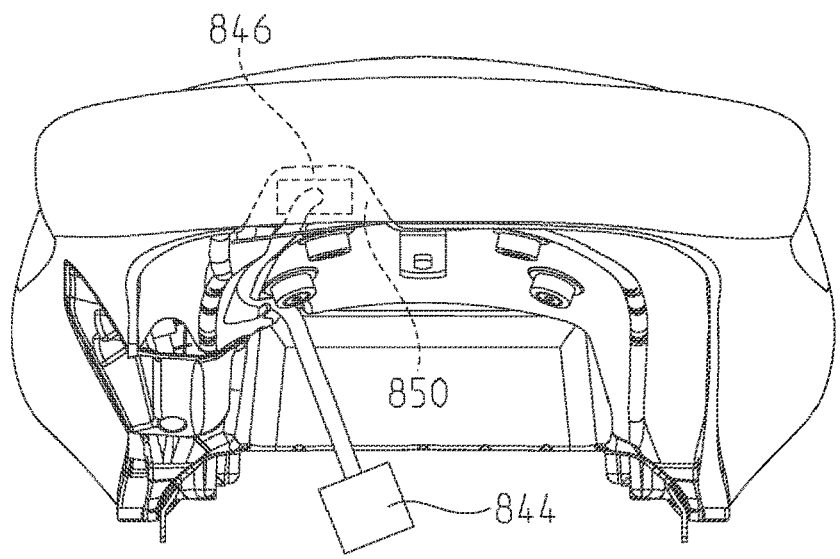
FIG. 44C shows the harness in the stowed position with the flap turned down.
Figure 44D:
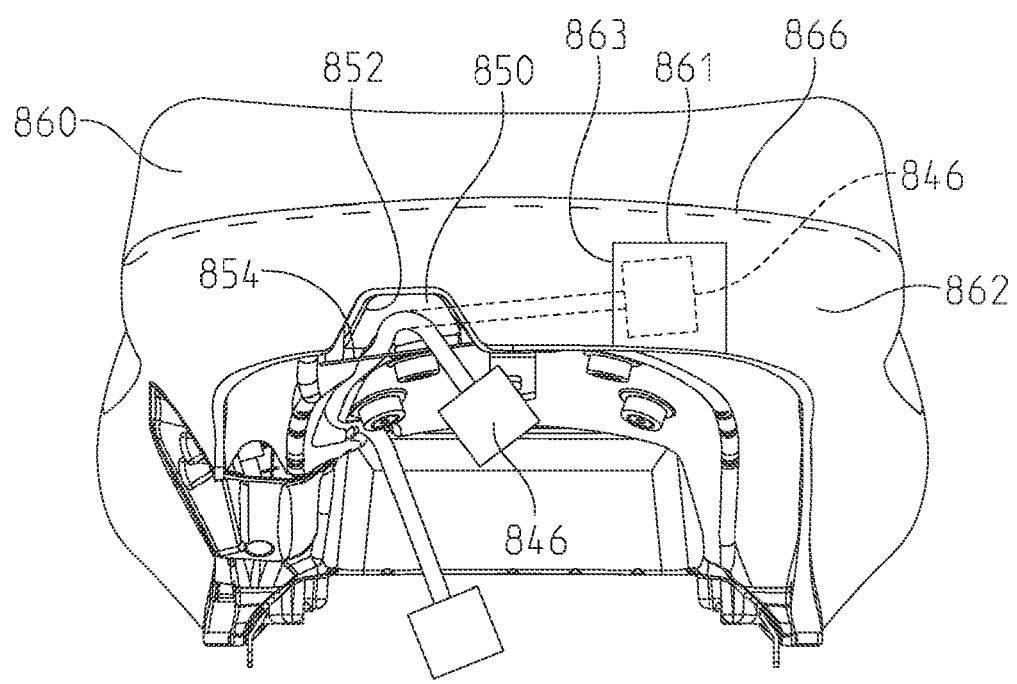
FIG. 44D shows a rear of the seat in a similar manner to FIG. 44A, with the flap turned down and the harness in a stowed position in a pocket.

With reference still to FIG. 44A, a rear flap portion is shown at 860 extending from the seat padding portion 862 and the flap may be turned up to extend above a top 866 of the padding portion 862. This could be a partial flap or could be a skirt extending around the entire seat cushion. Thus, when the trunk is in use and connector 846 is to be connected to the counterpart connector on the trunk, the harness extends outwardly of opening 850 as shown in FIG. 44A. The flap may then be turned down as shown in FIG. 44B, which closes off opening 850 allowing connector 846 to extend under the flap 860. If the trunk is not in use, the connector 846 is tucked back into the pocket 850 and the flap is turned downwardly maintaining the connector 846 within the pocket 850, as shown in FIG. 44C. As shown in FIG. 44D, a pocket 861 may be provided with an opening at 863. When not is use, harness connector 846 may be positioned in pocket 86, as shown in the phantom position.

Figure 45:
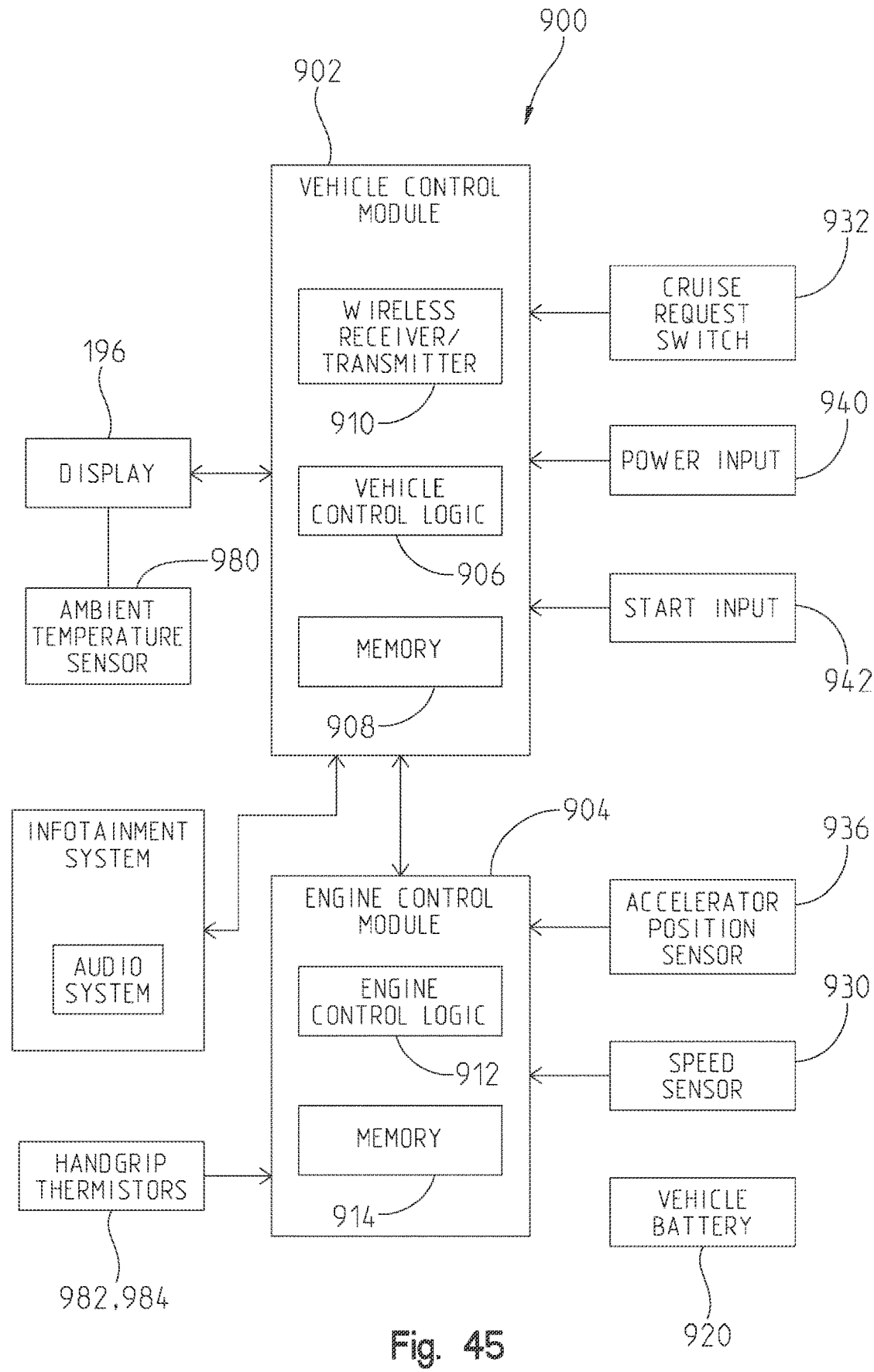
FIG. 45 shows a schematic of the vehicle electrical system.

Referring now to FIG. 45, an exemplary electrical system 900 of motorcycle 2 is illustrated. Electrical system 900 illustratively includes a vehicle control module (VCM) 902 in communication with an engine control module (ECM) 904. VCM 902 and ECM 904 each include one or more processors that execute software and/or firmware code stored at the respective internal or external memory 908, 914 to perform the functions described herein. In particular, VCM 902 includes vehicle control logic 906 that controls various electrical components and subsystems of motorcycle 2, and ECM 904 includes engine control logic 912 that controls the operation of engine 12. VCM 902 and/or ECM 904 may alternatively include one or more application-specific integrated circuits (ASICs), field-programmable gate arrays (FPGAs), digital signal processors (DSPs), hard-wired logic, or combinations thereof.

The functionality of VCM 902 and ECM 904 may alternatively be integrated into a single control module that provides both vehicle and engine control. Electrical system 900 further includes at least one vehicle battery 920 (e.g., 12 VDC) for providing power to the electrical components of motorcycle 2, including VCM 902, ECM 904, sensors, switches, lighting, ignition, accessory outlets, and other powered components. In one embodiment, VCM 902 communicates over a controller area network (CAN) bus network with ECM 904 and with various sensors and components of electrical system 900, although another suitable communication network or hard-wired communication may be provided.

Electrical system 900 includes several sensors in communication with VCM 902. One or more speed sensors 930 provide speed feedback to VCM 902, such as engine speed, vehicle speed, and/or other driveline speeds. An accelerator position sensor 936 (e.g., potentiometer) detects the position of the vehicle accelerator, e.g., the rotatable handgrip 214 (FIG. 46), and VCM 902 or ECM 904 determines the throttle demand based on the detected accelerator position for controlling the engine throttle 304. A cruise request switch 932 in communication with VCM 902 is actuated by an operator to set and implement the cruise speed. The cruise control operation will be operated in conjunction with accelerator position sensor 936 as described herein.

In the illustrated embodiment, the operator engages a power input 940 to power up electrical system 900 of motorcycle 2 and a start input 942 to start engine 12 of motorcycle 2, as described below. The sensors and other electrical devices illustratively routed to VCM 902 alternatively may be routed to ECM 904, such as the accelerator position sensor 936 and speeds sensors 930, for example, and VCM 902 may obtain the corresponding sensor data from ECM 904. In one embodiment, wiring to the sensors and electrical devices mounted on handlebars 28 is routed through an internal opening in handlebars 28 from the VCM 902 to thereby hide and protect the wiring.

VCM 902 illustratively further includes a wireless receiver/transmitter 910 for receiving and transmitting wireless communications to/from one or more vehicle sensors. In the illustrated embodiment, receiver/transmitter 910 is a radio frequency (RF) transceiver 910 operative to receive RF communications from the sensors.

ECM 904 electronically controls the throttle 304 of engine 12 based on at least the detected vehicle speed and throttle demand detected with accelerator position sensor 936. The electronic throttle control provided with ECM 904 is further described in U.S. patent application Ser. No. 13/152,981, filed on Jun. 3, 2011 and entitled "Electronic Throttle Control," the disclosure of which is incorporated herein by reference. VCM 902 and/or ECM 904 are operative to provide cruise control for motorcycle 2 such that motorcycle 2 operates at a substantially constant vehicle speed.

Cruise request switch 932 coupled to and in communication with VCM 902 is actuated or engaged by an operator to initiate the cruise control function of motorcycle 2. Cruise request switch 932, which includes a pushbutton, lever, or any other suitable input device, may be provided with the operator controls on the handlebar 28 of motorcycle 2. In the present embodiment, cruise control switch 932 is located on the control pod 950 shown in FIG. 46. Upon detection of cruise request switch 932 being engaged, VCM 902 instructs ECM 904 to maintain a constant vehicle speed using closed loop control based on the detected vehicle speed.

Figure 46:
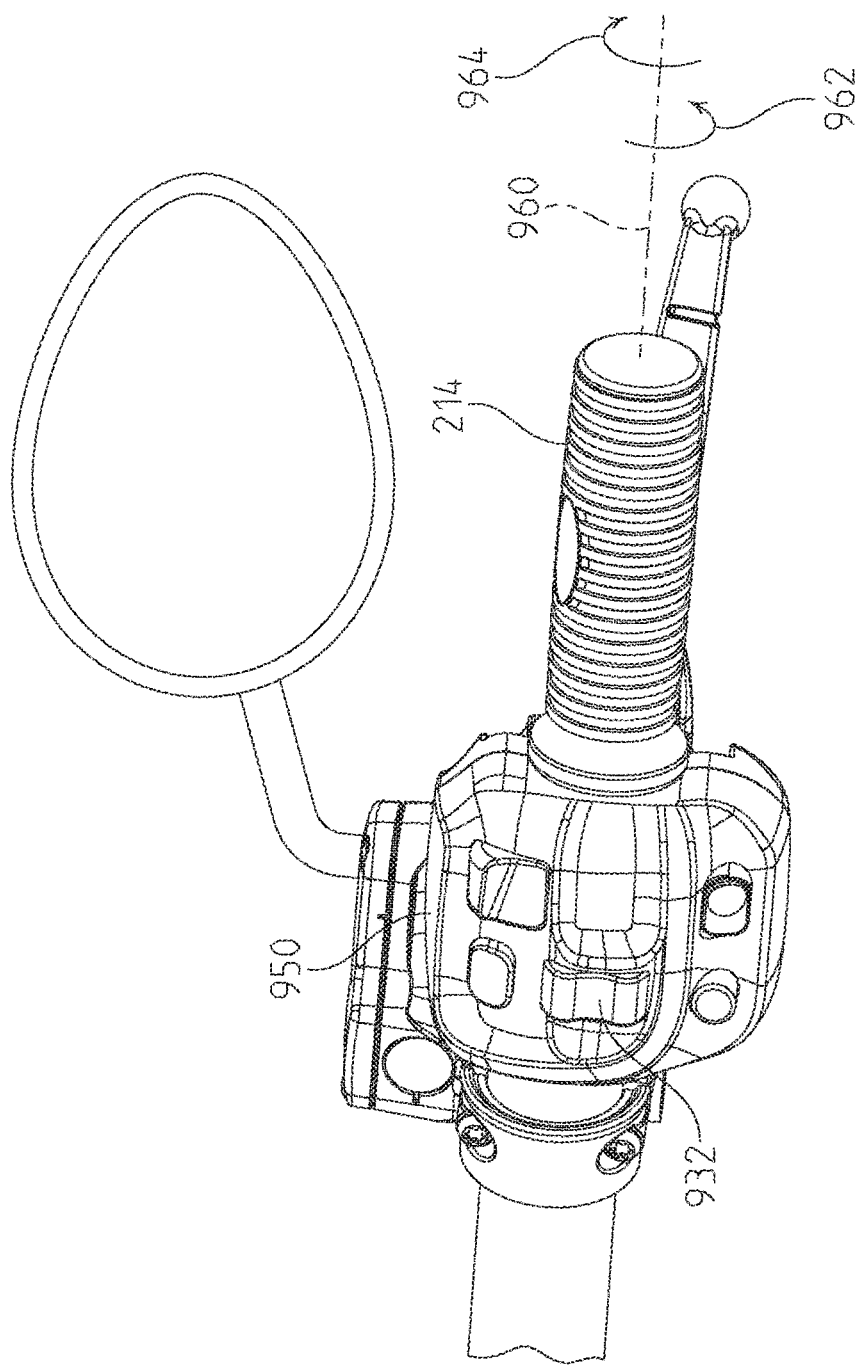
FIG. 46 shows an enlarged view of the right hand grip of the vehicle, showing the speed controls.

With reference to FIG. 46, the vehicle speed control or cruise control is activated by the operator to set a speed constant to that of the present vehicle speed. That is, as shown in FIG. 46, the vehicle is accelerated by turning the handgrip about axis 960 towards the operator, that is, in direction 962, Thus, to set the cruise control, the operator would move the accelerator in the direction 962 until the desired vehicle speed is achieved whereupon the cruise request switch 932 would be actuated. However in the present embodiment, the further functioning of the cruise control is operated by the handgrip 214 in the opposite or "roll-off" direction 964. It should be appreciated that once the cruise control switch 932 is activated, the operator may remove their hand from the handgrip 214 whereupon the handgrip returns to a neutral position until such time as the cruise control function is disengaged. In the present disclosure, the cruise control function may be either turned off completely or the set speed may be reduced by operation of the handgrip 214 in the roll-off direction 964.

Figure 47:
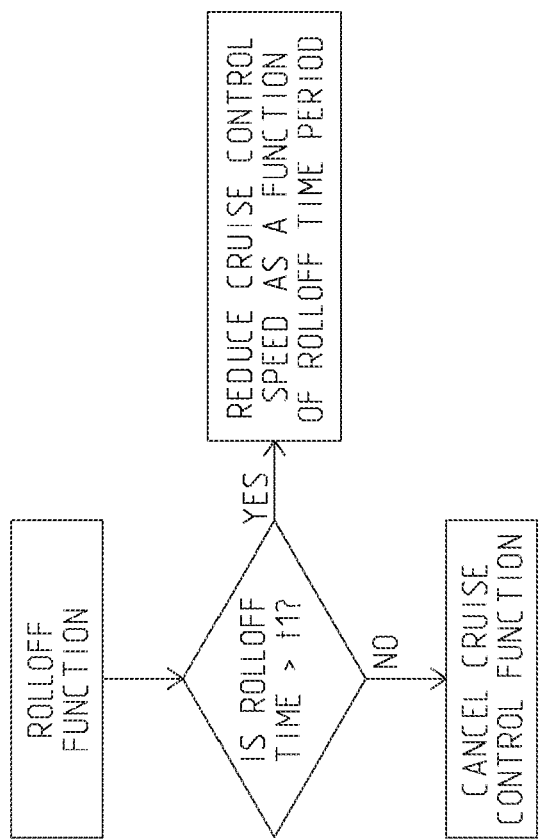
FIG. 47 shows a flow chart of the cruise control function.

For example, to disengage the cruise control feature entirely, the handgrip is moved in the roll-off diction 964 for a brief time period, such as one second or less ($t_1 < 1$ second), whereupon the cruise control feature is terminated. This is shown in FIG. 47 where the roll-off function is shown in a flowchart, such that if the time period $t_1$; that is the time period that the operator has the handgrip 214 in the roll-off direction 964, is less than $t_1$ then the cruise control function is terminated entirely. It should be appreciated that the time period $t_1$ of 1 second is arbitrarily chosen and could be any desired time value desired.

However, if the operator desires to reduce the cruise control speed as opposed to cancelling the function altogether, the operator may turn the handgrip 214 in the roll-off direction 964 for a period greater than $t_1$, whereby the cruise control function may be adjusted such that the cruise control speed is reduced as a function of the time period in which the operator maintains the handgrip 214 in the roll-off direction 964. This reduction in the cruise control speed could be displayed on the center display 196 (FIG. 12) in order for the operator to easily see and understand the new dialed in cruise control speed. Alternatively or in addition, the handgrip may be turned to increase the cruise control speed.

Figure 12:
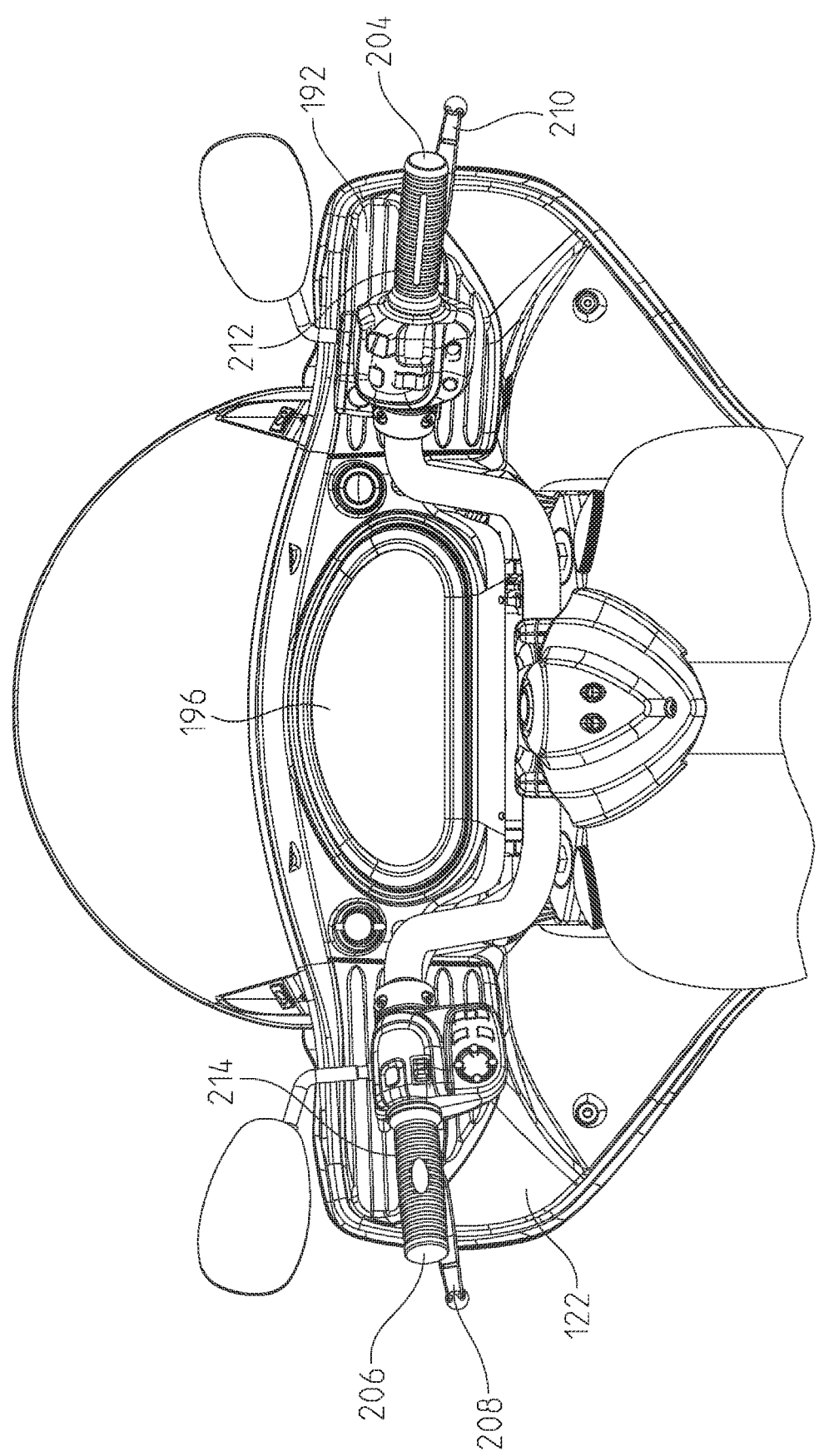
FIG. 12 is a further rear perspective view of the upper fairing and the windshield assembly of FIG. 11.
Figure 48:
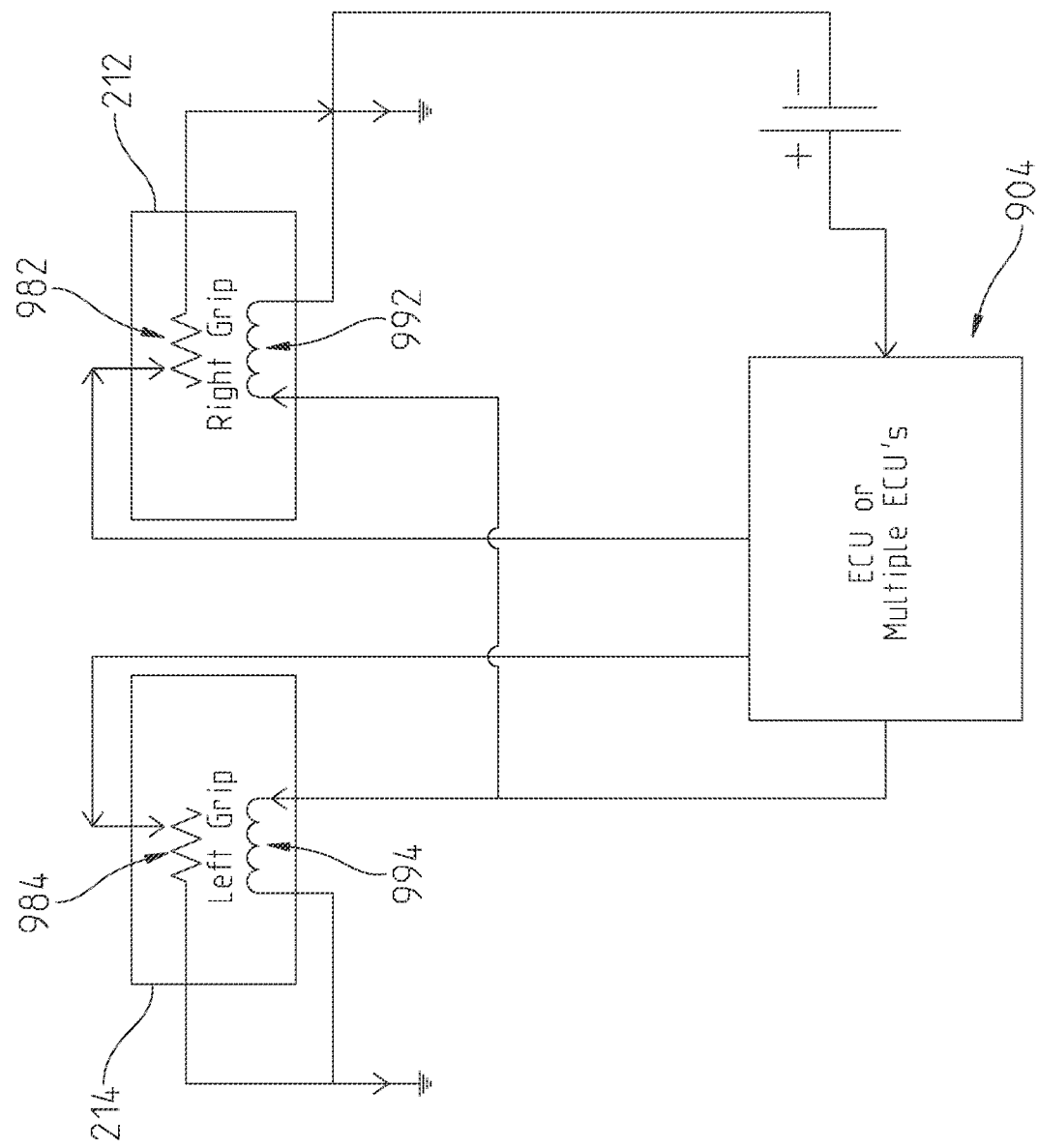
FIG. 48 shows an electrical schematic of the heated hand grips.

With reference now to FIGS. 45 and 48, the heated hand grips 212, 214 will be described in greater detail. Motorcycle 2 includes heated handle grips 212, 214 (FIGS. 12 and 48) coupled to right and left side handlebars 204, 206 (FIG. 12). As shown in FIG. 48, the hand grips 212, 214 each have a dedicated thermistor 982, 984 as well as a dedicated heater 992, 994.

The hand grips 212, 214 may be heated to the maximum operating temperature in less than 60 seconds by controlling the grips with PWM from the VCM 902. When the heated grips are turned on, the grips will run at 100% PWM for no more than 1 minute, and will then continue to build temperature as needed until desired setting is achieved.

The software can compensate for different ambient temperatures, different vehicle speeds, as well as for the rider removing his/her hand from one of the grips while riding. More particularly, the ambient temperature may be read from the ambient temperature sensors 980 (FIG. 45) and input that information to the ECU 904. The actual vehicle speed may be read from the speed sensor 930 (FIG. 45) and input that information to the ECU 904. Thermistors 982, 984 (FIGS. 45 and 48) in each heated grip 212, 214 report to the VCM the real-time grip tube temperature which controls the current to the heaters 992, 994. As there is a thermistor in each hand grip, if an operator removes their hand from one of the grips, the temperature at the thermistor will drop (depending on ambient temperature and vehicle speed) and the heaters 992, 994 will increase the temperature accordingly.

The VCM can adjust the current up or down (within a preset band of limits) in order to maintain that grip tube temperature during changing ambient or riding conditions. With the closed loop feedback of the thermistors on both hand grips, the system can compensate for ambient temp or riding condition changes to either grip, without the risk of discomfort to passenger from overheated grips.

Figure 49:
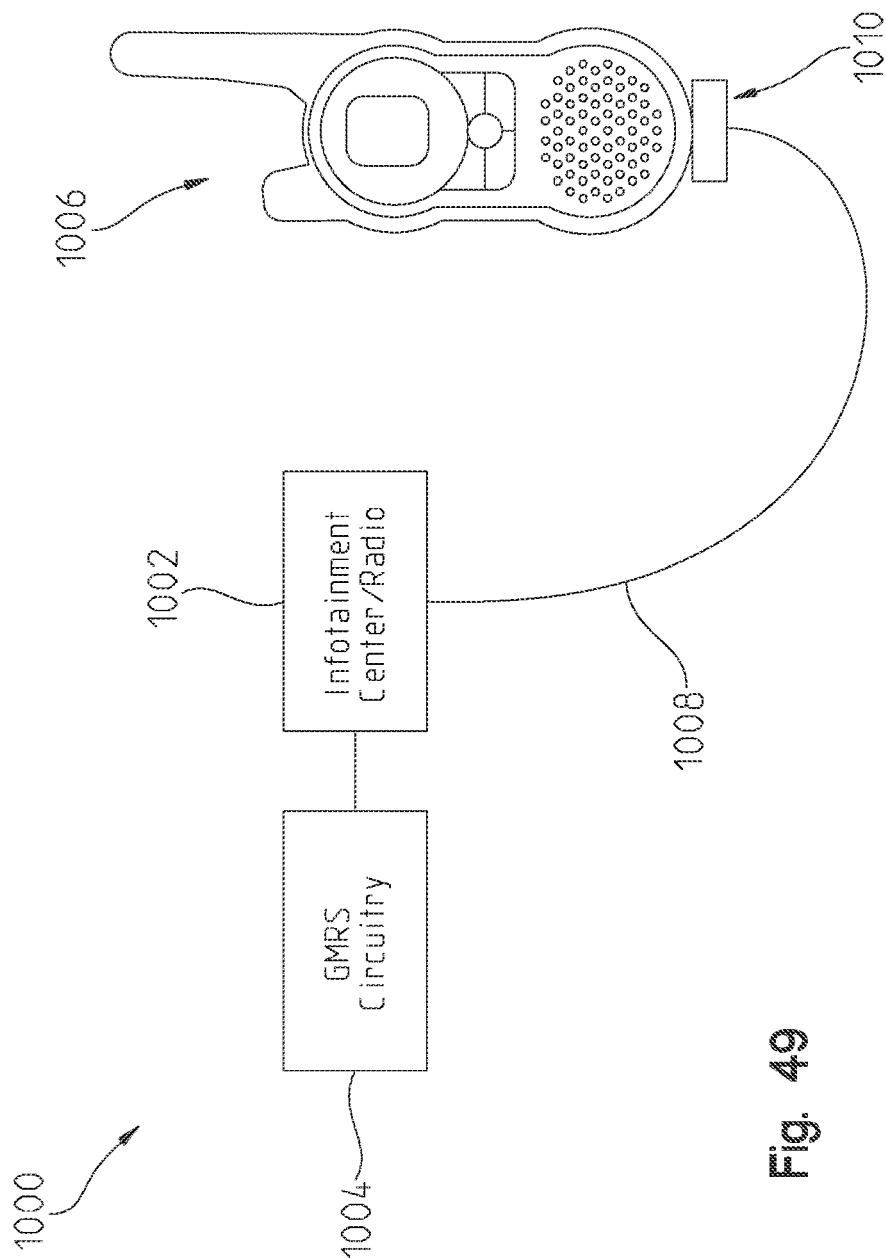
FIG. 49 shows a schematic of the GMRS system.
Figure 50:
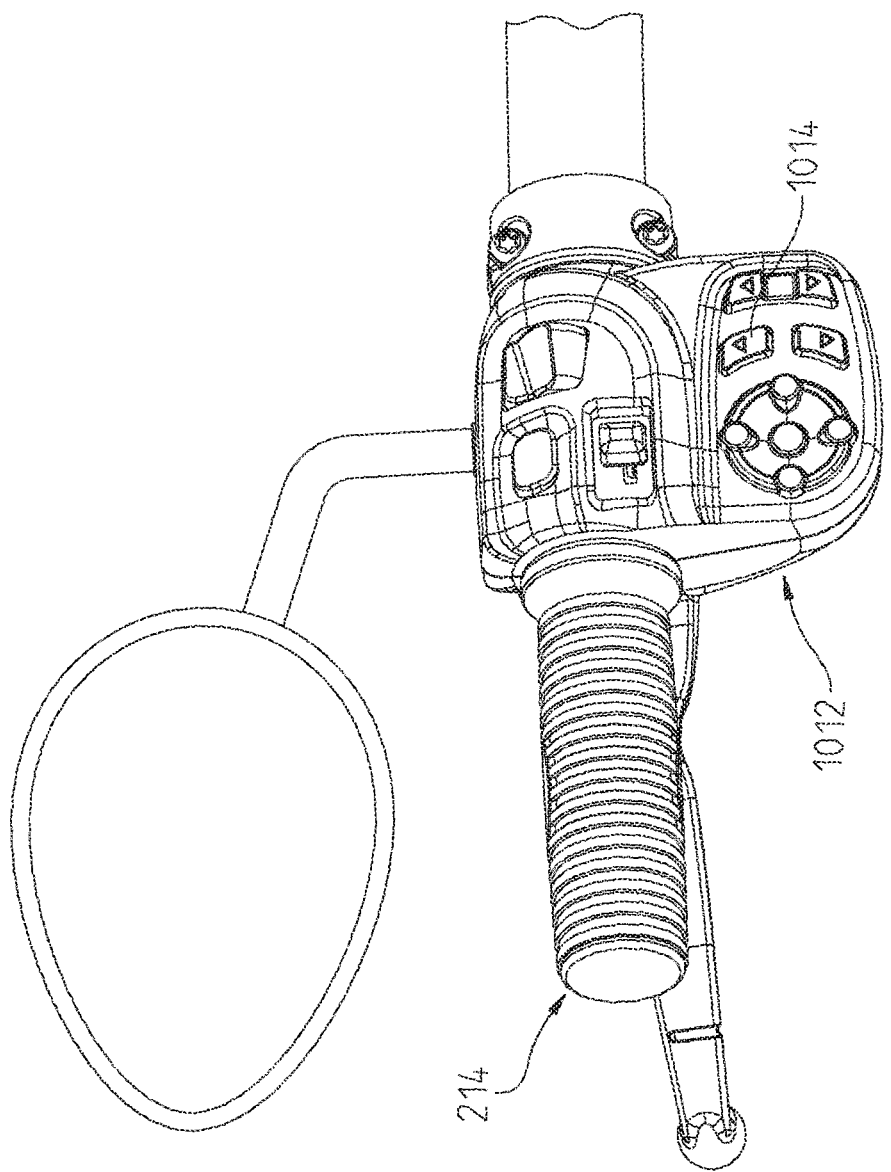
FIG. 50 shows an enlarged view of the left hand grip of the present vehicle.
Figure 51:
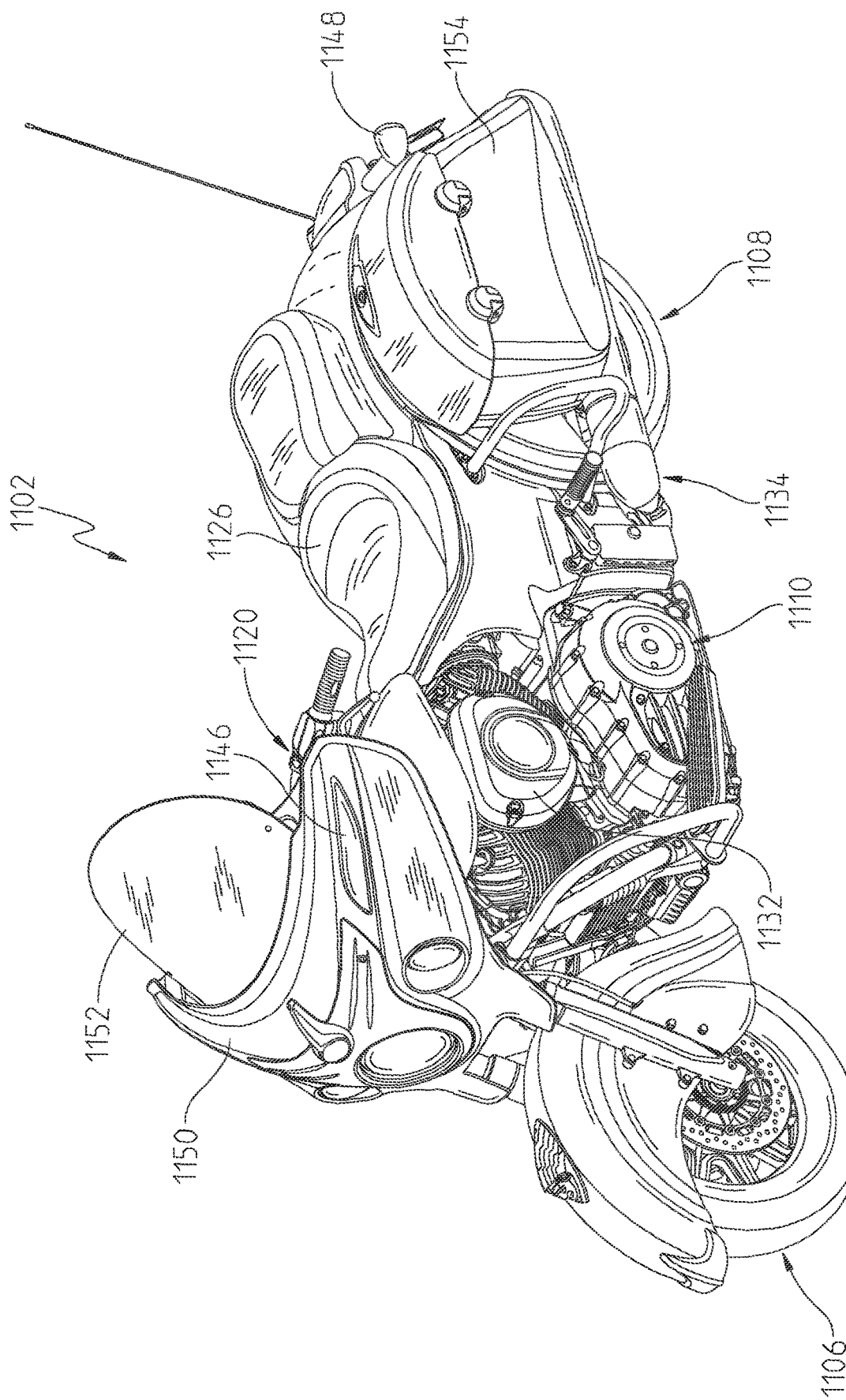
FIG. 51 is a left front perspective view of a second embodiment two-wheeled vehicle.
Figure 52:
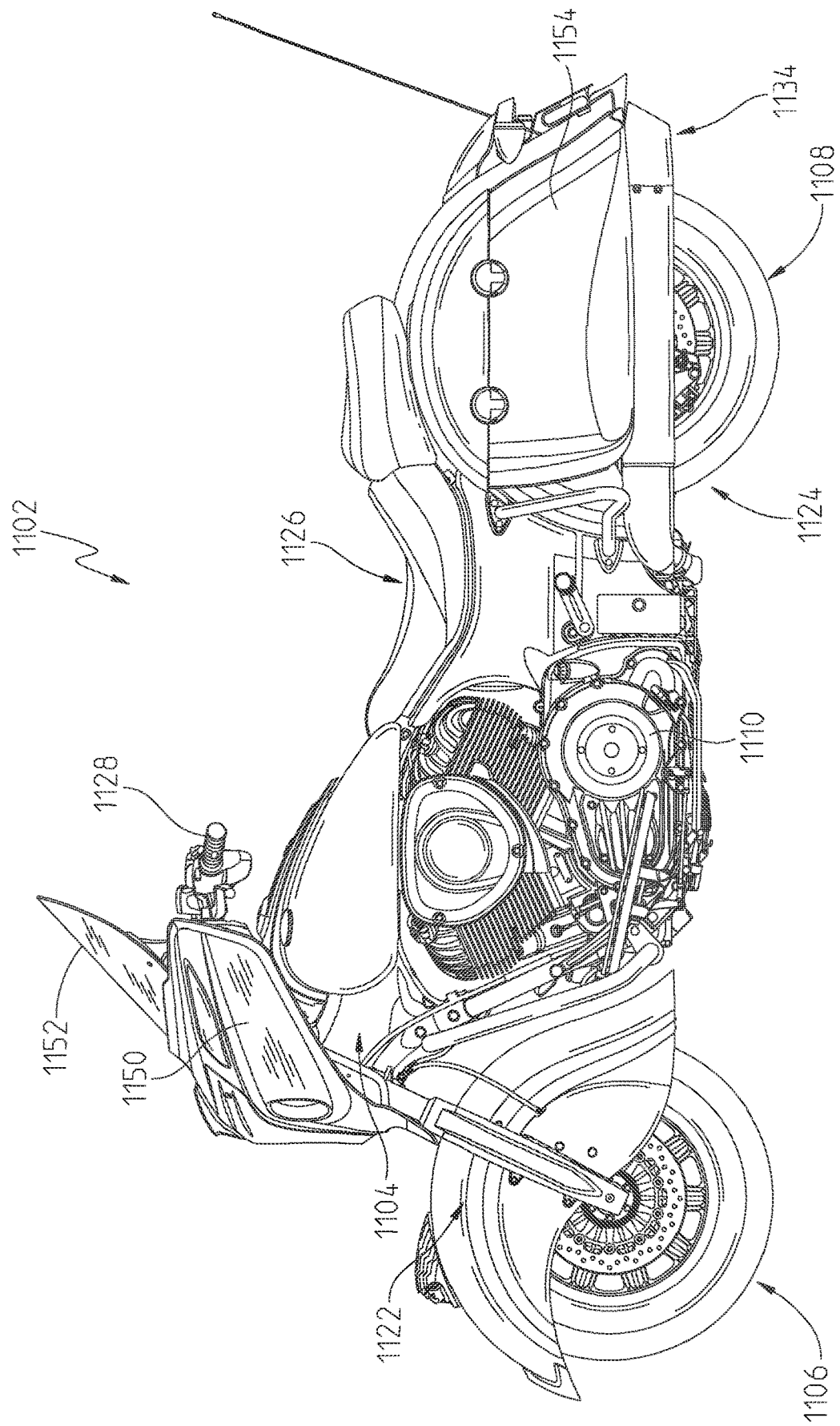
FIG. 52 is a left side view of an illustrative embodiment of the two-wheeled vehicle.
Figure 53:
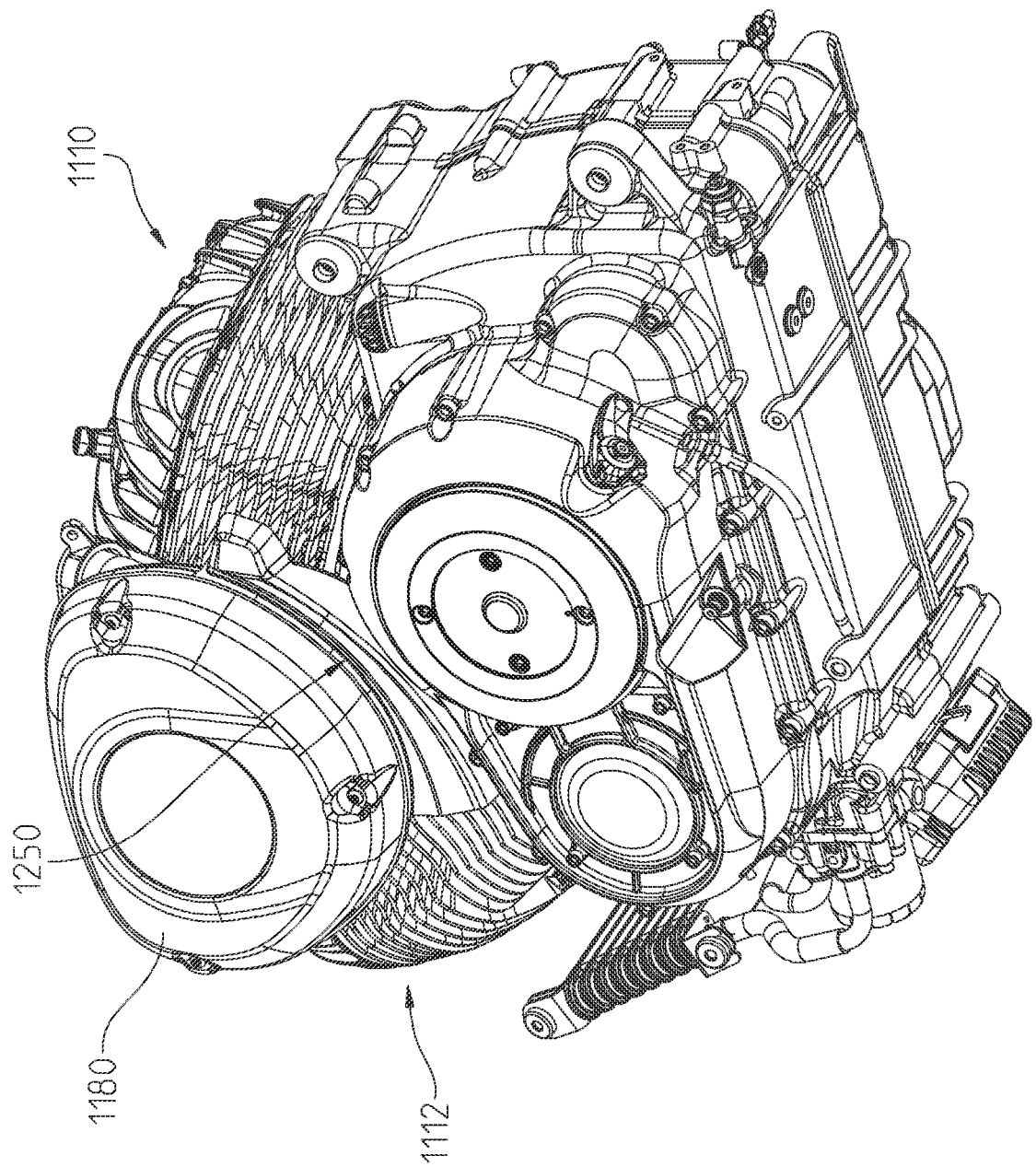
FIG. 53 is a left underside perspective view of a power train of the two-wheeled vehicle of FIG. 52.

With reference now to FIGS. 49 and 50, the communication system will now be described in greater detail. The communication system is based on the General Mobile Radio Service ("GMRS") which is in the 462-467 MHz spectrum range. The GMRS spectrum is short-distance, two-way communications using small, portable hand-held devices that function similar to walkie-talkies.

With reference to FIG. 49, the communication system is shown at 1000, and generally comprises the infotainment system 1002 (which is also shown in the schematic of FIG. 45); the GMRS circuitry 1004; a hand held unit (walkie talkie hand set) 1006; and a wiring harness 1008. In the embodiment shown, the GMRS circuitry is integrated into the motorcycle 2 and includes a push to talk (PTT) feature as well as a bluetooth chipset coupled to a headset. The harness 1008 includes a connector 1010 for electrically connecting to the hand set 1006. The harness could be hard wired in or be an accessory for the user to purchase and add later. Regardless, the connector would be stowed in a compartment within the motorcycle and the handset could be added by the user. The handset is added by the rider as a personal choice much like a cell phone.

The PTT feature is coupled to the audio pod 1012 (FIG. 50) and is provided by push button 1014. This feature provides a two way interrupt overriding the present output on the audio system. Thus, the communication system allows an economical solution for two way communication between riders on different motorcycles.

It should also be appreciated that the GMRS communication system 1000 could interface with the system shown in U.S. provisional application Ser. No. 61/769,378 filed Feb. 26, 2013.

With reference to FIGS. 51-58, an illustrative embodiment of a two-wheeled vehicle 1102 is shown. Vehicle 1102 as illustrated is a touring style motorcycle although the majority of components may be used for a cruiser style motorcycle as described herein. Vehicle 1102 may also include any features known from U.S. Provisional Patent Application Ser. No. 60/880,999, filed Jan. 17, 2007, titled "TWO-WHEELED VEHICLE", the disclosure of which is expressly incorporated by reference herein.

Vehicle 1102 includes a frame 1104 (FIG. 52) supported by ground engaging members, namely a front ground engaging member, illustratively wheel 1106, and a rear ground engaging member, illustratively wheel 1108. Vehicle 1102 travels relative to the ground on front wheel 1106 and rear wheel 1108.

Rear wheel 1108 is coupled to a powertrain 1110, to propel the vehicle 1102 through rear wheel. Powertrain 1110 includes both an engine 1112 and transmission. The transmission is coupled to engine 1112 which provides power to rear wheel 1108. In the illustrated embodiment, engine 1112 is a 50° v-twin spark-ignition gasoline engine available from Polaris Industries, Inc. located at 2100 Highway 55 in Medina, Minn. 55340. In alternative embodiments, rear wheel 1108 is coupled to the drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuous variable transmission.

It will be appreciated that while the vehicle 1102 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Motorcycle 1102 also generally includes a steering assembly 1120, front suspension 1122, rear suspension 1124 (FIG. 52), and seat 1126. Steering assembly 1120 includes handlebars 1128 which may be moved by an operator to rotate front wheel 1106 either to the left or the right. Engine operating systems are also included such as an air intake system 1132 and exhaust system 1134. Safety systems may also be provided such as main lighting 1144, front turn signals 1146, and rear turn signals 1148. Ergonomic systems may include front fairing 1150, windshield assembly 1152 and saddlebag assembly 1154. With reference now to FIGS. 53-58, air intake system 1132, engine 1112, and their interaction will be described in greater detail.

Figure 54:
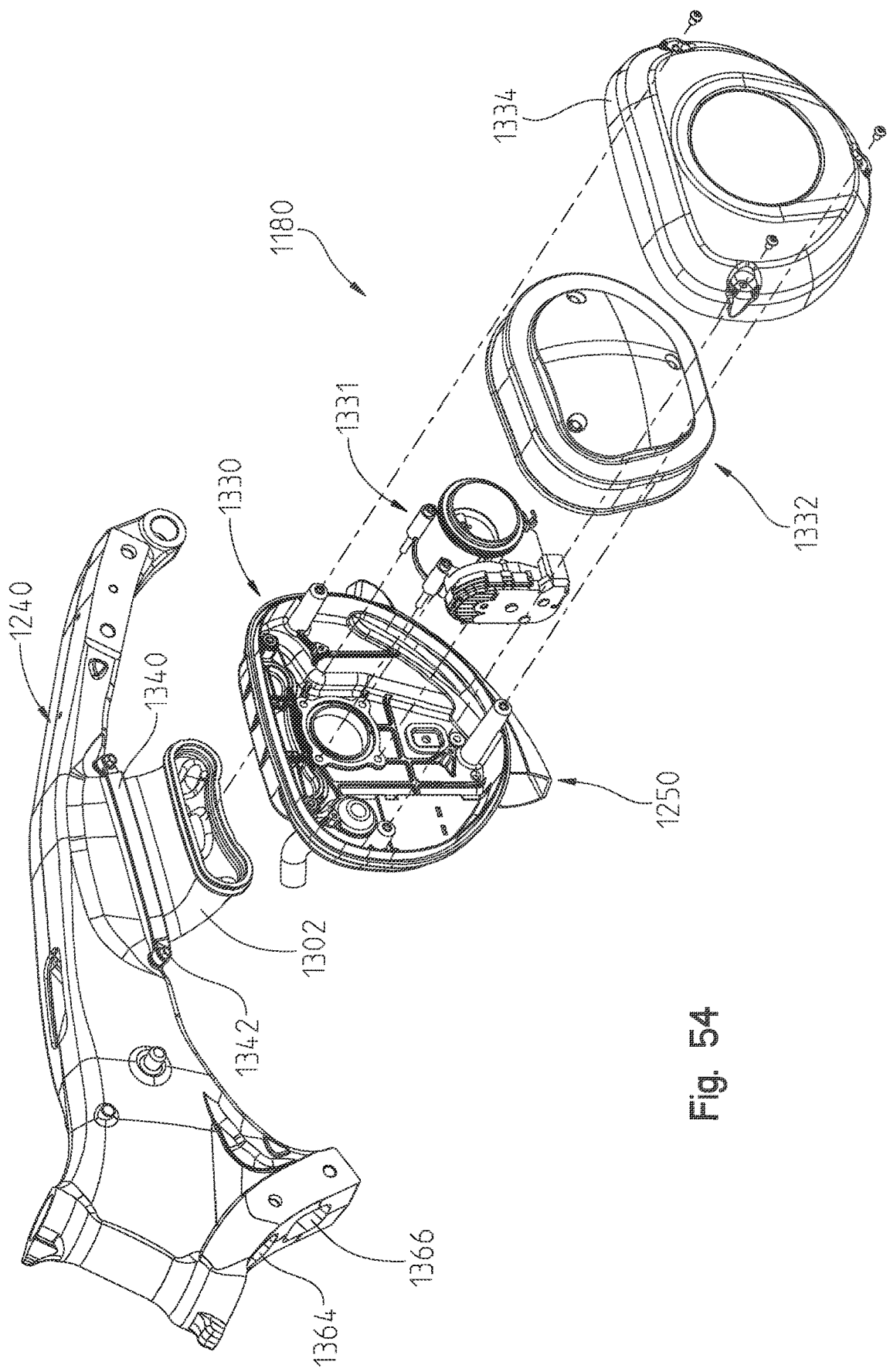
FIG. 54 shows a main frame portion of the two-wheeled vehicle of FIG. 52 coupled to the air cleaner in a partially exploded manner.
Figure 55:
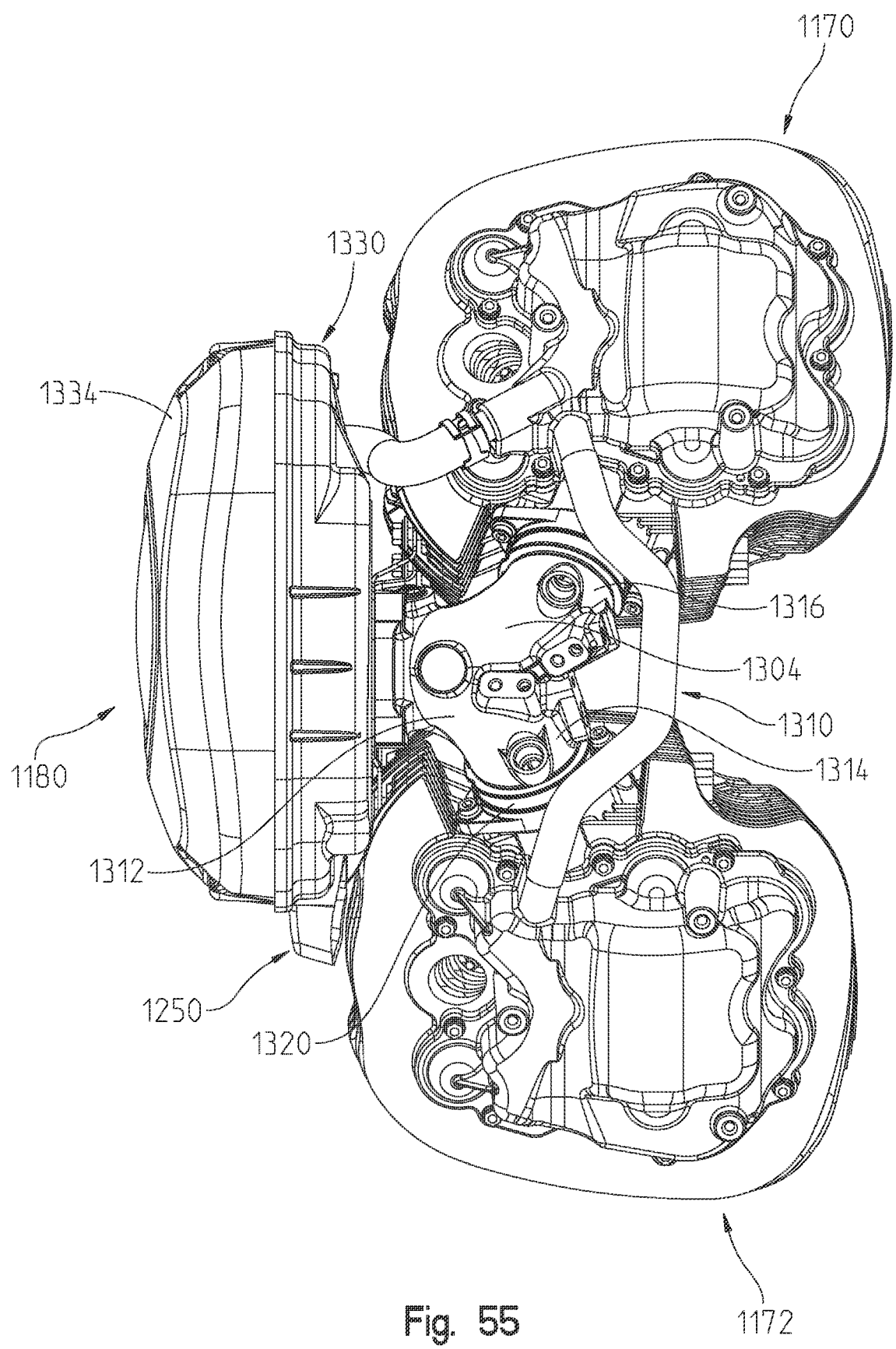
FIG. 55 is top view of the two-wheeled vehicle of FIG. 52 above the engine heads with the head covers removed.
Figure 56:
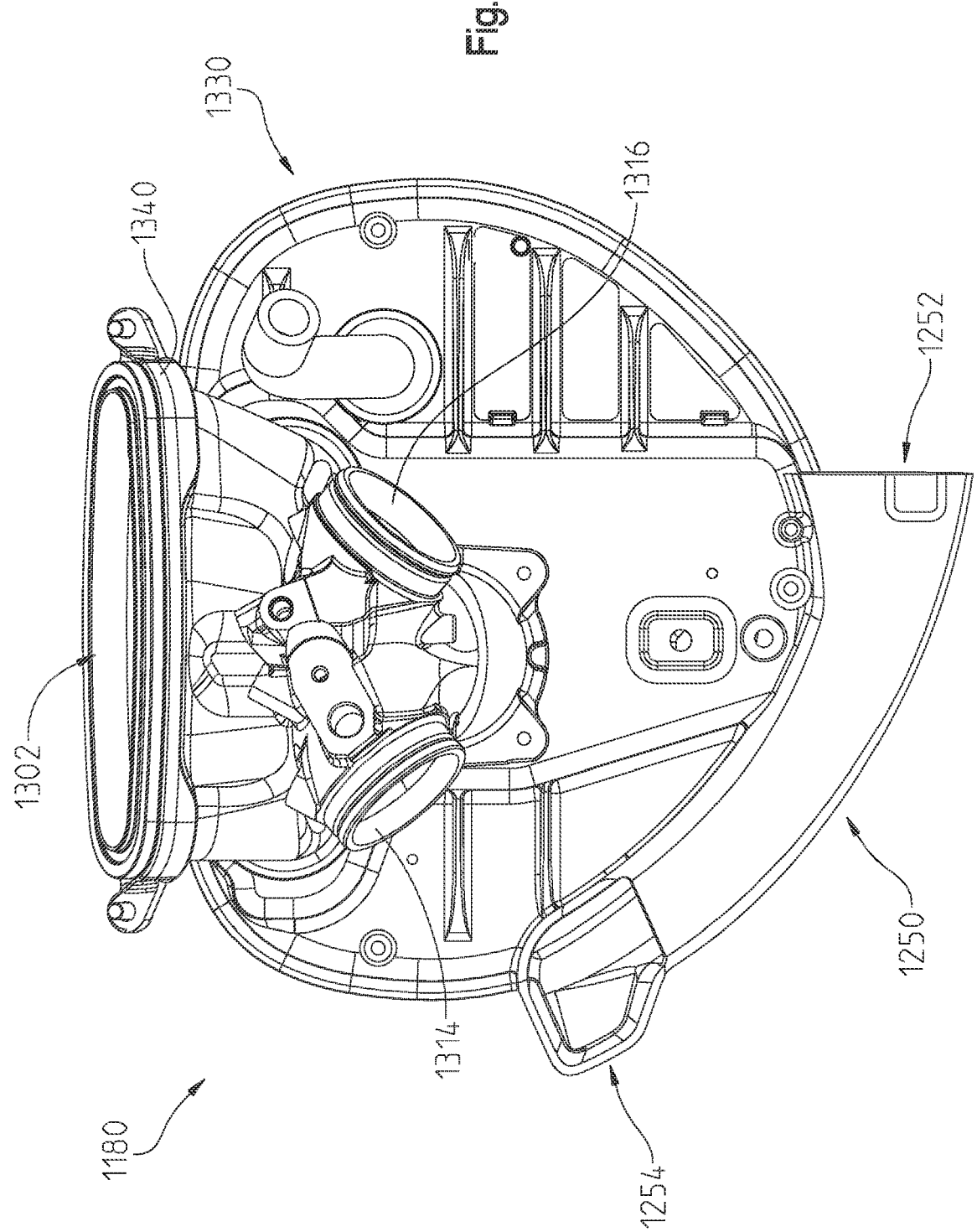
FIG. 56 is a rear plan view of the air cleaner of the two-wheeled vehicle of FIG. 52.
Figure 57:
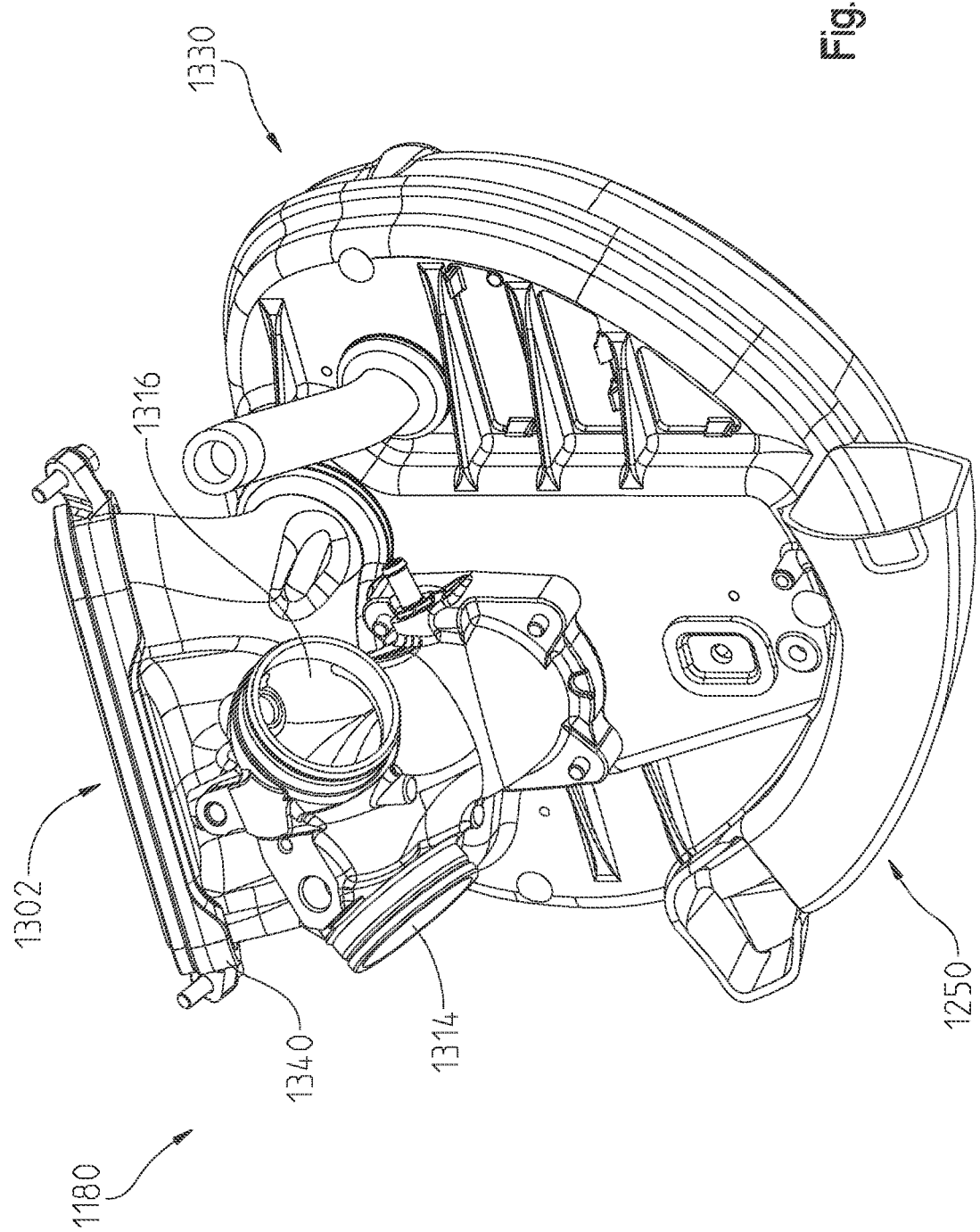
FIG. 57 is a front right perspective view of the air cleaner of FIG. 56.
Figure 58:
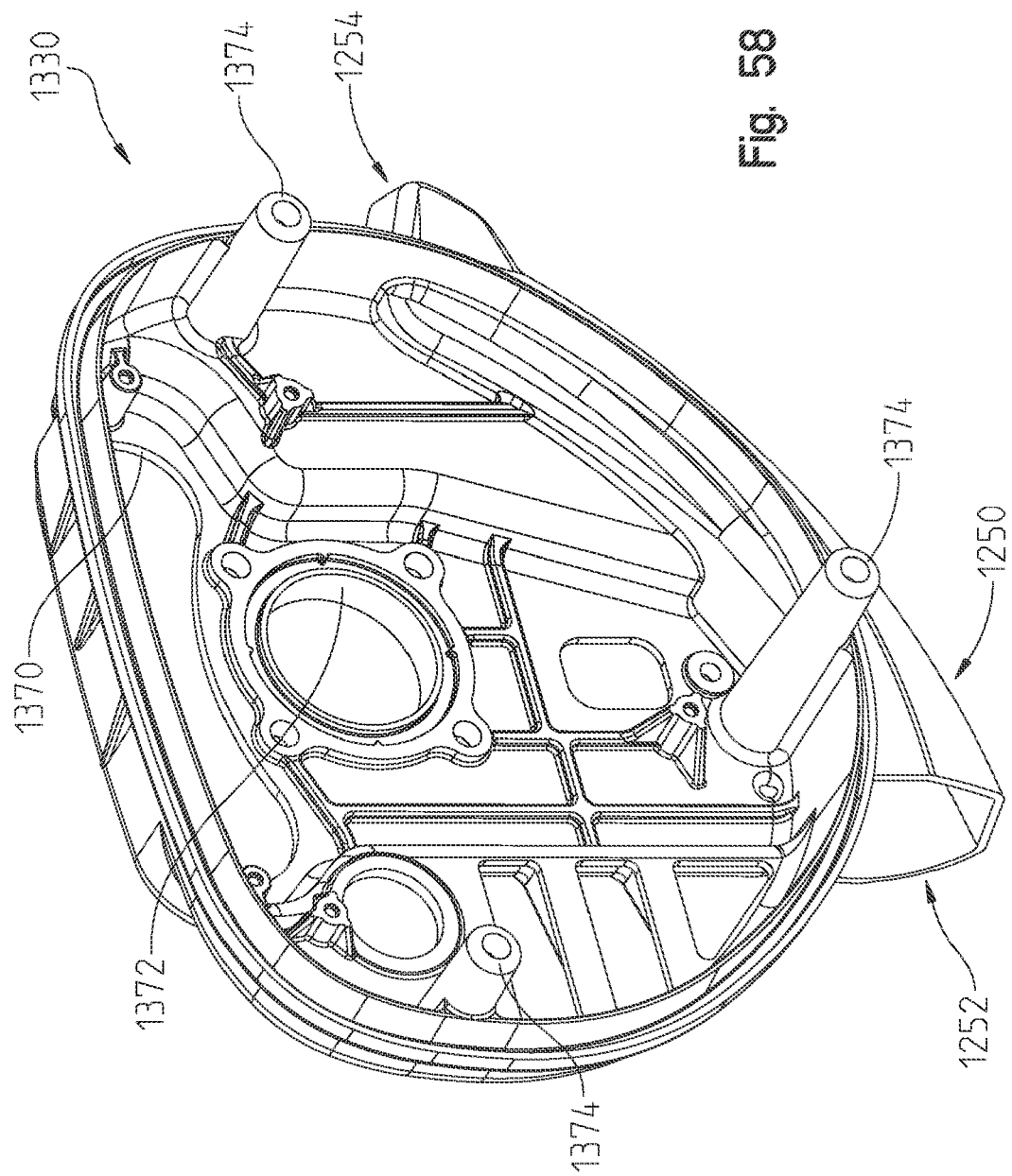
FIG. 58 is a front left perspective view of a base plate of the air cleaner of FIGS. 56 & 57.
Figure 59:
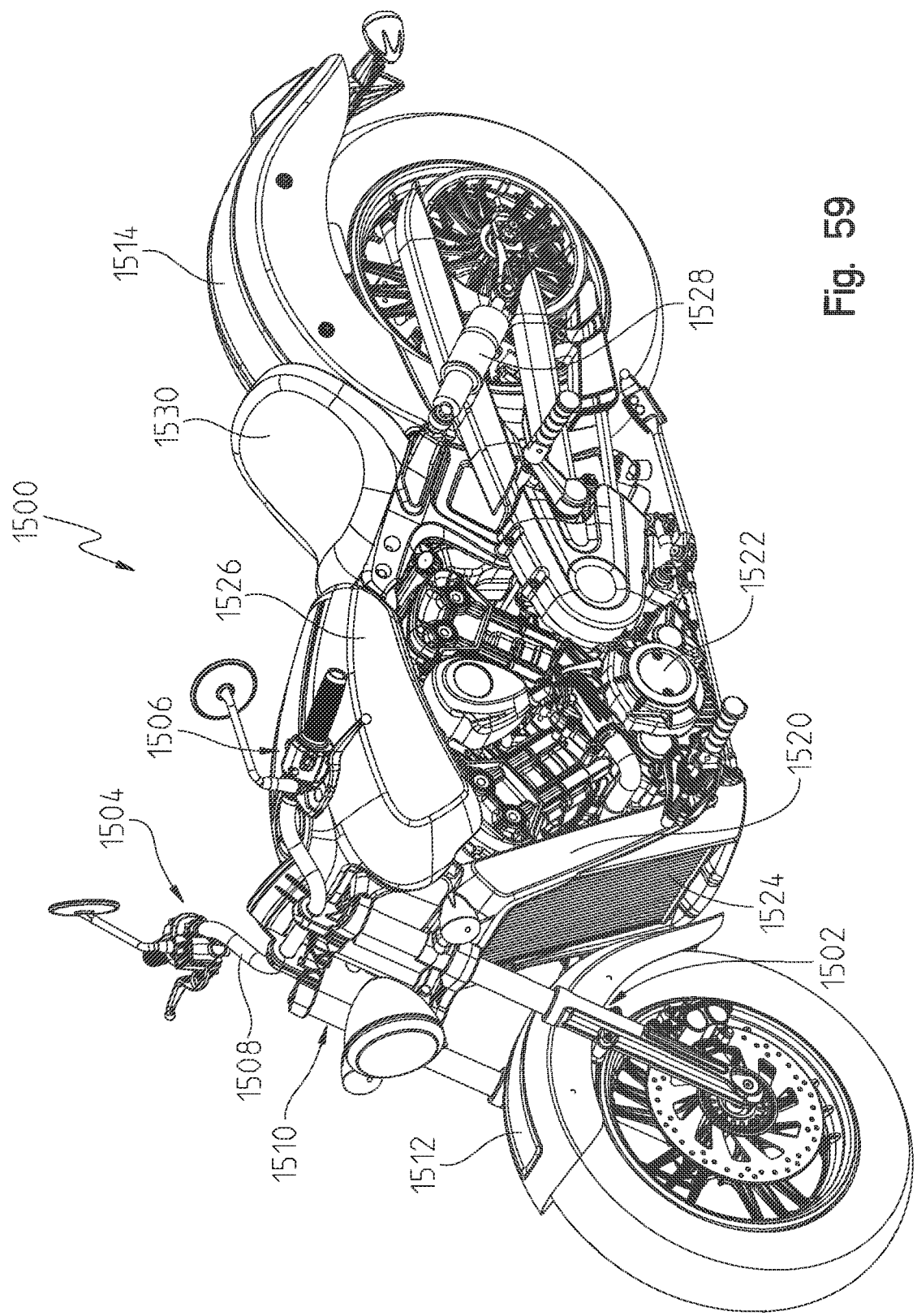
FIG. 59 is a left front perspective view of a vehicle for use with the present disclosure.

As shown in FIGS. 53-57, air intake system 1132 comprises an air cleaner 1180 having an intake duct at 1302. With reference now to FIG. 55, engine air intake system 1132 is shown including the air/fuel recirculation system 1310. Throttle 1304 is positioned intermediate cylinders 1170, 1172 and includes an intake port 1312 from air cleaner 1180 and first 1314 and second 1316 exit ports in porting air through intake ports 1318, 1320 of cylinder 1170, 1172, respectively. As shown, air cleaner 1180 includes a housing portion 1330, air valve 1331, filter media 1332, and cover 1334. The interior of air cleaner 1180 generally provides an air flow path from an intake aperture 1370 defined in housing portion 1330 to an output aperture 1372 (FIG. 58) defined in housing portion 1330 via at least filter media 1332 and air valve 1331. Recirculation system 1310 provides recirculation of air/fuel back to air cleaner 1180. Housing portion 1330 further includes cover mounts 1374 that provide stand-off portions that allow for secure mounting of cover 1334 to housing portion 1330.

FIG. 54 shows the parts of air cleaner 1180 and shows its mounting to main frame portion 1240 of frame 1104. FIG. 54 shows an interface between main frame portion 1240 and air cleaner 1180. As shown, a retaining sleeve 1340 is provided having mounting bosses at 1342 such that fasteners may be received thereby into threaded apertures. Air is received through apertures 1364, 1366 and travels through the main frame portion 1240 into air cleaner 1180 through a duct (not shown) internal to main frame portion 1240.

Another feature of the motorcycle 1102 includes an air deflector 1250 which funnels air to the rear cylinder 1172 and thereby aids in cooling the rear cylinder 1172. Air deflector 1250 is illustratively integrally formed with housing portion 1330. Accordingly, deflector 1250 is assembled to motorcycle 1102 simultaneously with the assembly of air cleaner 1180. Embodiments are envisioned where air deflector 1250 is a stand-alone and bolt-on part or is integral with another portion of motorcycle 1102. Air deflector 1250 and housing portion 1330 are illustratively formed from plastic. While air deflector 1250 is shown as integral with air cleaner 1180, the air path defined by air deflector 1250 is distinct and separate from the air cleaning path within air cleaner 1180 such that air in the deflector 1250 is not intermixed with the air within air cleaner 1180. Air deflector 1250 is positioned at a lower end of the housing portion 1330.

Air deflector 1250 includes air intake 1252 that, when assembled, is forward facing such that forward movement of motorcycle 1102 causes air to be received by intake 1252. Intake 1252 is further positioned forward of the rear cylinder 1172. Deflector 1250 illustratively has a curved shape that directs air from intake 1252 rearward and upward around the periphery of air cleaner 1180. Air deflector 1250 further includes an outlet 1254. Outlet 1254 defines an opening plane that is generally perpendicular to the predominant direction of air travel from intake 1252 to outlet 1254. Outlet 1254 is generally located at a rear side of air cleaner 1180 and forward of a rearmost point of the rear cylinder 1172. In assembly, outlet 1254 is connected to ambient and is positioned proximate a lateral side of rear cylinder 1172. More specifically, outlet 1254 is positioned proximate the cylinder head of rear cylinder 1172. In operation, combustion within a cylinder is initiated when a piston is near the top of the cylinder and as such the top of the cylinder often experiences the greatest amount of heat from the combustion process.

Intake 1252, outlet 1254, as well as the sizing of the balance of the scoop is chosen to provide increased air flow to the head of the rear cylinder 1172 without inducing substantial turbulence or flow restrictions for air received thereby.

With reference now to FIGS. 59-63, another embodiment of a two-wheeled vehicle 1500 is shown. Vehicle 1500 is similar to that described in U.S. Patent application Ser. No. 61/799,880 filed Mar. 15, 2013; Ser. No. 14/213,161 filed Mar. 14, 2014; and PCT application No. PCT/US14/28539, filed Mar. 14, 2014; the subject matter of which is incorporated herein by reference.

Vehicle 1500 is a mid-size motorcycle having a wheel base of approximately 58-65 inches and, more particularly, is approximately 61.5 inches. Vehicle 1500 includes a front end and a rear end supported by a plurality of ground-engaging members, for example a front wheel and a rear wheel. The front and rear wheels are generally aligned along a centerline of vehicle 1500. While vehicle 1500 is a two-wheeled vehicle, various embodiments of the present disclosure may include three, four, five, or six-wheeled vehicles.

Vehicle 1500 also includes a front suspension assembly 1502, a steering assembly 1504, operator controls 1506, and other systems. Steering assembly 1504 includes handlebars 1508 which may be moved by an operator to rotate the front wheel. Steering assembly 1504 is coupled to vehicle 1500 through a triple clamp assembly 1510. A front fender 1512 may be partially positioned around the front wheel and may include a light or reflector. Similarly, a rear fender 1514 may be partially positioned around the rear wheel. Vehicle 1500 also includes a frame assembly 1520 for supporting a powertrain assembly 1522, a cooling assembly 1524, a fuel tank 1526, a rear suspension assembly 1528, and an operator seat 1530.

Figure 60:
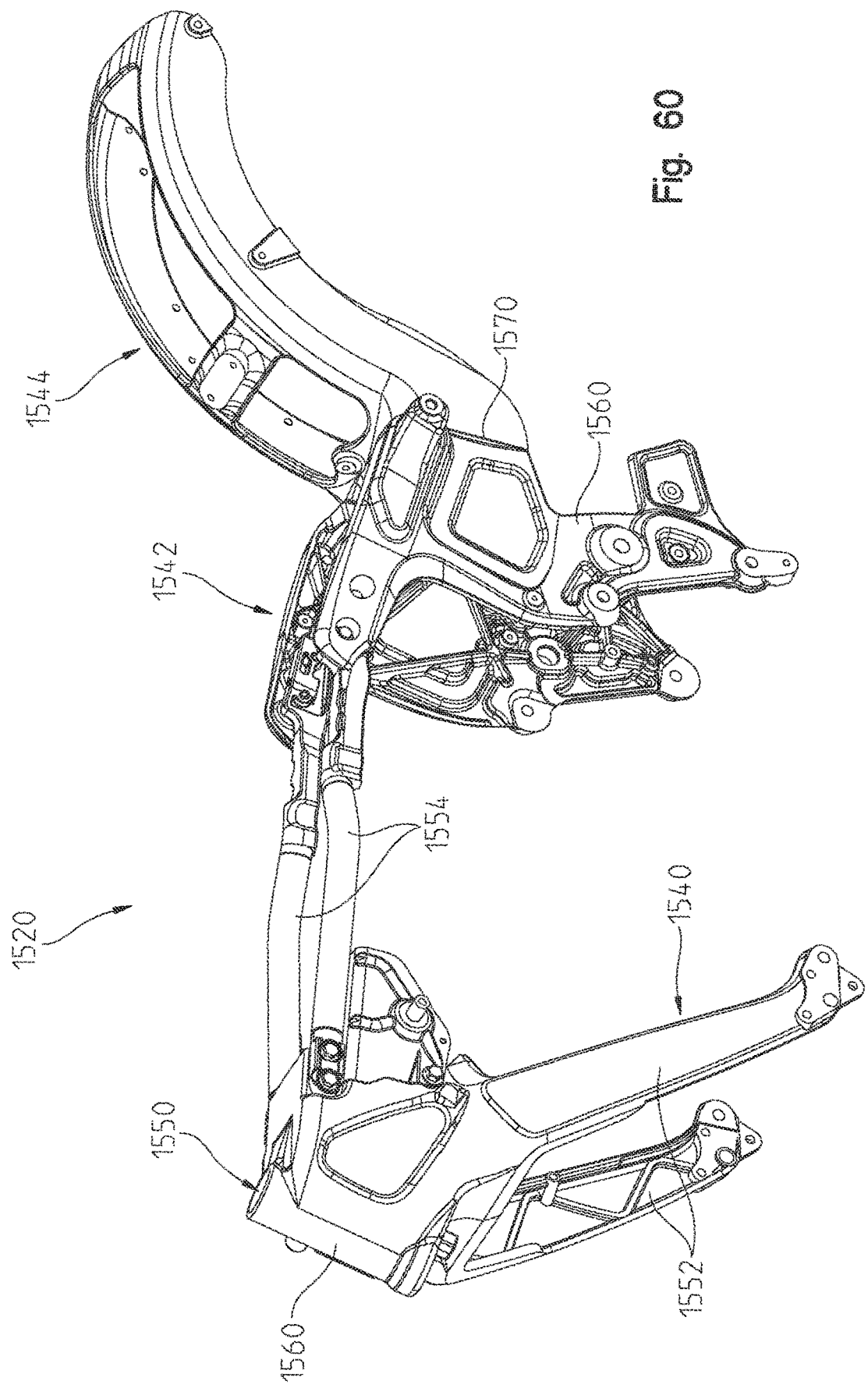
FIG. 60 is a left front perspective view of a frame assembly of the two-wheeled vehicle of FIG. 59.
Figure 61:
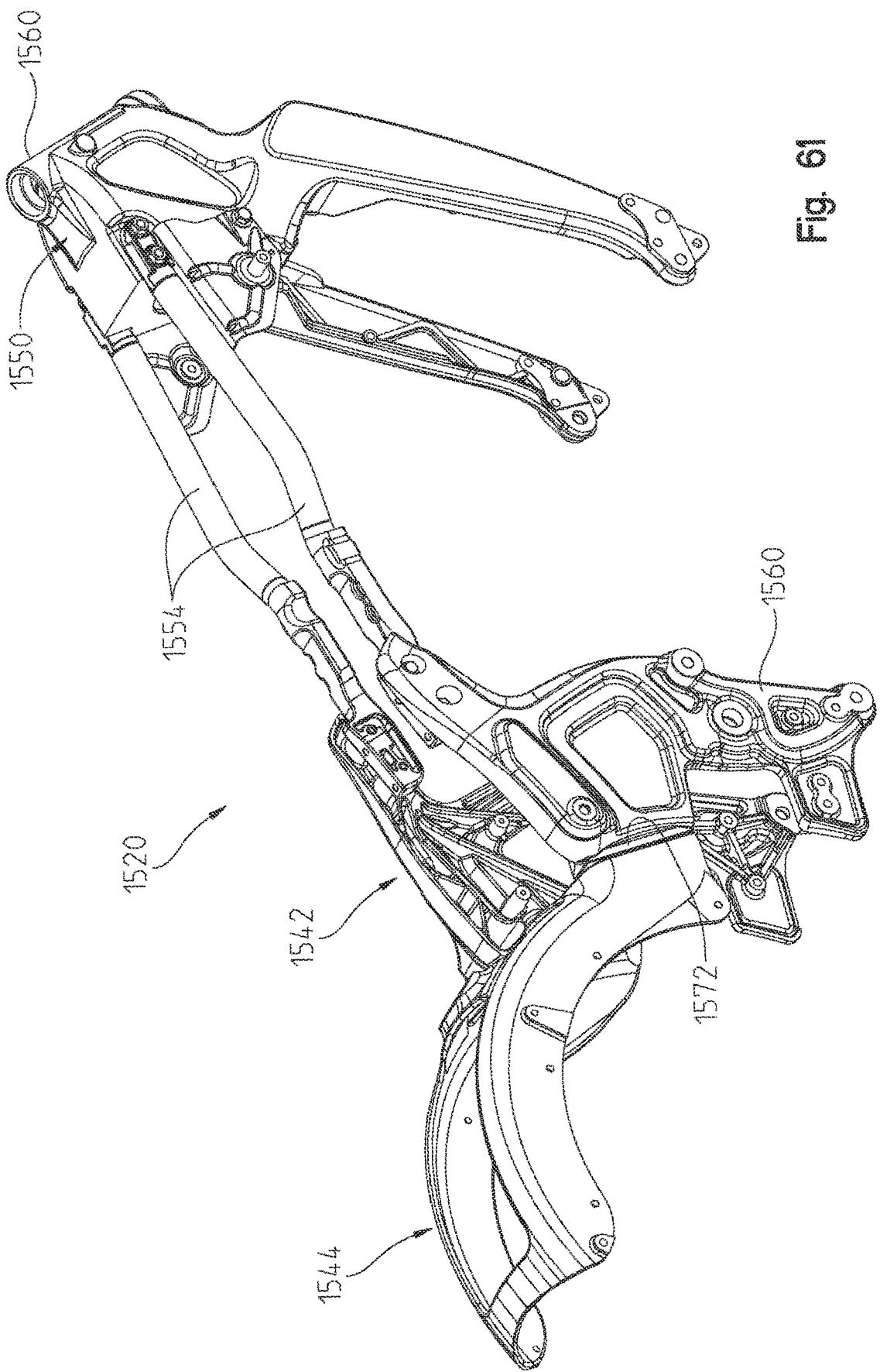
FIG. 61 is a right rear perspective view of the frame assembly of FIG. 1.
Figure 62:
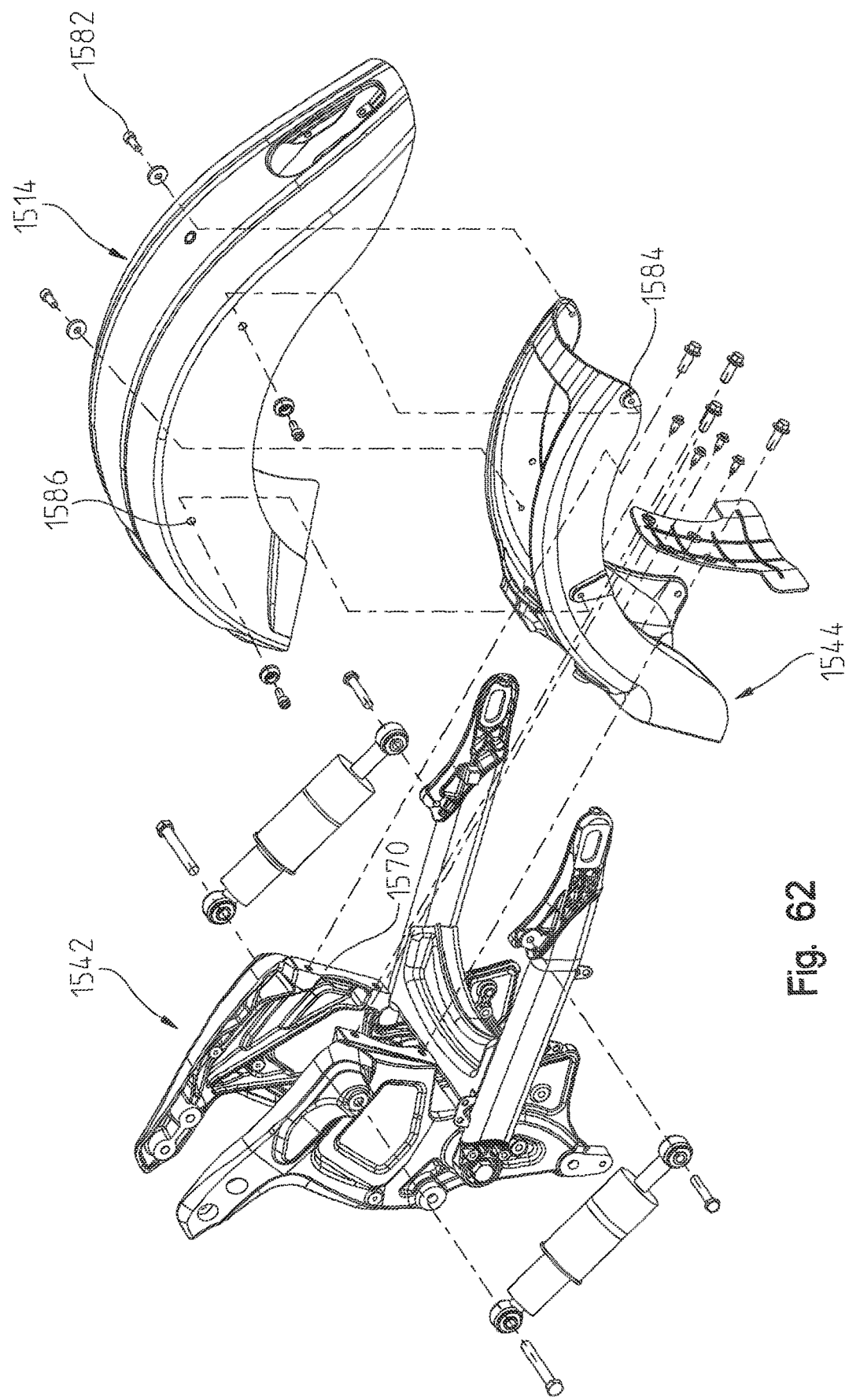
FIG. 62 is a left rear perspective view of the rear fender coupled to the rear frame.

Referring now to FIGS. 60-62, frame assembly 1520 is a modular assembly that includes a front frame 1540, a mid-frame 1542, and a rear frame 1544. Front frame 1540, mid-frame 1542, and rear frame 1544 are generally coupled together and coupled with other components of vehicle 1500 without requiring heat treatments or permanent couplers (i.e., welds). As such, various components of vehicle 1500 may be replaced with alternative components without requiring a new frame assembly.

Front frame 1540 is positioned forward of mid-frame 1542 and rear frame 1544 and includes head portion 1550 and front arm or fork members 1552 and frame rails 1554. Mid-frame 1542 includes side members 1560 and is coupled to both front frame 1540 and rear frame 1544. As detailed further herein, mid-frame 1542 is bolted to front frame 1540 and rear frame 1544, which eliminates the need for heat treating and permanently coupling together the portions of frame assembly 1520.

Front arm members 1552 of front frame 1520 extend downwardly from head portion 1550. Additionally, front arm members 1552 may be angled rearwardly relative to head portion 1550. Head portion 1550 includes a head tube 1560 for coupling with steering assembly 1504. Illustratively, front arm members 1552, head portion 1550, and head tube 1560 may be comprised of metallic materials, for example an aluminum or chrome moly material. It may be appreciated that the uniform construction of front arm members 1552, head portion 1550, and head tube 1560 eliminates the need for heat treating front frame 1520.

Frame rails 1554 extend rearwardly from head portion 1550 and define a backbone of vehicle 1500. Frame rails 1554 may be comprised of steel and allow front frame 1520 to be adjusted for stiffness and yet are sufficiently flexible to accommodate various tolerances and forces in frame assembly 1520 during assembly. More particularly, frame rails 1554 allow powertrain assembly 1522 to be coupled to frame assembly 1520 without pre-stressing frame assembly 1520. Additionally, because of the use of frame rails 1554, spacers and other adjusters may not be needed when assembling various components of vehicle 1500 with frame assembly 1520.

As shown in FIGS. 60-62, side members 1560 also define a rear interface 1570 for coupling with rear frame 1544. Rear frame 1544 includes a front interface 1572 (FIG. 61) that is complementary with and coupled to rear interface 1570 of side members 1560 with a plurality of fasteners.

Referring still to FIGS. 60-62, rear frame 1544 is shown. Rear frame 1544 is coupled to mid-frame 1542 and, more particularly, to side members 1560. Rear fender 1514 is coupled to rear frame 1544 with fasteners 1582 into threaded bosses 1584. Illustratively, four fasteners 1582 couple rear fender 1514 to rear frame 1544 through apertures 1586 on rear fender 1514 into corresponding threaded bosses 1584. The shape of rear fender 1514 generally corresponds to the shape of rear frame 1544.

Figure 63:
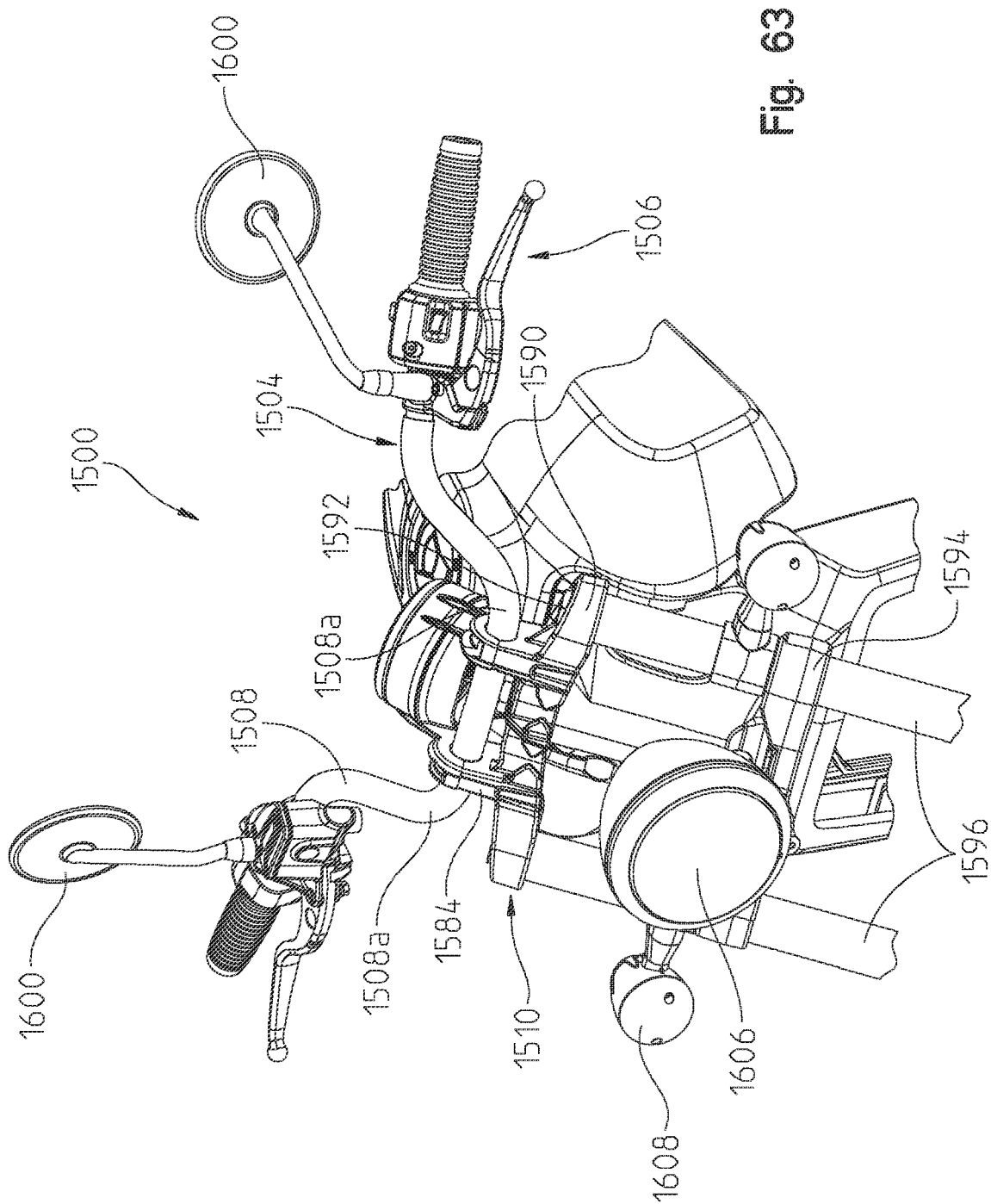
FIG. 63 is a left front perspective view of a front portion of the two-wheeled vehicle of FIG. 59 showing the steering assembly.

Referring to FIG. 63, front end of vehicle 1500 includes steering assembly 1504, controls 1506, and handlebars 1508. Handlebars 1508 may be mounted on triple clamp assembly 1510 with upper clamp 1584. Clamp portion 1590 of triple clamp assembly 1510 is coupled to head portion 1550 and is coupled to fork members 1596 with fasteners 1592. Triple clamp assembly 1510 also includes a lower clamp member 1594 coupled to forks 1596.

Handlebars 1508 include mirrors 1600 and controls 1506, which may include throttle and/or brake levers for operating vehicle 1500. Additionally, vehicle 1500 may also include a headlight 1606 and turn signals 1608, coupled to one or both of triple clamp 1510 or forks 1596. With the general structure of vehicle 1500 described, accessories for use with vehicle 1500 will now be described.

Figure 64:
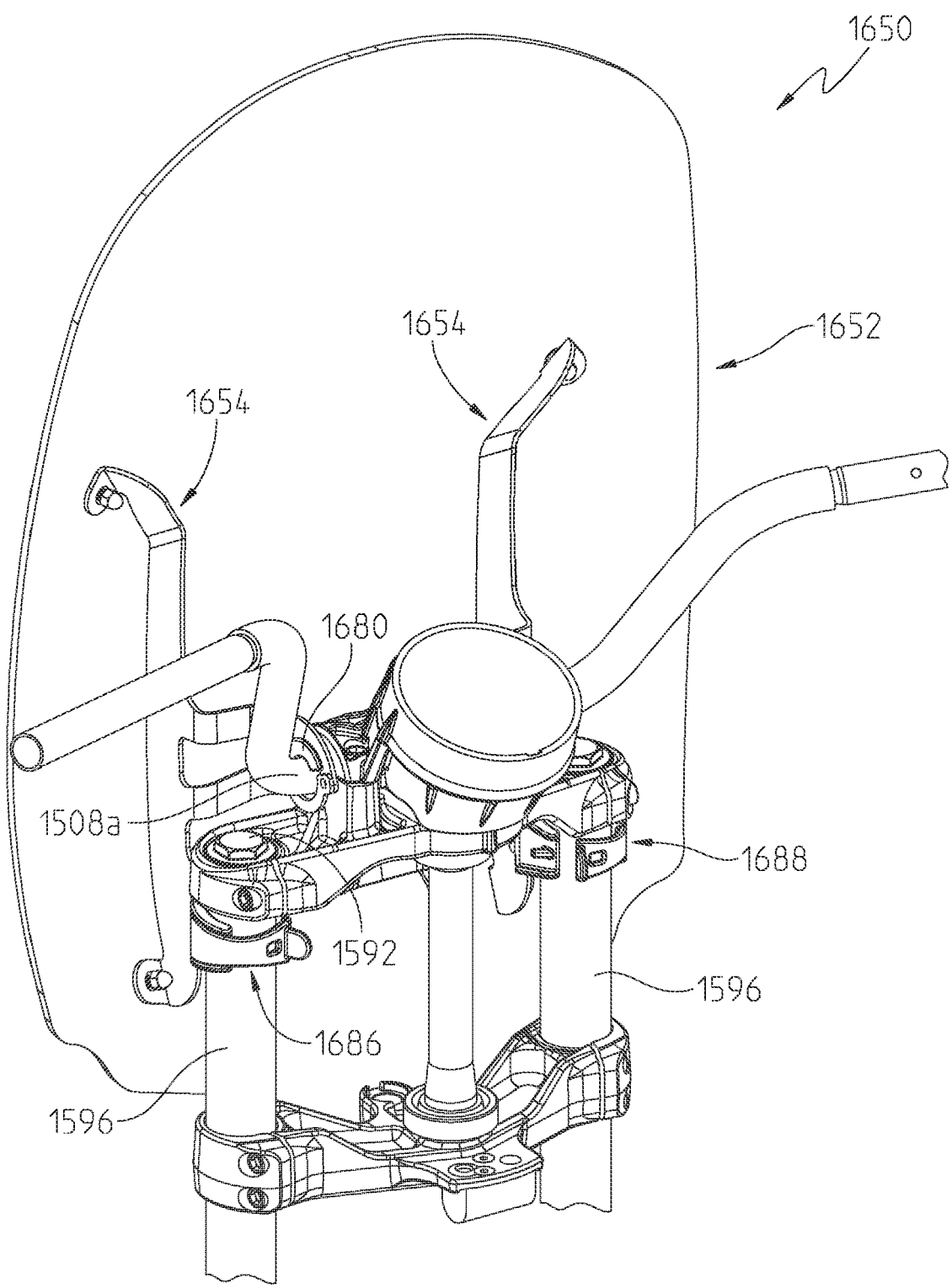
FIG. 64 is a left rear perspective view of a windshield assembly coupled to the vehicle shown in FIG. 59.
Figure 65:
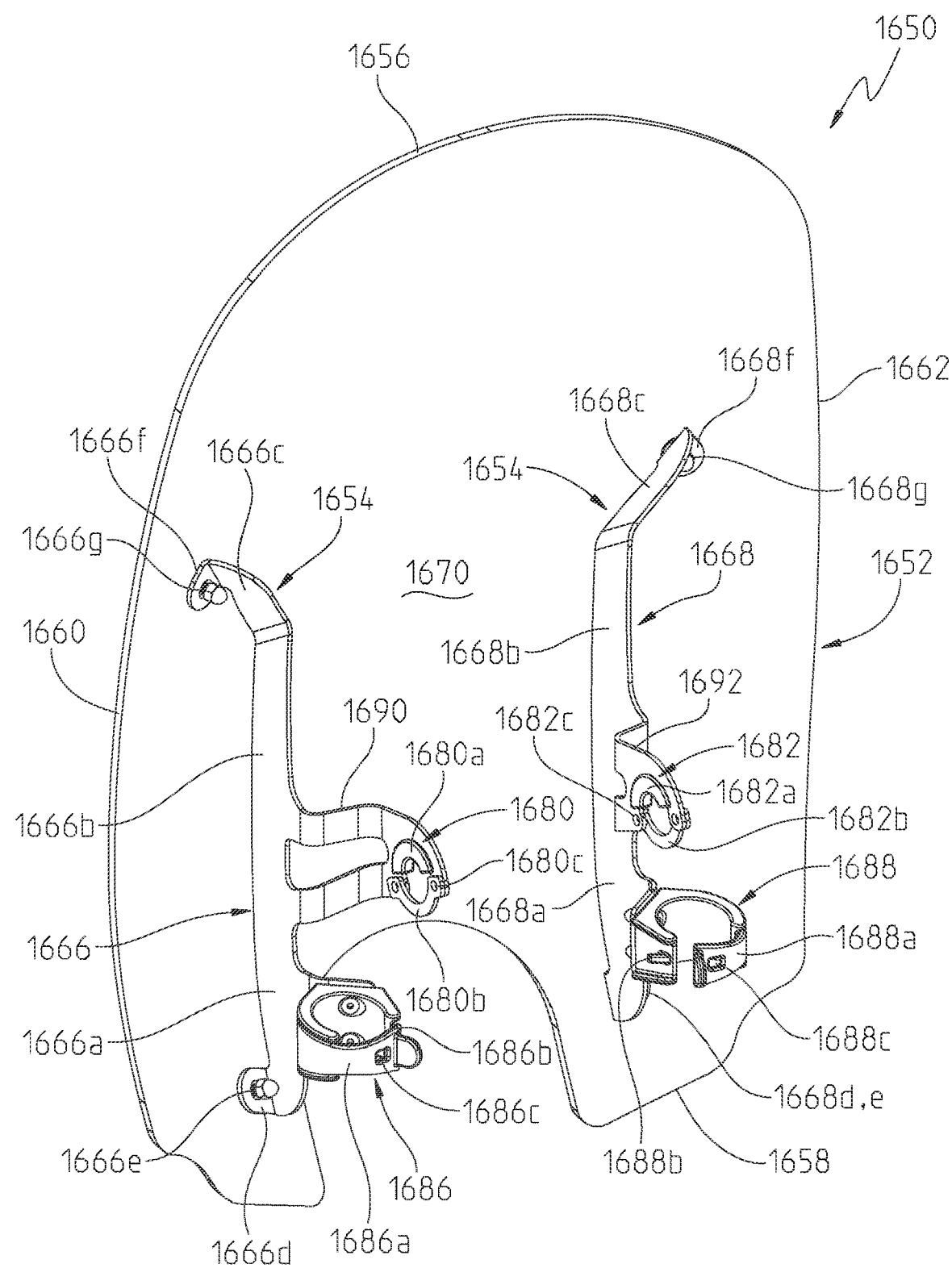
FIG. 65 is a left rear perspective view of the windshield assembly of FIG. 64.

With reference first to FIGS. 64 and 65, an accessory windshield assembly is shown as 1650. The windshield assembly 1650 generally includes a windshield 1652 and a bracket assembly 1654. The windshield 1652 has an upper end 1656, a lower end 1658 and side edges 1660 and 1662. The bracket assembly 1654 comprises two bracket portions 1666 and 1668, where each bracket portion is coupled to an inside surface 1670 of the windshield 1652. Each bracket portion 1666 and 1668 has an elongate bracket frame section 1666a, 1668a, where each bracket frame section includes a generally vertically extending portion 1666b, 1668b, and an angled portion 1666c, 1668c. Each angled portion 1666c, 1668c is angled towards corresponding side edges 1660, 1662 of the windshield 1652.

The bracket portions 1666 and 1668 also include mounts 1680, 1682 which couple to the handlebars 1508 (FIG. 63), as further described herein. The bracket portions 1666 and 1668 also include clamps 1686, 1688 which couple to the forks 1596 (FIG. 64), as further described herein.

The generally vertically extending portions 1666b, 1668b each include a mounting tab 1666d, 1668d defining first attachment points 1666e, 1668e respectively positioned adjacent to the lower end 1658 of the windshield 1652. Thus, the first attachment points are supported by lower ends of the generally vertically extending portions 1666b, 1668b. The generally angled portions 1666c, 1668c each include a mounting tab 1666f, 1668f defining second attachment points 1666g, 1668g respectively, where the second attachment points 1666g, 1668g are adjacent to the side edges 1660, 1662 of the windshield 1652. Thus, the second attachment points are supported by outer ends of the angled portions 1666c, 1668c. The bracket frame sections 1666a, 1668a support the first and second attachment points.

Figure 65A:
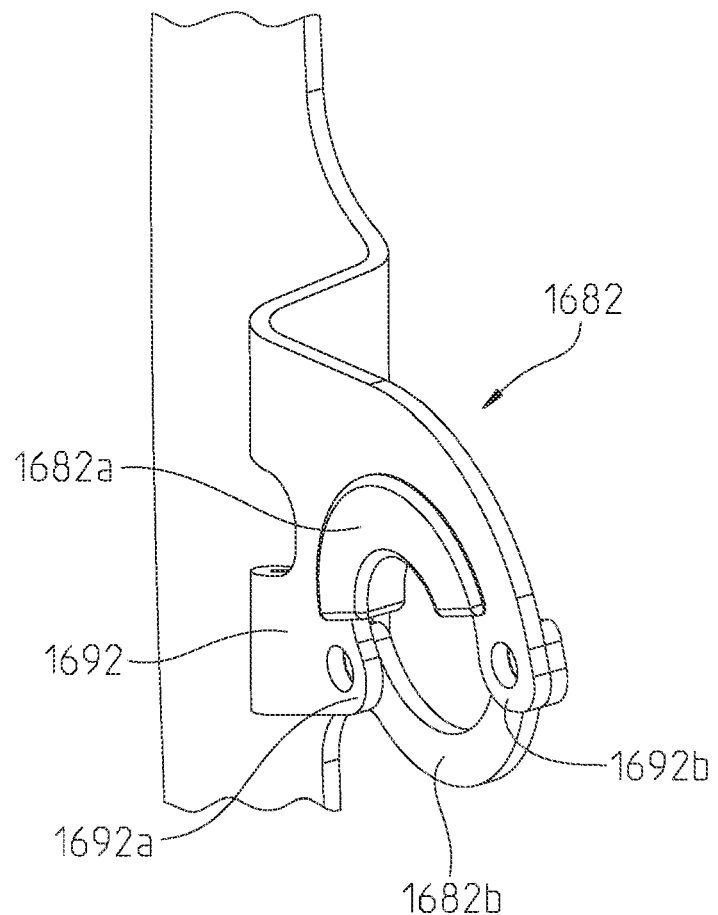
FIG. 65a is a partially cut-away view of an arm of the windshield assembly of FIGS. 64 & 65.
Figure 66:
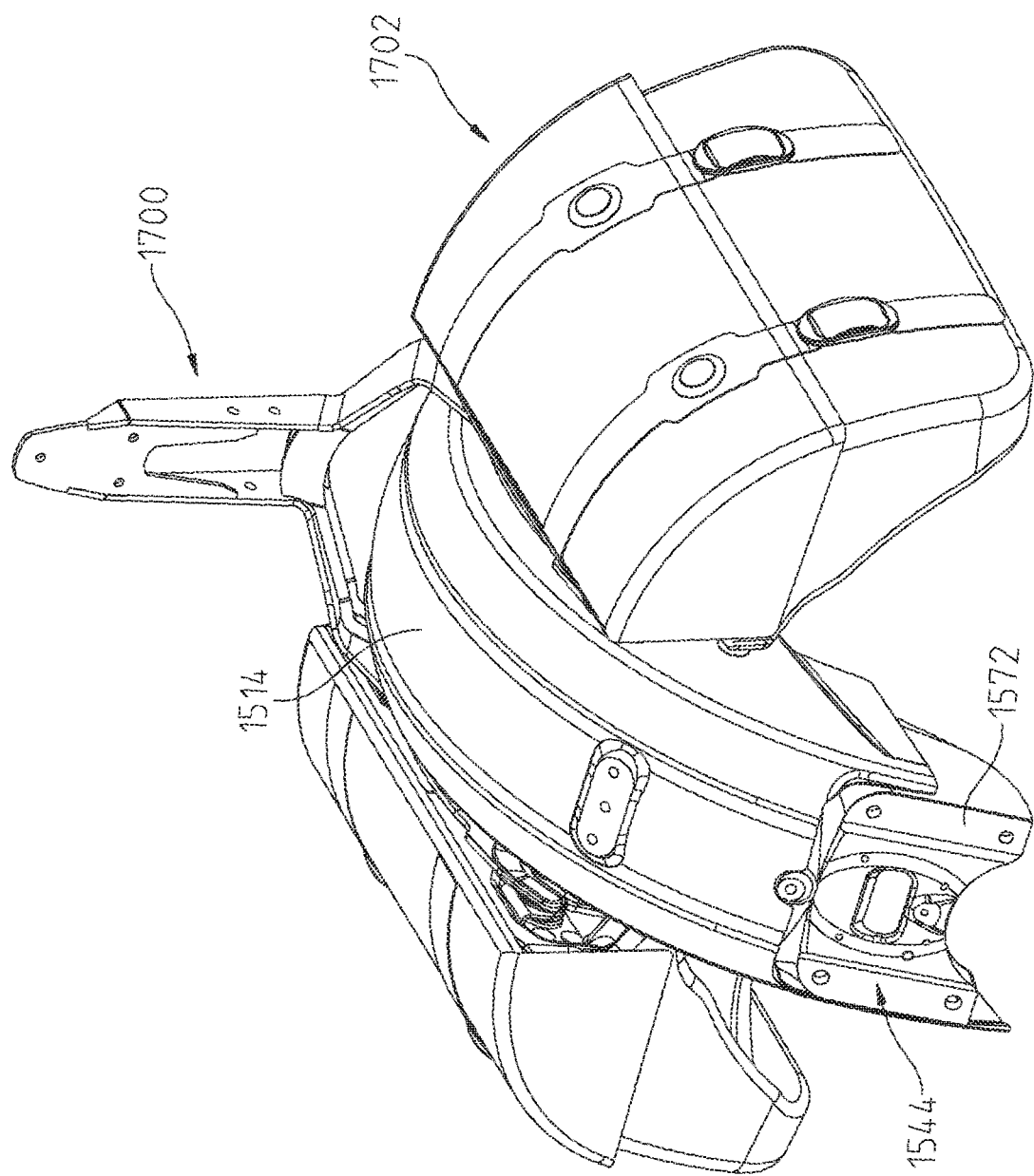
FIG. 66 is a left front perspective view of accessories mounted to the rear frame portion.
Figure 67:
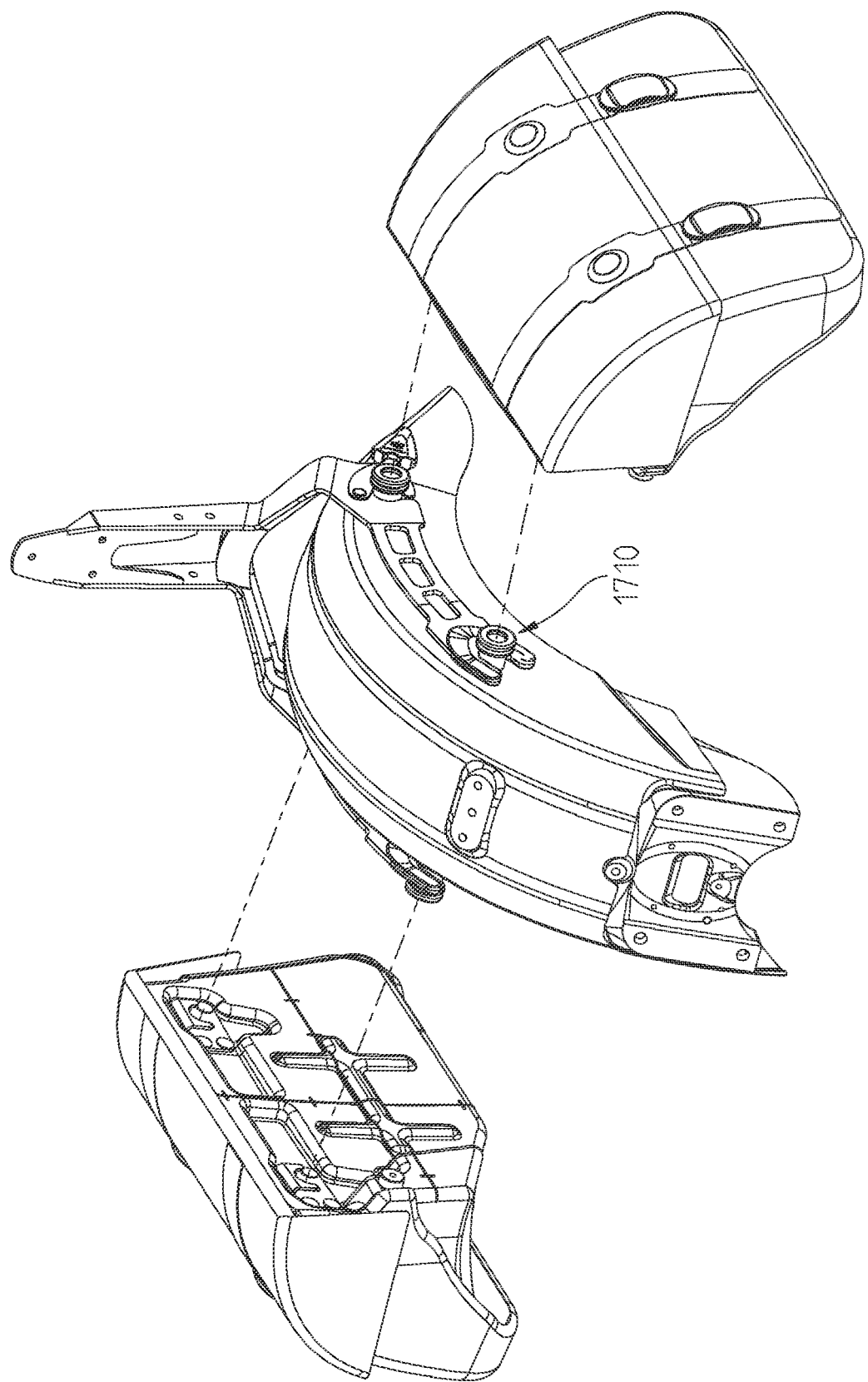
FIG. 67 is a view similar to that of FIG. 66 showing the saddlebags exploded from the vehicle.

As shown, each bracket frame section 1666a, 1668a has a bracket arm 1690, 1692 which supports one of the mounts 1680, 1682. As shown, each bracket arm 1690, 1692 jogs the mounts towards a vertical centerline of the windshield. The mounts 1680, 1682 each include an upper mount portion 1680a, 1682a and a lower mount portion 1680b, 1682b. The lower mount portions 1680b, 1682b are coupled to the upper mount portions 1680a, 1682a by way of fasteners (through apertures 1680c, 1682c) providing a semi-permanent attachment. As shown best in FIG. 65A, arm 1692 is shown in greater detail and the same detail refers to arm 1690. Arm 1692 includes a U-shaped opening or yoke defined open ends 1692a and 1692b. Upper mount portion is made of a material so as to not scratch the handle bars.

The lower clamp portions 1686, 1688 may comprise a rubber like strap 1686a, 1688a coupled to a hook 1686b, 1688b, by way of latch openings 1686c, 1688c. Alternatively, the clamps 1686, 1688 may be of the type described in U.S. patent application Ser. No. 13/361,075 filed Jan. 30, 2012 and PCT application number PCT/US13/23103, filed Jan. 25, 2013; the subject matter of which is incorporated herein by reference. In either event, the clamps 1686, 1688 couple the windshield to the forks without the use of fasteners, providing a latchably releasable attachment.

As shown, it should be appreciated that the generally vertically extending portions 1666b, 1668b are coupled to the windshield on opposite sides of the vertical centerline of the windshield. It should also be noted that the second attachment points 1666g, 1668g are positioned vertically above the first attachment points 1666e, 1668e. As shown, the mounts 1680, 1682 have an axis complementary to that of the handlebar of the vehicle, that is, and as shown in FIG. 64, mounts 1680, 1682 cooperate with handle bar sections 1508a for mounting. As also shown, the clamps 1686, 1688 are positioned vertically higher than the first attachment points 1666e, 1668e; and the mounts 1680, 1682 are positioned vertically lower than the second attachment points 1666g, 1668g.

Thus, to install the windshield assembly 1650 to the handlebars 1508, the windshield may be placed with mount portions 1680a, 1682a such that they rest on handlebar sections 1508a. Windshield assembly may be placed in a generally angled position relative to the motorcycle. The mount portions 1680b, 1682b are then attached to the arms 1682, 1692, whereupon the windshield may be rotated to the vertical position shown in FIG. 64, and clamps 1686, 1688 attached to forks 1596. Lower mount portions 1680b, 1682b are not required for the operation of the windshield assembly, as all of the load from the force against the windshield during use is borne by the arm yoke and upper mount portions 1680a, 1682a. The lower mount is for theft deterrent of the windshield assembly.

Figure 72:
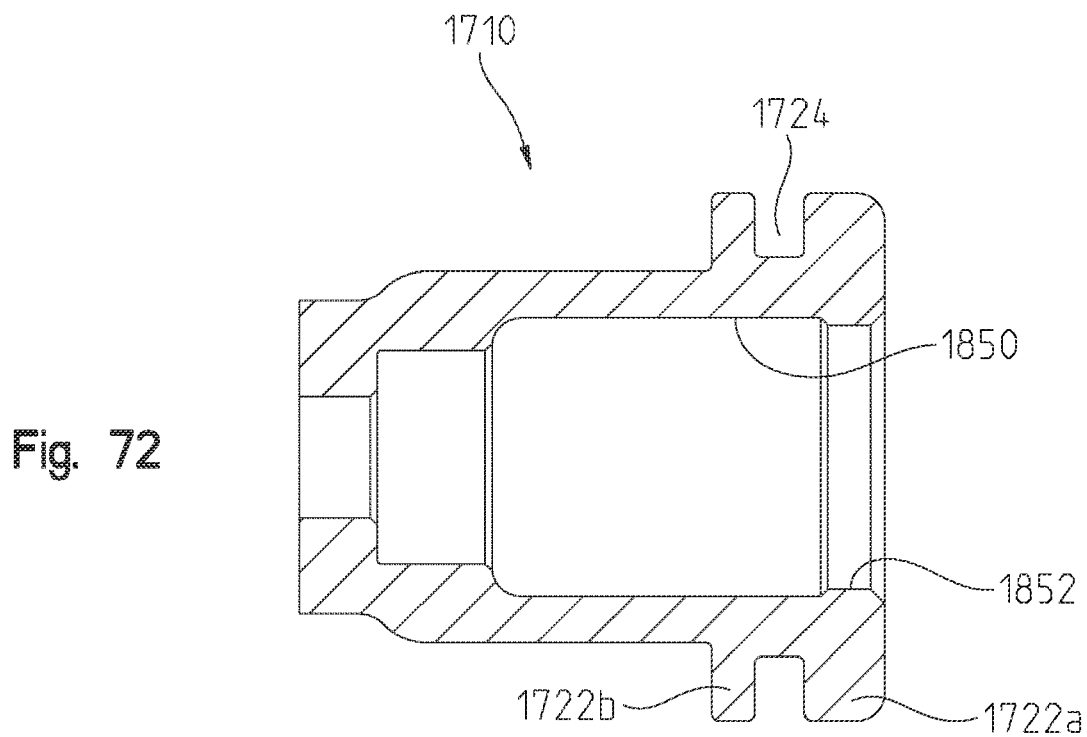
FIG. 72 is a cross-sectional of the coupler through lines 72-72 of FIG. 71.

With reference now to FIGS. 66-73, an accessory backrest 1700 and saddlebag assembly 1702 will be described that both mount to frame 1520. In a similar manner to that described above with reference to FIG. 36, a coupler 1710 is provided having a countersunk portion 1712 (FIG. 71) profiled to be received in opening 1714 and to receive fastener 1716 therethrough coupling coupler 1710 to fender 1514 and frame 1520. Coupler 1710 defines an outer engagement surface 1718, an inner opening 1720, and an outer lip 1722 as described herein. Lip 1722 has a groove 1724, thereby defining an outer lip portion 1722a and 1722b (FIG. 72). Coupler 1710 further includes an inner gripping surface 1850, and having a lip at the end thereof defining a reduced diameter portion 1852. It should be appreciated that a portion of coupler 1710 extends beyond opening 1714 for engagement of a locking mechanism on backrest assembly 1700 as further described herein.

Figure 68:
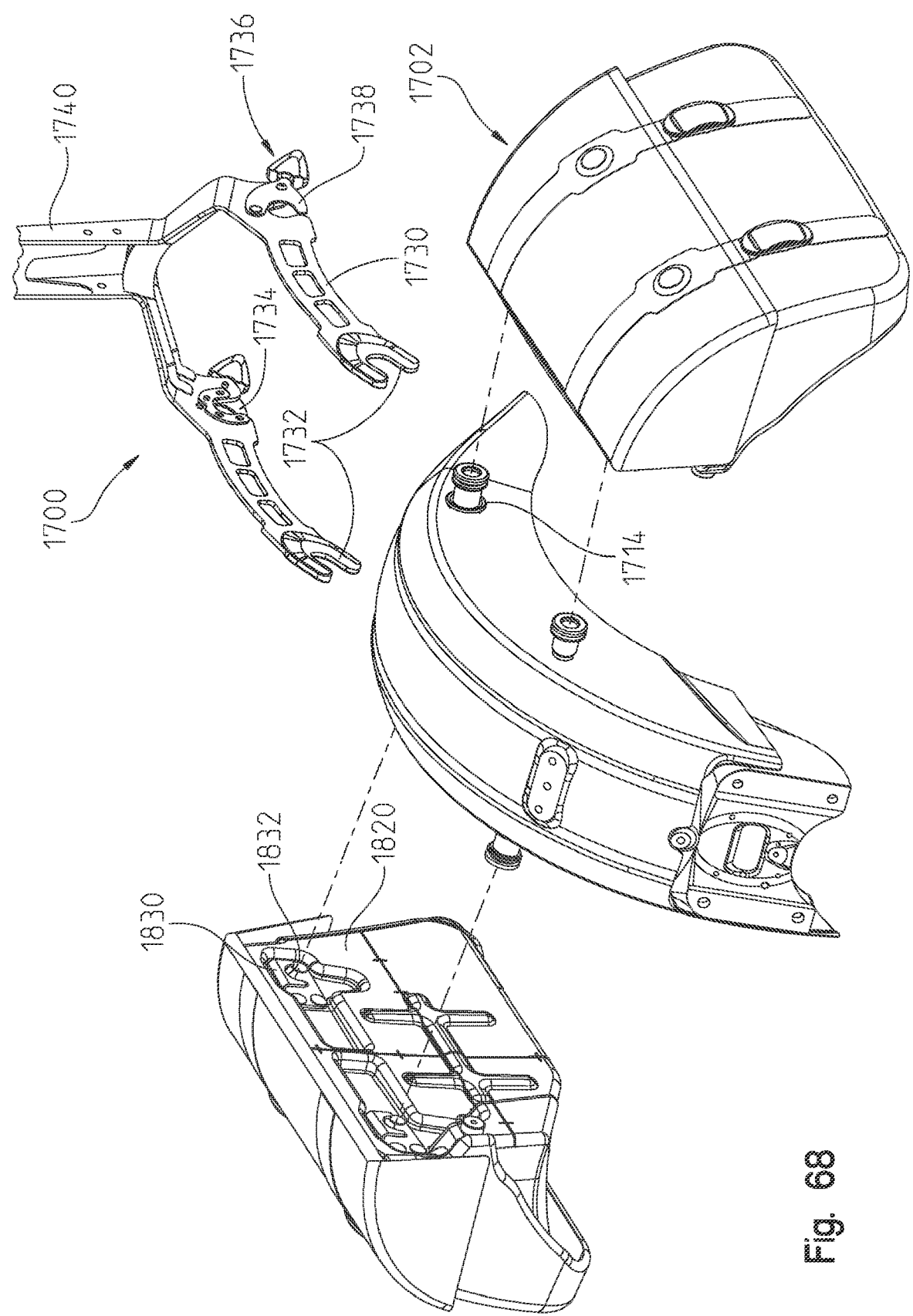
FIG. 68 is a view similar to that of FIG. 67 showing the passenger seat rest exploded from the vehicle.

With reference now to FIG. 68, the accessory backrest 1700 will be described in greater detail. As shown, the backrest 1700 includes attachment legs 1730 having a forward attachment yoke 1732 and a rearward aperture 1734 including a locking mechanism 1736 having a locking jaw at 1738. While not shown, it should be appreciated that a padded backrest would be coupled to upstanding frame portion 1740 of backrest 1700.

Figure 69:
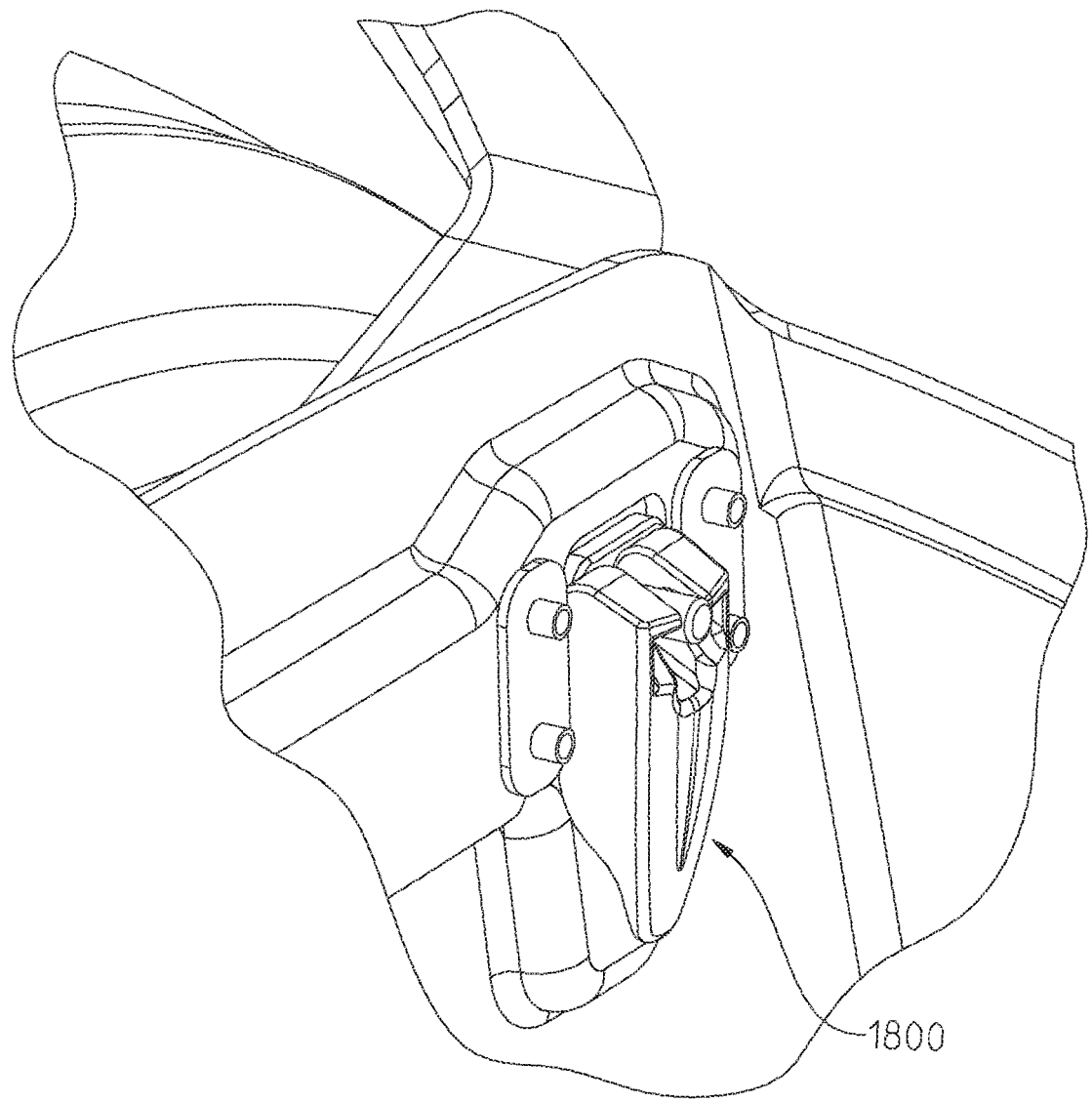
FIG. 69 is a view showing the latch within the inner portion of one of the saddlebags.
Figure 70:
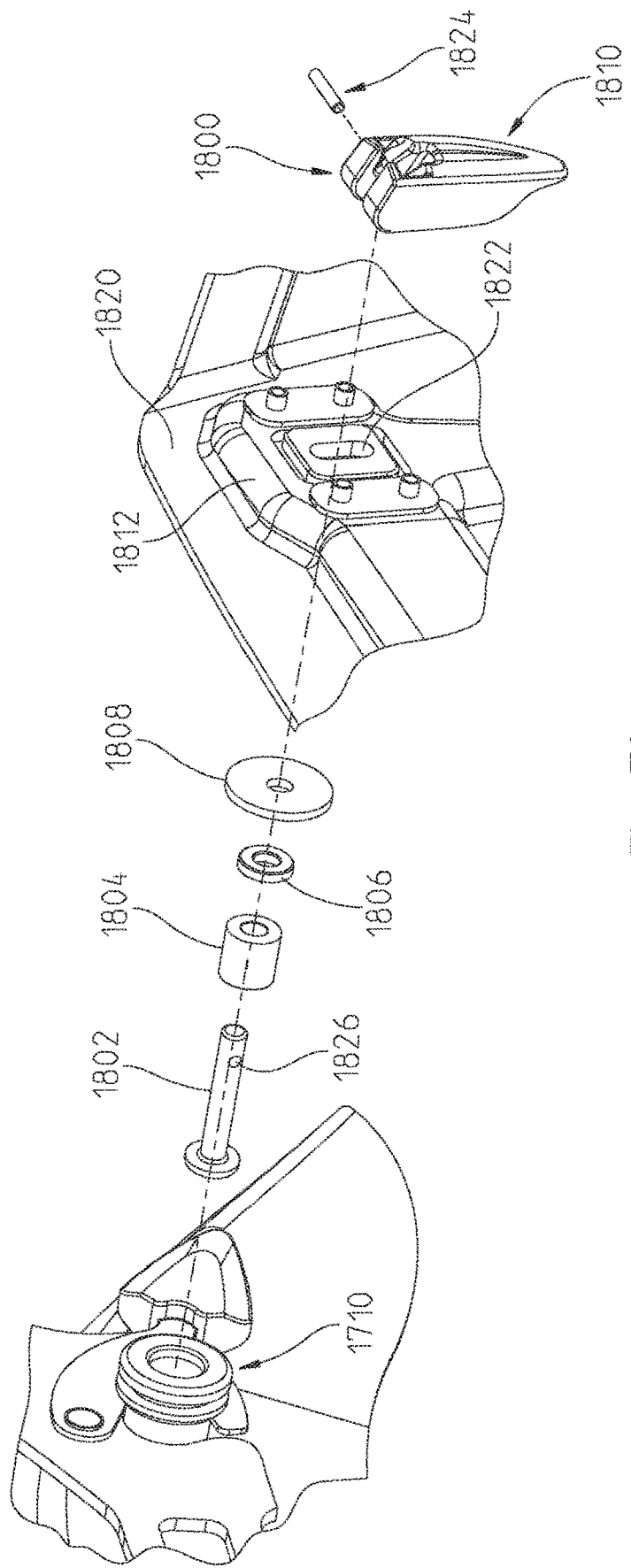
FIG. 70 is a view showing the latch assembly in an exploded manner.
Figure 71:
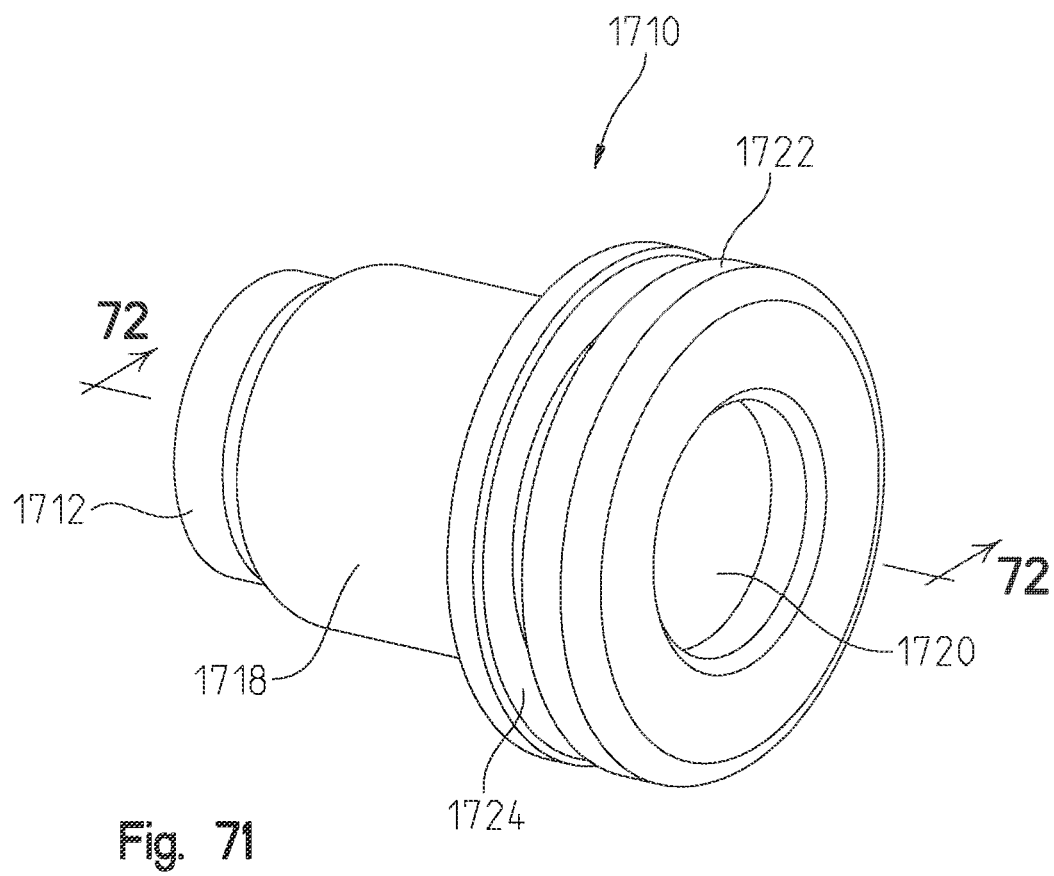
FIG. 71 is an enlarged view of the coupler.
Figure 73:
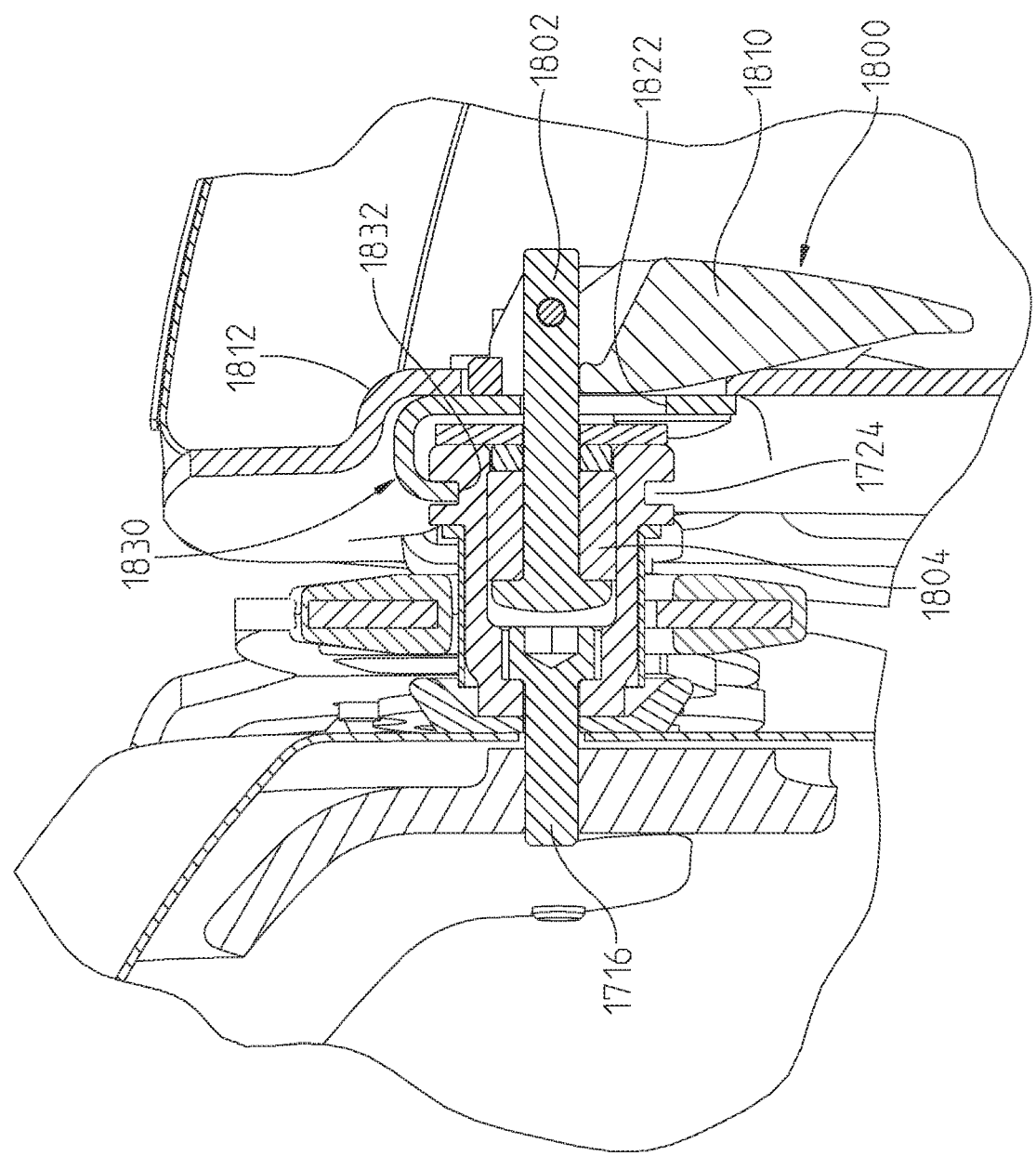
FIG. 73 is a cross-sectional view through the saddlebag assembly.

In addition, FIGS. 69, 70 and 73 show a coupler member 1800, which is not required for locking the backrest 1700, but rather for locking the saddlebags. This is shown in FIG. 70, where couplers 1800 would comprise plunger 1802, resilient and deformable member 1804, spacer 1806, outer washer 1808, lever 1810 and sidewall portion 1812 of saddlebag 1702. It should be appreciated that plunger 1802 extends through items 1804, 1806 and 1808 and through back wall 1820 of saddlebag 1702, particularly through slotted aperture 1822, where it couples with lever 1810 by way of lock pin 1824 and aperture 1826. In addition, the back wall 1820 of saddlebag 1702 includes a retaining clip 1830 each having an inverted U-shaped opening 1832 (FIG. 68).

Thus, the combination of saddlebag 1702, locking member 1800 and retaining clip 1830 may be positioned with coupler member 1800 into aperture 1720. Due to the slotted aperture 1822, plunger 1802 may move vertically relative to the saddlebag. Thus, retaining clip U-shaped opening 1832 may be spaced from the plunger 1802 upon entry of the plunger 1802 into aperture 1720, and once inserted, retaining clip may be dropped into groove 1724 (FIG. 71) as best shown in FIG. 73, This is accomplished by the slotted aperture 1822 (FIG. 70) allowing vertical movement between the bag portion and the plunger 1802. Lever 1810 is now rotated to a position where plunger 1802 is pulled, deforming resilient member 1804 (to the right as viewed in FIG. 73) whereupon resilient member 1804 is reduced in length, but increased in diameter where it grasps aperture 1720. More particularly, the resilient member 804 grips surface 1850, behind surface 1852 (FIG. 72), and spacer 1806 fits within reduced diameter 1852. Said differently, resilient member expands to a diameter greater than diameter 1852, and is locked in place therein. Coupler 1800 is an accessory coupling system similar to the one disclosed in U.S. Pat. No. 7,055,454, the disclosure of which is expressly incorporated herein by reference; also known as assignees' Lock & Ride® expansion coupler mounts. Alternatively, a locking pin as shown in our U.S. patent application Ser. No. 14/078,487 could be used in place of the coupler 1800.

Figure 74:
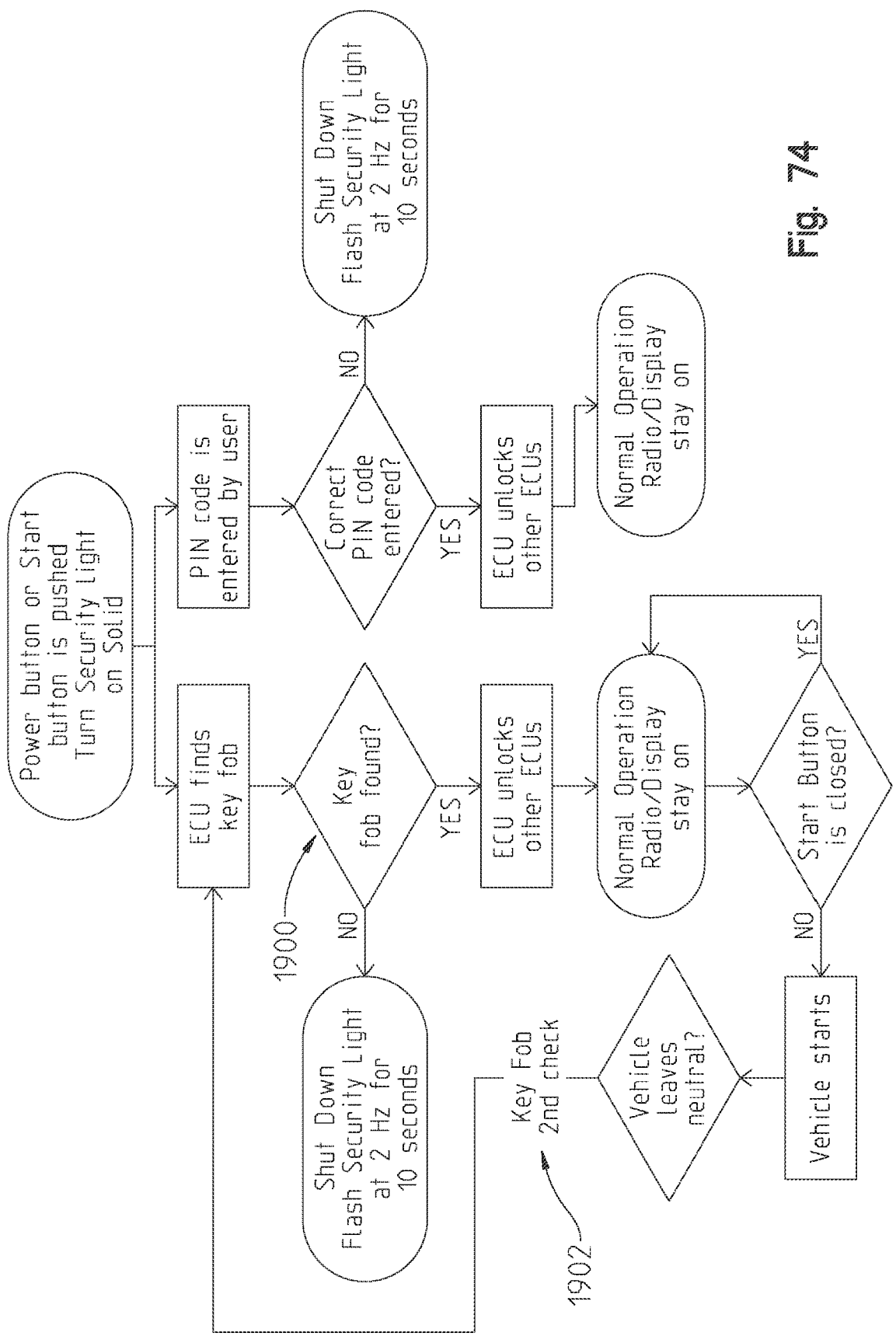
FIG. 74 is a flowchart showing operation of a security device/system usable with the two-wheeled vehicle of the preceding figures.

In the illustrated embodiment shown in FIG. 74, a security device such as a key fob or other hardware security token device carried by an operator that enables operation of any of the vehicles described herein and of vehicle functions provided with an ECM. This control function is also described in our patent application Ser. No. 14/078,487 filed Nov. 12, 2013, the subject matter of which is incorporated herein by reference. VCM is operative to detect security device at step 1900 within a particular range of the motorcycle, such as within several feet or another suitable distance. The fob includes an identifier, such as an identification number or code stored in a memory of the fob, for example that is detected by the ECU. The ECU compares the identifier of the fob to an identifier stored in memory to validate the fob for allowing motorcycle operation. Upon confirmation that the fob is valid, the ECU is programmed to enable one or more vehicle functions. When the fob is out of range of the motorcycle the ECU serves to immobilize the motorcycle.

A security feature is added at step 1902 which allows the re-validation of the fob after the immobilization. For example, when a rider starts the vehicle, for example to allow the vehicle to warm up, the fob is detected at step 1900. If the rider steps away from the vehicle, the vehicle remains running but is immobilized for riding from someone other than the person carrying the fob. When the rider returns, the fob is re-validated at step 1902 and when validated, is operational.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motorcycle air cleaner housing comprising:
   a housing element;
   an air intake defined in the housing element;
   an air output defined in the housing element;
   an air cleaning path linking the air intake to the air output, the air cleaning path including an air cleaner disposed therein;
   an air deflector integral with the housing element, the air deflector including a deflector input positioned to receive ambient air and a deflector output positioned to output air from the air deflector to ambient, the air deflector providing an air deflector path distinct from the air cleaning path,
   wherein the air deflector has a curved shape that directs air from the deflector input rearward and upward around a periphery of the air cleaner to the deflector output, the deflector output positioned vertically higher than the deflector input.

2. The motorcycle air cleaner housing of claim 1, wherein the housing element further includes cover mounts operable to couple an air cleaner cover thereto.

3. The motorcycle air cleaner housing of claim 2, wherein the air deflector is shaped to route air from the deflector input along the air deflector path to the deflector output.

4. The motorcycle air cleaner housing of claim 3, wherein the air deflector path traverses along a periphery of the air cleaner cover when the air cleaner cover is coupled to the housing element.

5. The motorcycle air cleaner housing of claim 1, wherein, when in use coupled to a motorcycle frame, the air deflector is positioned on a lower end of the housing element.

6. The motorcycle air cleaner housing of claim 1, wherein, when in use and coupled to a motorcycle frame, the deflector output is positioned at a rear end of the housing element.

7. The motorcycle air cleaner housing of claim 1, wherein, when in use and coupled to a motorcycle frame, the deflector output is positioned such that air exiting therefrom contacts an engine cylinder head.

8. The motorcycle air cleaner housing of claim 7, wherein the engine cylinder head is a rear cylinder head of an engine having at least two cylinders.

9. The motorcycle air cleaner housing of claim 1, wherein the deflector output, when assembled to a motorcycle, is laterally adjacent to a cylinder head of an engine of the motorcycle.

10. The motorcycle air cleaner housing of claim 1, further comprising an air intake duct and the air deflector is positioned lower than the air intake duct when coupled to a motorcycle.

11. A motorcycle, comprising:
    a frame;

front and rear wheels supporting the frame;
a powertrain drivingly connected to the rear wheel, the powertrain including an internal combustion engine having at least first and second cylinders, the second cylinder being located rearward of the first cylinder;
an air cleaner;
an air deflector, the air deflector including an air intake receiving ambient air and an air output, the air deflector defining an air path from the air intake to the air output, the air output being positioned adjacent the second cylinder and vertically higher than the air intake,
wherein the air deflector has a curved shape that directs air from the air intake rearward and upward around a periphery of the air cleaner.

12. The motorcycle of claim 11, wherein the air intake is located forward of the second cylinder.

13. The motorcycle of claim 11, wherein the air output is laterally adjacent the second cylinder.

14. The motorcycle of claim 11, wherein the air output is forward of a rearmost point of the second cylinder.

15. The motorcycle of claim 11, wherein the air deflector is suspended from above via a connection to the air cleaner.

* * * * *